(12) United States Patent
Krogh et al.

(10) Patent No.: US 9,603,378 B2
(45) Date of Patent: Mar. 28, 2017

(54) POLYPEPTIDES HAVING α-XYLOSIDASE ACTIVITY AND POLYNUCLEOTIDES ENCODING SAME

(71) Applicant: Novozymes A/S, Bagsvaerd (DK)

(72) Inventors: Kristian Bertel Romer M. Krogh, Bagsvaerd (DK); Jens Magnus Eklof, Bagsvaerd (DK); Katja Salomon Johansen, Gentofte (DK); Arthur Rogowski, New Castle (GB); David N. Bolam, Sunderland (GB); Harry J. Gilbert, Northumberland (GB)

(73) Assignee: Novozymes A/S, Bagsvaerd (DK)

( * ) Notice: Subject to any disclaimer, the term of this patent is extended or adjusted under 35 U.S.C. 154(b) by 0 days.

(21) Appl. No.: 14/896,871

(22) PCT Filed: Jul. 25, 2014

(86) PCT No.: PCT/EP2014/066080
§ 371 (c)(1),
(2) Date: Dec. 8, 2015

(87) PCT Pub. No.: WO2015/011277
PCT Pub. Date: Jan. 29, 2015

(65) Prior Publication Data
US 2016/0150807 A1    Jun. 2, 2016

(30) Foreign Application Priority Data
Jul. 26, 2013 (EP) .................................. 13178255

(51) Int. Cl.
| | |
|---|---|
| *C12N 9/24* | (2006.01) |
| *A23K 20/189* | (2016.01) |
| *A23K 20/147* | (2016.01) |
| *A23K 1/16* | (2006.01) |
| *A23K 1/165* | (2006.01) |
| *A23K 1/175* | (2006.01) |

(52) U.S. Cl.
CPC .......... *A23K 20/189* (2016.05); *A23K 1/1603* (2013.01); *A23K 1/1631* (2013.01); *A23K 1/1656* (2013.01); *A23K 1/175* (2013.01); *A23K 20/147* (2016.05)

(58) Field of Classification Search
CPC .................................................... C12N 9/2402
USPC ........................................................ 435/126
See application file for complete search history.

(56) References Cited

U.S. PATENT DOCUMENTS

2011/0165635 A1* 7/2011 Copenhaver ............. C12N 1/12
                                                                435/126

FOREIGN PATENT DOCUMENTS

| JP | 01139592 A | 1/1989 |
| WO | 01/89317 A1 | 11/2001 |

OTHER PUBLICATIONS

Bauer et al., PNAS, vol. 103, No. 30, pp. 11417-11422 (2006).
Chaillou et al., Journal of Bacteriology, vol. 180, No. 9, pp. 2312-2320 (1998).
Crombie et al., Planta, vol. 214, pp. 406-413 (2002).
Earl et al., UniProt Accession No. C3QER3 (2009).
Earl et al., UniProt Accession No. I9ADV6 (2012).
Earl et al., UniProt Accession No. I9STF6 (2012).
Fry et al., Physiologia Plantarum, vol. 89, pp. 1-3 (1993).
Fulton et al., UniProt Accession No. A7LZZ5 (2007).
Iglesias et al., Plant Cell Physiol., vol. 47, No. 1, pp. 55-63 (2006).
Jabbour et al., Biotechnology for Biofuels, vol. 6, No. 58, pp. 1-8 (2013).
Janecek et al., FEBS Letters, vol. 581, pp. 1261-1268 (2007).
Larsbrink et al., Biochem. J., vol. 321, No. 3, pp. 557-580 (2011).
Moracci et al., Journal of Biological Chemistry, vol. 275, No. 29, pp. 22082-22089 (2000).
Nakai et al., J. Biochem., vol. 142, pp. 491-500 (2007).
Nelson et al., UniProt Accession No. D4WF36 (2010).
Oneill et al., Journal of Biological Chemistry, vol. 264, No. 34, pp. 20430-20437 (1989).
Okuyama et al., Protein Expression and Purification, vol. 37, pp. 170-179 (2004).
Ramaraj et al., UniProt Accession No. D4VSZ2 (2010).
Sampedro et al., Plant Physiology, vol. 126, No. 2, pp. 910-920 (2001).
Scott-Craig et al., Journal of Biological Chemistry, vol. 286, No. 50, pp. 42848-42854 (2011).
Ward et al., UniProt Accession No. D7J3T4 (2010).
Yoshikawa et al., Biosci. Biotech. Biochem., vol. 57, No. 8, pp. 1281-1285 (1993).
Yoshikawa et al., Biosci. Biotech. Biochem., vol. 58, No. 1, pp. 121-125 (1994).
Yoshikawa et al., Biosci. Biotech. Biochem., vol. 58, No. 8, pp. 1392-1398 (1994).
Zong et al., Agric. Biol. Chem., vol. 53, No. 8, pp. 2129-2139 (1989).

\* cited by examiner

*Primary Examiner* — Maryam Monshipouri
(74) *Attorney, Agent, or Firm* — Elias Lambiris

(57) ABSTRACT

The present invention relates to isolated polypeptides having α-xylosidase activity, catalytic domains and polynucleotides encoding the polypeptides, catalytic domains. The invention also relates to nucleic acid constructs, vectors, and host cells comprising the polynucleotides as well as methods of producing and using the polypeptides and catalytic domains.

19 Claims, 5 Drawing Sheets

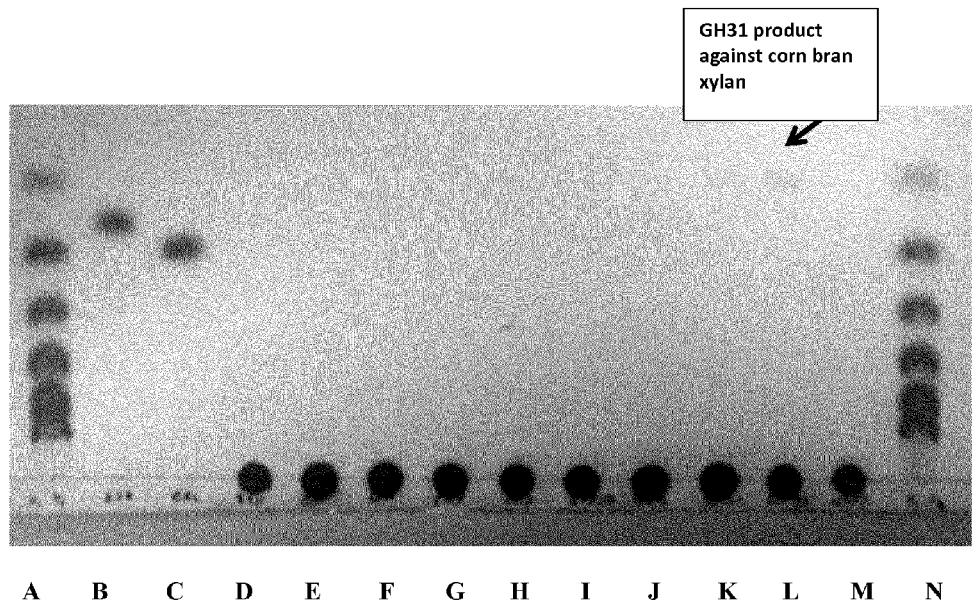

SEQUENCE LISTING

```
<160> NUMBER OF SEQ ID NOS: 5

<210> SEQ ID NO 1
<211> LENGTH: 2445
<212> TYPE: DNA
<213> ORGANISM: Bacteroides ovatus
<220> FEATURE:
<221> NAME/KEY: misc_signal
<222> LOCATION: (1)..(63)
<220> FEATURE:
<221> NAME/KEY: CDS
<222> LOCATION: (1)..(2442)
<220> FEATURE:
<221> NAME/KEY: mat_peptide
<222> LOCATION: (64)..(2442)

<400> SEQUENCE: 1 atg aaa ata cat cat cta ttt tgg ggt ata tgt tta tgc ttc agc aca      48
Met Lys Ile His His Leu Phe Trp Gly Ile Cys Leu Cys Phe Ser Thr
    -20                 -15                 -10 aat atc tta ttc gca cag aac tat cag aaa aca tcg tcc ggt atc aaa      96
Asn Ile Leu Phe Ala Gln Asn Tyr Gln Lys Thr Ser Ser Gly Ile Lys
 -5              -1   1               5                  10 acc act gta aat gca gtg gat ata gaa gta caa ttc ttt gcg cct gct     144
Thr Thr Val Asn Ala Val Asp Ile Glu Val Gln Phe Phe Ala Pro Ala
             15                  20                  25 gtg gcg aga gta ata aag tca ccg gaa ggt gtt gcc tat gaa aaa cag     192
Val Ala Arg Val Ile Lys Ser Pro Glu Gly Val Ala Tyr Glu Lys Gln
         30                  35                  40 agt ctt tct gta att gcc aaa cct gaa aag gtg agt ttc aaa gct gat     240
```

```
Ser Leu Ser Val Ile Ala Lys Pro Glu Lys Val Ser Phe Lys Ala Asp
    45                  50                  55 ata caa gat aat aag att gta ttg aat acc agt gaa cta agt gtc agt    288
Ile Gln Asp Asn Lys Ile Val Leu Asn Thr Ser Glu Leu Ser Val Ser
60                  65                  70                  75 gtg gac acc ggg acg gga att gtt tct tat ttc tca aag gat ggc aaa    336
Val Asp Thr Gly Thr Gly Ile Val Ser Tyr Phe Ser Lys Asp Gly Lys
                80                  85                  90 tca tta ttg gca gag aaa tcc ggt atg cag ttt atc gat ttc gat gat    384
Ser Leu Leu Ala Glu Lys Ser Gly Met Gln Phe Ile Asp Phe Asp Asp
            95                  100                 105 gcc ggg aca aaa act tat cag gtt tat caa cct ttt ata tta gat aag    432
Ala Gly Thr Lys Thr Tyr Gln Val Tyr Gln Pro Phe Ile Leu Asp Lys
        110                 115                 120 gag gaa gct att tat ggt ttg gga caa ttg caa aat gga aag atg att    480
Glu Glu Ala Ile Tyr Gly Leu Gly Gln Leu Gln Asn Gly Lys Met Ile
    125                 130                 135 cag cgg aac atg acc aaa aat ctg ata cag gga aat gtt gaa gat gtg    528
Gln Arg Asn Met Thr Lys Asn Leu Ile Gln Gly Asn Val Glu Asp Val
140                 145                 150                 155 tcg cca ttc ttc cag tcc acc aaa gga tat ggt gtg ttt tgg gat aac    576
Ser Pro Phe Phe Gln Ser Thr Lys Gly Tyr Gly Val Phe Trp Asp Asn
                160                 165                 170 tat tcg ccg act ctt ttt acg gac aac gaa gtt gaa aca tct ttt cgt    624
Tyr Ser Pro Thr Leu Phe Thr Asp Asn Glu Val Glu Thr Ser Phe Arg
            175                 180                 185 tct gaa gta ggt gat tgt gta gac tat tat ttc atg tat ggg aag gat    672
Ser Glu Val Gly Asp Cys Val Asp Tyr Tyr Phe Met Tyr Gly Lys Asp
        190                 195                 200 gcc gat ggt gta ata gca caa gta cgc agc ttg acc ggg caa gca ccg    720
Ala Asp Gly Val Ile Ala Gln Val Arg Ser Leu Thr Gly Gln Ala Pro
    205                 210                 215 atg ttt cct tta tgg act tat ggt tac tgg caa agt aaa gaa aga tat    768
Met Phe Pro Leu Trp Thr Tyr Gly Tyr Trp Gln Ser Lys Glu Arg Tyr
220                 225                 230                 235 aaa agc cag gag gaa gtg gta gac gtt gtt cgt aaa tat cgt gaa ttg    816
Lys Ser Gln Glu Glu Val Val Asp Val Val Arg Lys Tyr Arg Glu Leu
                240                 245                 250 ggt att cct ttg gat ggc att att cag gat tgg caa tat tgg ggg cat    864
Gly Ile Pro Leu Asp Gly Ile Ile Gln Asp Trp Gln Tyr Trp Gly His
            255                 260                 265 aac tat ttg tgg aat gcg atg gat ttt cag aat ccg act ttc aat aat    912
Asn Tyr Leu Trp Asn Ala Met Asp Phe Gln Asn Pro Thr Phe Asn Asn
        270                 275                 280 cct caa aag atg atg gag gat gtc cat gcg atg aac gca cac atg gct    960
Pro Gln Lys Met Met Glu Asp Val His Ala Met Asn Ala His Met Ala
    285                 290                 295 ata tct atc tgg tcg tca ttc gga ccg atg acc aaa cct tat aga gaa    1008
Ile Ser Ile Trp Ser Ser Phe Gly Pro Met Thr Lys Pro Tyr Arg Glu
300                 305                 310                 315 ttg gac aaa aaa ggt atg ttg ttt aat ttc act acc tgg ccg caa tcg    1056
Leu Asp Lys Lys Gly Met Leu Phe Asn Phe Thr Thr Trp Pro Gln Ser
                320                 325                 330 ggg ttg gag tca tgg ccc ccc aat atg gaa tat cct tcc ggt gta aga    1104
Gly Leu Glu Ser Trp Pro Pro Asn Met Glu Tyr Pro Ser Gly Val Arg
            335                 340                 345 gtg tat gat gct tac aat ccc gaa gcg cgt gac att tat tgg aaa tat    1152
Val Tyr Asp Ala Tyr Asn Pro Glu Ala Arg Asp Ile Tyr Trp Lys Tyr
        350                 355                 360
```

-continued

| | | |
|---|---|---|
| ctg aat gat gga att ttt aag ttg gga atg gat gcc tgg tgg atg gat<br>Leu Asn Asp Gly Ile Phe Lys Leu Gly Met Asp Ala Trp Trp Met Asp<br>365                                                370                                375 | 1200 |
| tct acc gaa ccc gat cat ttg gat tgg aag ccg gag gat atg gat acc<br>Ser Thr Glu Pro Asp His Leu Asp Trp Lys Pro Glu Asp Met Asp Thr<br>380                                    385                        390                        395 | 1248 |
| aaa acc tat ctg ggc tcg ttc cgt agg gtg cgc aat gct tat ccg ttg<br>Lys Thr Tyr Leu Gly Ser Phe Arg Arg Val Arg Asn Ala Tyr Pro Leu<br>                              400                        405                        410 | 1296 |
| atg act gtc gga ggg gtt tac gac cat cag cgt gca gtg act tcg gac<br>Met Thr Val Gly Gly Val Tyr Asp His Gln Arg Ala Val Thr Ser Asp<br>                            415                        420                        425 | 1344 |
| aaa cgg gtg ttt att tta acc cgt tcg gga ttc ttg ggg cag caa cgt<br>Lys Arg Val Phe Ile Leu Thr Arg Ser Gly Phe Leu Gly Gln Gln Arg<br>          430                        435                        440 | 1392 |
| tat ggt gca aat gta tgg agt ggt gat gtc gct tcc aca tgg gag agt<br>Tyr Gly Ala Asn Val Trp Ser Gly Asp Val Ala Ser Thr Trp Glu Ser<br>          445                        450                        455 | 1440 |
| ttt aga aat cag att cct gcc gga tta aac ttt tct ttg tgt ggt atg<br>Phe Arg Asn Gln Ile Pro Ala Gly Leu Asn Phe Ser Leu Cys Gly Met<br>460                                    465                        470                        475 | 1488 |
| cct cac tgg aat agt gat att ggt ggc ttt ttt gca gga cat tat aat<br>Pro His Trp Asn Ser Asp Ile Gly Gly Phe Phe Ala Gly His Tyr Asn<br>                            480                        485                        490 | 1536 |
| aaa agc tgg aat gat gat agt gct tca aaa aat cca ttg tat cag gag<br>Lys Ser Trp Asn Asp Asp Ser Ala Ser Lys Asn Pro Leu Tyr Gln Glu<br>                        495                        500                        505 | 1584 |
| ctt tat gtg cgt tgg ttg cag ttt ggg acg ttc aat ccg atg atg cgt<br>Leu Tyr Val Arg Trp Leu Gln Phe Gly Thr Phe Asn Pro Met Met Arg<br>          510                        515                        520 | 1632 |
| tcg cac ggg acg gat gtt tat agg gaa atc tat aag ttc gga aag aag<br>Ser His Gly Thr Asp Val Tyr Arg Glu Ile Tyr Lys Phe Gly Lys Lys<br>525                                      530                        535 | 1680 |
| ggc gaa cct gta tat gat gct atc gag aag atg ata ggt tta cgt tac<br>Gly Glu Pro Val Tyr Asp Ala Ile Glu Lys Met Ile Gly Leu Arg Tyr<br>540                                    545                        550                        555 | 1728 |
| tct ctg ttg cct tat att tat tct act tct tgg gag gtg agc aat cgt<br>Ser Leu Leu Pro Tyr Ile Tyr Ser Thr Ser Trp Glu Val Ser Asn Arg<br>                            560                        565                        570 | 1776 |
| caa tcg agt ttt atg cgc gct ttg atg atg gat ttt gta gat gac aga<br>Gln Ser Ser Phe Met Arg Ala Leu Met Met Asp Phe Val Asp Asp Arg<br>                        575                        580                        585 | 1824 |
| aag gtg tgg gat atc aat gac gaa tat atg ttt gga aaa tcg atc ctt<br>Lys Val Trp Asp Ile Asn Asp Glu Tyr Met Phe Gly Lys Ser Ile Leu<br>          590                        595                        600 | 1872 |
| gtg gct ccg att gct cat gca caa tat aca ccg gaa gct gtg gta aaa<br>Val Ala Pro Ile Ala His Ala Gln Tyr Thr Pro Glu Ala Val Val Lys<br>605                                      610                        615 | 1920 |
| gtc tcc gaa gaa gaa gga tgg aac aga gat gga gcg aaa aaa aca aaa<br>Val Ser Glu Glu Glu Gly Trp Asn Arg Asp Gly Ala Lys Lys Thr Lys<br>620                                    625                        630                        635 | 1968 |
| act gac gct gct gtg gat ttc atg gaa acg aaa tct act aac ata tac<br>Thr Asp Ala Ala Val Asp Phe Met Glu Thr Lys Ser Thr Asn Ile Tyr<br>                            640                        645                        650 | 2016 |
| tta ccg gca gga acg cta tgg tat gac ttc tgg acg aac gag aaa cat<br>Leu Pro Ala Gly Thr Leu Trp Tyr Asp Phe Trp Thr Asn Glu Lys His<br>                        655                        660                        665 | 2064 |
| gaa ggc gga aag gaa att acc aaa gag act aca ctg gat gtt att cca<br>Glu Gly Gly Lys Glu Ile Thr Lys Glu Thr Thr Leu Asp Val Ile Pro<br>670                                      675                        680 | 2112 |

-continued

| | | | | | | | | | | | | | | | |
|---|---|---|---|---|---|---|---|---|---|---|---|---|---|---|---|
| ttg | tat | gta | aaa | gcg | ggt | agt | att | att | cct | gtc | ggt | cca | caa | gtt | cag | 2160 |
| Leu | Tyr | Val | Lys | Ala | Gly | Ser | Ile | Ile | Pro | Val | Gly | Pro | Gln | Val | Gln | |
| | 685 | | | | 690 | | | | | 695 | | | | | | |

| tat | gca | act | gaa | aaa | ccg | tgg | gat | cat | ctt | gaa | ttg | aag | gtg | tat | gcg | 2208 |
| Tyr | Ala | Thr | Glu | Lys | Pro | Trp | Asp | His | Leu | Glu | Leu | Lys | Val | Tyr | Ala |
| 700 | | | | | 705 | | | | | 710 | | | | | 715 |

| ggt | gcg | aat | gga | aac | ttc | att | tta | tat | gaa | gat | gaa | ttt | gat | aat | tac | 2256 |
| Gly | Ala | Asn | Gly | Asn | Phe | Ile | Leu | Tyr | Glu | Asp | Glu | Phe | Asp | Asn | Tyr |
| | | | 720 | | | | | 725 | | | | | 730 | | |

| aat | tat | gaa | aaa | gga | gct | tat | acg | gaa | att | cca | atc | tct | tgg | aat | aat | 2304 |
| Asn | Tyr | Glu | Lys | Gly | Ala | Tyr | Thr | Glu | Ile | Pro | Ile | Ser | Trp | Asn | Asn |
| | | | 735 | | | | | 740 | | | | | 745 | | |

| gca | tct | cgt | aaa | ttg | acg | ata | ggg | gca | aga | aaa | ggt | gcg | tat | gag | gga | 2352 |
| Ala | Ser | Arg | Lys | Leu | Thr | Ile | Gly | Ala | Arg | Lys | Gly | Ala | Tyr | Glu | Gly |
| | | 750 | | | | | 755 | | | | | 760 | | | |

| atg | ttg | aag | aac | cgt | aag | ttt | act | gta | act | ctt | cag | gat | ggg | act | caa | 2400 |
| Met | Leu | Lys | Asn | Arg | Lys | Phe | Thr | Val | Thr | Leu | Gln | Asp | Gly | Thr | Gln |
| | 765 | | | | 770 | | | | | 775 | | | | | |

| aaa | aac | atc | gat | tat | aat | ggg | aaa | gcg | att | tct | gta | aag | ttt | tga | | 2445 |
| Lys | Asn | Ile | Asp | Tyr | Asn | Gly | Lys | Ala | Ile | Ser | Val | Lys | Phe | | |
| 780 | | | | | 785 | | | | | 790 | | | | | |

<210> SEQ ID NO 2
<211> LENGTH: 814
<212> TYPE: PRT
<213> ORGANISM: Bacteroides ovatus

<400> SEQUENCE: 2

Met Lys Ile His His Leu Phe Trp Gly Ile Cys Leu Cys Phe Ser Thr
    -20                        -15                     -10

Asn Ile Leu Phe Ala Gln Asn Tyr Gln Lys Thr Ser Ser Gly Ile Lys
-5              -1  1               5                        10

Thr Thr Val Asn Ala Val Asp Ile Glu Val Gln Phe Phe Ala Pro Ala
                15                     20                     25

Val Ala Arg Val Ile Lys Ser Pro Glu Gly Val Ala Tyr Glu Lys Gln
        30                      35                     40

Ser Leu Ser Val Ile Ala Lys Pro Glu Lys Val Ser Phe Lys Ala Asp
    45                     50                     55

Ile Gln Asp Asn Lys Ile Val Leu Asn Thr Ser Glu Leu Ser Val Ser
60                     65                     70                     75

Val Asp Thr Gly Thr Gly Ile Val Ser Tyr Phe Ser Lys Asp Gly Lys
                80                     85                     90

Ser Leu Leu Ala Glu Lys Ser Gly Met Gln Phe Ile Asp Phe Asp Asp
            95                     100                   105

Ala Gly Thr Lys Thr Tyr Gln Val Tyr Gln Pro Phe Ile Leu Asp Lys
        110                     115                   120

Glu Glu Ala Ile Tyr Gly Leu Gly Gln Leu Gln Asn Gly Lys Met Ile
    125                   130                   135

Gln Arg Asn Met Thr Lys Asn Leu Ile Gln Gly Asn Val Glu Asp Val
140                   145                     150                 155

Ser Pro Phe Phe Gln Ser Thr Lys Gly Tyr Gly Val Phe Trp Asp Asn
                160                     165                   170

Tyr Ser Pro Thr Leu Phe Thr Asp Asn Glu Val Glu Thr Ser Phe Arg
            175                     180                   185

Ser Glu Val Gly Asp Cys Val Asp Tyr Tyr Phe Met Tyr Gly Lys Asp
        190                     195                   200

```
Ala Asp Gly Val Ile Ala Gln Val Arg Ser Leu Thr Gly Gln Ala Pro
    205                 210                 215

Met Phe Pro Leu Trp Thr Tyr Gly Tyr Trp Gln Ser Lys Glu Arg Tyr
220                 225                 230                 235

Lys Ser Gln Glu Glu Val Val Asp Val Arg Lys Tyr Arg Glu Leu
                240                 245                 250

Gly Ile Pro Leu Asp Gly Ile Ile Gln Asp Trp Gln Tyr Trp Gly His
                255                 260                 265

Asn Tyr Leu Trp Asn Ala Met Asp Phe Gln Asn Pro Thr Phe Asn Asn
        270                 275                 280

Pro Gln Lys Met Met Glu Asp Val His Ala Met Asn Ala His Met Ala
285                 290                 295

Ile Ser Ile Trp Ser Ser Phe Gly Pro Met Thr Lys Pro Tyr Arg Glu
300                 305                 310                 315

Leu Asp Lys Lys Gly Met Leu Phe Asn Phe Thr Thr Trp Pro Gln Ser
                320                 325                 330

Gly Leu Glu Ser Trp Pro Pro Asn Met Glu Tyr Pro Ser Gly Val Arg
                335                 340                 345

Val Tyr Asp Ala Tyr Asn Pro Glu Ala Arg Asp Ile Tyr Trp Lys Tyr
        350                 355                 360

Leu Asn Asp Gly Ile Phe Lys Leu Gly Met Asp Ala Trp Trp Met Asp
        365                 370                 375

Ser Thr Glu Pro Asp His Leu Asp Trp Lys Pro Glu Asp Met Asp Thr
380                 385                 390                 395

Lys Thr Tyr Leu Gly Ser Phe Arg Arg Val Arg Asn Ala Tyr Pro Leu
                400                 405                 410

Met Thr Val Gly Gly Val Tyr Asp His Gln Arg Ala Val Thr Ser Asp
                415                 420                 425

Lys Arg Val Phe Ile Leu Thr Arg Ser Gly Phe Leu Gly Gln Gln Arg
            430                 435                 440

Tyr Gly Ala Asn Val Trp Ser Gly Asp Val Ala Ser Thr Trp Glu Ser
            445                 450                 455

Phe Arg Asn Gln Ile Pro Ala Gly Leu Asn Phe Ser Leu Cys Gly Met
460                 465                 470                 475

Pro His Trp Asn Ser Asp Ile Gly Gly Phe Phe Ala Gly His Tyr Asn
                480                 485                 490

Lys Ser Trp Asn Asp Asp Ser Ala Ser Lys Asn Pro Leu Tyr Gln Glu
                495                 500                 505

Leu Tyr Val Arg Trp Leu Gln Phe Gly Thr Phe Asn Pro Met Met Arg
        510                 515                 520

Ser His Gly Thr Asp Val Tyr Arg Glu Ile Tyr Lys Phe Gly Lys Lys
        525                 530                 535

Gly Glu Pro Val Tyr Asp Ala Ile Glu Lys Met Ile Gly Leu Arg Tyr
540                 545                 550                 555

Ser Leu Leu Pro Tyr Ile Tyr Ser Thr Trp Glu Val Ser Asn Arg
                560                 565                 570

Gln Ser Ser Phe Met Arg Ala Leu Met Met Asp Phe Val Asp Asp Arg
            575                 580                 585

Lys Val Trp Asp Ile Asn Asp Glu Tyr Met Phe Gly Lys Ser Ile Leu
                590                 595                 600

Val Ala Pro Ile Ala His Ala Gln Tyr Thr Pro Glu Ala Val Val Lys
            605                 610                 615

Val Ser Glu Glu Glu Gly Trp Asn Arg Asp Gly Ala Lys Lys Thr Lys
```

```
                620                 625                 630                 635
        Thr Asp Ala Ala Val Asp Phe Met Glu Thr Lys Ser Thr Asn Ile Tyr
                            640                 645                 650

Leu Pro Ala Gly Thr Leu Trp Tyr Asp Phe Trp Thr Asn Glu Lys His
                            655                 660                 665

Glu Gly Gly Lys Glu Ile Thr Lys Glu Thr Thr Leu Asp Val Ile Pro
                            670                 675                 680

Leu Tyr Val Lys Ala Gly Ser Ile Ile Pro Val Gly Pro Gln Val Gln
                            685                 690                 695

Tyr Ala Thr Glu Lys Pro Trp Asp His Leu Glu Leu Lys Val Tyr Ala
        700                 705                 710                 715

Gly Ala Asn Gly Asn Phe Ile Leu Tyr Glu Asp Glu Phe Asp Asn Tyr
                            720                 725                 730

Asn Tyr Glu Lys Gly Ala Tyr Thr Glu Ile Pro Ile Ser Trp Asn Asn
                            735                 740                 745

Ala Ser Arg Lys Leu Thr Ile Gly Ala Arg Lys Gly Ala Tyr Glu Gly
                            750                 755                 760

Met Leu Lys Asn Arg Lys Phe Thr Val Thr Leu Gln Asp Gly Thr Gln
                            765                 770                 775

Lys Asn Ile Asp Tyr Asn Gly Lys Ala Ile Ser Val Lys Phe
        780                 785                 790

<210> SEQ ID NO 3
<211> LENGTH: 793
<212> TYPE: PRT
<213> ORGANISM: Bacteroides ovatus
<220> FEATURE:
<221> NAME/KEY: mat_peptide
<222> LOCATION: (1)..(793)

<400> SEQUENCE: 3

Gln Asn Tyr Gln Lys Thr Ser Ser Gly Ile Lys Thr Thr Val Asn Ala
        1                   5                   10                  15

Val Asp Ile Glu Val Gln Phe Phe Ala Pro Ala Val Ala Arg Val Ile
                            20                  25                  30

Lys Ser Pro Glu Gly Val Ala Tyr Glu Lys Gln Ser Leu Ser Val Ile
                            35                  40                  45

Ala Lys Pro Glu Lys Val Ser Phe Lys Ala Asp Ile Gln Asp Asn Lys
                    50                  55                  60

Ile Val Leu Asn Thr Ser Glu Leu Ser Val Ser Val Asp Thr Gly Thr
        65                  70                  75                  80

Gly Ile Val Ser Tyr Phe Ser Lys Asp Gly Lys Ser Leu Leu Ala Glu
                            85                  90                  95

Lys Ser Gly Met Gln Phe Ile Asp Phe Asp Asp Ala Gly Thr Lys Thr
                            100                 105                 110

Tyr Gln Val Tyr Gln Pro Phe Ile Leu Asp Lys Glu Glu Ala Ile Tyr
                            115                 120                 125

Gly Leu Gly Gln Leu Gln Asn Gly Lys Met Ile Gln Arg Asn Met Thr
                    130                 135                 140

Lys Asn Leu Ile Gln Gly Asn Val Glu Asp Val Ser Pro Phe Phe Gln
        145                 150                 155                 160

Ser Thr Lys Gly Tyr Gly Val Phe Trp Asp Asn Tyr Ser Pro Thr Leu
                            165                 170                 175

Phe Thr Asp Asn Glu Val Glu Thr Ser Phe Arg Ser Glu Val Gly Asp
                            180                 185                 190
```

```
Cys Val Asp Tyr Tyr Phe Met Tyr Gly Lys Asp Ala Asp Gly Val Ile
        195                 200                 205

Ala Gln Val Arg Ser Leu Thr Gly Gln Ala Pro Met Phe Pro Leu Trp
    210                 215                 220

Thr Tyr Gly Tyr Trp Gln Ser Lys Glu Arg Tyr Lys Ser Gln Glu Glu
225                 230                 235                 240

Val Val Asp Val Val Arg Lys Tyr Arg Glu Leu Gly Ile Pro Leu Asp
                245                 250                 255

Gly Ile Ile Gln Asp Trp Gln Tyr Trp Gly His Asn Tyr Leu Trp Asn
            260                 265                 270

Ala Met Asp Phe Gln Asn Pro Thr Phe Asn Asn Pro Gln Lys Met Met
        275                 280                 285

Glu Asp Val His Ala Met Asn Ala His Met Ala Ile Ser Ile Trp Ser
290                 295                 300

Ser Phe Gly Pro Met Thr Lys Pro Tyr Arg Glu Leu Asp Lys Lys Gly
305                 310                 315                 320

Met Leu Phe Asn Phe Thr Thr Trp Pro Gln Ser Gly Leu Glu Ser Trp
                325                 330                 335

Pro Pro Asn Met Glu Tyr Pro Ser Gly Val Arg Val Tyr Asp Ala Tyr
            340                 345                 350

Asn Pro Glu Ala Arg Asp Ile Tyr Trp Lys Tyr Leu Asn Asp Gly Ile
        355                 360                 365

Phe Lys Leu Gly Met Asp Ala Trp Trp Met Asp Ser Thr Glu Pro Asp
370                 375                 380

His Leu Asp Trp Lys Pro Glu Asp Met Asp Thr Lys Thr Tyr Leu Gly
385                 390                 395                 400

Ser Phe Arg Arg Val Arg Asn Ala Tyr Pro Leu Met Thr Val Gly Gly
                405                 410                 415

Val Tyr Asp His Gln Arg Ala Val Thr Ser Asp Lys Arg Val Phe Ile
            420                 425                 430

Leu Thr Arg Ser Gly Phe Leu Gly Gln Gln Arg Tyr Gly Ala Asn Val
        435                 440                 445

Trp Ser Gly Asp Val Ala Ser Thr Trp Glu Ser Phe Arg Asn Gln Ile
450                 455                 460

Pro Ala Gly Leu Asn Phe Ser Leu Cys Gly Met Pro His Trp Asn Ser
465                 470                 475                 480

Asp Ile Gly Gly Phe Ala Gly His Tyr Asn Lys Ser Trp Asn Asp
                485                 490                 495

Asp Ser Ala Ser Lys Asn Pro Leu Tyr Gln Glu Leu Tyr Val Arg Trp
            500                 505                 510

Leu Gln Phe Gly Thr Phe Asn Pro Met Met Arg Ser His Gly Thr Asp
        515                 520                 525

Val Tyr Arg Glu Ile Tyr Lys Phe Gly Lys Lys Gly Glu Pro Val Tyr
530                 535                 540

Asp Ala Ile Glu Lys Met Ile Gly Leu Arg Tyr Ser Leu Leu Pro Tyr
545                 550                 555                 560

Ile Tyr Ser Thr Ser Trp Glu Val Ser Asn Arg Gln Ser Ser Phe Met
                565                 570                 575

Arg Ala Leu Met Met Asp Phe Val Asp Asp Arg Lys Val Trp Asp Ile
            580                 585                 590

Asn Asp Glu Tyr Met Phe Gly Lys Ser Ile Leu Val Ala Pro Ile Ala
        595                 600                 605

His Ala Gln Tyr Thr Pro Glu Ala Val Val Lys Val Ser Glu Glu Glu
```

```
                610             615             620
Gly Trp Asn Arg Asp Gly Ala Lys Lys Thr Lys Thr Asp Ala Ala Val
625                 630             635                 640

Asp Phe Met Glu Thr Lys Ser Thr Asn Ile Tyr Leu Pro Ala Gly Thr
                645             650                 655

Leu Trp Tyr Asp Phe Trp Thr Asn Glu Lys His Glu Gly Gly Lys Glu
            660             665                 670

Ile Thr Lys Glu Thr Thr Leu Asp Val Ile Pro Leu Tyr Val Lys Ala
        675             680                 685

Gly Ser Ile Ile Pro Val Gly Pro Gln Val Gln Tyr Ala Thr Glu Lys
    690             695             700

Pro Trp Asp His Leu Glu Leu Lys Val Tyr Ala Gly Ala Asn Gly Asn
705             710             715                 720

Phe Ile Leu Tyr Glu Asp Glu Phe Asp Asn Tyr Asn Tyr Glu Lys Gly
                725             730             735

Ala Tyr Thr Glu Ile Pro Ile Ser Trp Asn Asn Ala Ser Arg Lys Leu
            740             745             750

Thr Ile Gly Ala Arg Lys Gly Ala Tyr Glu Gly Met Leu Lys Asn Arg
        755             760             765

Lys Phe Thr Val Thr Leu Gln Asp Gly Thr Gln Lys Asn Ile Asp Tyr
770             775             780

Asn Gly Lys Ala Ile Ser Val Lys Phe
785             790

<210> SEQ ID NO 4
<211> LENGTH: 814
<212> TYPE: PRT
<213> ORGANISM: Bacteroides CL
<220> FEATURE:
<221> NAME/KEY: SIGNAL
<222> LOCATION: (1)..(21)
<220> FEATURE:
<221> NAME/KEY: mat_peptide
<222> LOCATION: (22)..(814)

<400> SEQUENCE: 4

Met Lys Ile His His Leu Phe Trp Gly Ile Cys Leu Cys Phe Ser Thr
    -20             -15                 -10

Asn Ile Leu Phe Ala Gln Asn Tyr Gln Lys Thr Ser Ser Gly Ile Lys
-5          -1  1               5                   10

Thr Thr Val Asn Ala Val Asp Ile Glu Val Gln Phe Ala Pro Ala
            15              20              25

Val Ala Arg Val Ile Lys Ser Pro Glu Gly Val Ala Tyr Glu Lys Gln
        30              35              40

Ser Leu Ser Val Ile Ala Lys Pro Glu Lys Val Ser Phe Lys Ala Asp
    45              50              55

Ile Gln Asp Asn Lys Ile Val Leu Asn Thr Ser Glu Leu Ser Val Ser
60              65              70              75

Val Asp Thr Gly Thr Gly Ile Val Ser Tyr Phe Ser Lys Asp Gly Lys
            80              85              90

Ser Leu Leu Ala Glu Lys Ser Gly Met Gln Phe Ile Asp Phe Asp Asp
            95              100             105

Ala Gly Thr Lys Thr Tyr Gln Val Tyr Gln Pro Phe Ile Leu Asp Lys
        110             115             120

Glu Glu Ala Ile Tyr Gly Leu Gly Gln Leu Gln Asn Gly Lys Met Ile
    125             130             135
```

-continued

```
Gln Arg Asn Met Thr Lys Asn Leu Ile Gln Gly Asn Val Glu Asp Val
140                 145                 150                 155

Ser Pro Phe Phe Gln Ser Thr Lys Gly Tyr Gly Val Phe Trp Asp Asn
            160                 165                 170

Tyr Ser Pro Thr Leu Phe Thr Asp Asn Glu Val Glu Thr Ser Phe Arg
            175                 180                 185

Ser Glu Val Gly Asp Cys Val Asp Tyr Tyr Phe Met Tyr Gly Lys Asp
            190                 195                 200

Ala Asp Gly Val Ile Ala Gln Val Arg Ser Leu Thr Gly Gln Ala Pro
205                 210                 215

Met Phe Pro Leu Trp Thr Tyr Gly Tyr Trp Gln Ser Lys Glu Arg Tyr
220                 225                 230                 235

Lys Ser Gln Glu Glu Val Val Asp Val Val Arg Lys Tyr Arg Glu Leu
                240                 245                 250

Gly Ile Pro Leu Asp Gly Ile Ile Gln Asp Trp Gln Tyr Trp Gly His
                255                 260                 265

Asn Tyr Leu Trp Asn Ala Met Asp Phe Gln Asn Pro Thr Phe Asn Asn
            270                 275                 280

Pro Gln Lys Met Met Glu Asp Val His Ala Met Asn Ala His Met Ala
    285                 290                 295

Ile Ser Ile Trp Ser Ser Phe Gly Pro Met Thr Lys Pro Tyr Arg Glu
300                 305                 310                 315

Leu Asp Lys Lys Gly Met Leu Phe Asn Phe Thr Thr Trp Pro Gln Ser
                320                 325                 330

Gly Leu Glu Ser Trp Pro Pro Asn Met Glu Tyr Pro Ser Gly Val Arg
            335                 340                 345

Val Tyr Asp Ala Tyr Asn Pro Glu Ala Arg Asp Ile Tyr Trp Lys Tyr
        350                 355                 360

Leu Asn Asp Gly Ile Phe Lys Leu Gly Met Asp Ala Trp Trp Met Asp
        365                 370                 375

Ser Thr Glu Pro Asp His Leu Asp Trp Lys Pro Glu Asp Met Asp Thr
380                 385                 390                 395

Lys Thr Tyr Leu Gly Ser Phe Arg Lys Val Arg Asn Ala Tyr Pro Leu
                400                 405                 410

Met Thr Val Gly Gly Val Tyr Asp His Gln Arg Ala Val Thr Ser Asp
            415                 420                 425

Lys Arg Val Phe Ile Leu Thr Arg Ser Gly Phe Leu Gly Gln Gln Arg
        430                 435                 440

Tyr Gly Ala Asn Val Trp Ser Gly Asp Val Ala Ser Thr Trp Glu Ser
        445                 450                 455

Phe Arg Asn Gln Ile Pro Ala Gly Leu Asn Phe Ser Leu Cys Gly Met
460                 465                 470                 475

Pro His Trp Asn Ser Asp Ile Gly Gly Phe Phe Ala Gly His Tyr Asn
                480                 485                 490

Lys Ser Trp Asn Asp Asp Ser Ala Ser Lys Asn Pro Leu Tyr Gln Glu
            495                 500                 505

Leu Tyr Val Arg Trp Leu Gln Phe Gly Thr Phe Asn Pro Met Met Arg
        510                 515                 520

Ser His Gly Thr Asp Val Tyr Arg Glu Ile Tyr Lys Phe Gly Lys Lys
    525                 530                 535

Gly Glu Pro Val Tyr Asp Ala Ile Glu Lys Met Ile Gly Leu Arg Tyr
540                 545                 550                 555

Ser Leu Leu Pro Tyr Ile Tyr Ser Thr Ser Trp Glu Val Ser Asn Arg
```

```
                        560                 565                 570
Gln Ser Ser Phe Met Arg Ala Leu Met Met Asp Phe Val Asp Asp Arg
            575                 580                 585

Lys Val Trp Asp Ile Asn Asp Glu Tyr Met Phe Gly Lys Ser Ile Leu
        590                 595                 600

Val Ala Pro Ile Thr His Ala Gln Tyr Thr Pro Glu Ala Val Val Lys
    605                 610                 615

Val Ser Glu Glu Gly Trp Asn Arg Asp Gly Ala Lys Lys Thr Lys
620                 625                 630                 635

Thr Asp Val Ala Val Asp Phe Met Glu Thr Lys Ser Thr Asn Ile Tyr
                640                 645                 650

Leu Pro Ala Gly Thr Leu Trp Tyr Asp Phe Trp Thr Asn Glu Lys His
            655                 660                 665

Glu Gly Gly Lys Glu Ile Thr Lys Glu Thr Thr Leu Asp Val Ile Pro
        670                 675                 680

Leu Tyr Val Lys Ala Gly Ser Ile Ile Pro Val Gly Pro Gln Val Gln
    685                 690                 695

Tyr Ala Thr Glu Lys Pro Trp Asp His Leu Glu Leu Lys Val Tyr Ala
700                 705                 710                 715

Gly Ala Asn Gly Asn Phe Ile Leu Tyr Glu Asp Phe Asp Asn Tyr
                720                 725                 730

Asn Tyr Glu Lys Gly Val Tyr Thr Glu Ile Pro Ile Ser Trp Asn Asn
            735                 740                 745

Thr Ser Arg Lys Leu Thr Ile Gly Ala Arg Lys Gly Ala Tyr Glu Gly
        750                 755                 760

Met Leu Lys Asn Arg Lys Phe Thr Val Thr Leu Gln Asp Gly Thr Gln
    765                 770                 775

Lys Asn Val Asp Tyr Asn Gly Lys Ala Ile Ser Val Lys Phe
780                 785                 790
```

<210> SEQ ID NO 5
<211> LENGTH: 814
<212> TYPE: PRT
<213> ORGANISM: Bacteroides sp. D22
<220> FEATURE:
<221> NAME/KEY: SIGNAL
<222> LOCATION: (1)..(21)
<220> FEATURE:
<221> NAME/KEY: mat_peptide
<222> LOCATION: (22)..(814)

<400> SEQUENCE: 5

```
Met Lys Ile His His Leu Phe Trp Gly Ile Cys Leu Cys Phe Ser Thr
    -20                 -15                 -10

Asn Val Leu Phe Ala Gln Asn Tyr Gln Lys Thr Ser Ser Gly Ile Lys
-5              -1  1               5                   10

Thr Thr Val Asn Ala Val Asp Ile Glu Val Gln Phe Phe Ala Pro Ala
                15                  20                  25

Val Ala Arg Ile Ile Lys Ser Pro Glu Gly Val Ala Tyr Glu Lys Glu
            30                  35                  40

Ser Leu Ser Val Ile Ala Lys Pro Glu Lys Val Ser Phe Lys Ala Asp
        45                  50                  55

Ile Lys Asp Asn Lys Ile Val Leu Asn Thr Ser Glu Leu Ser Val Ser
60                  65                  70                  75

Val Asp Thr Gly Thr Gly Ile Val Ser Tyr Phe Ser Lys Asp Gly Lys
                80                  85                  90
```

```
Ser Leu Leu Ala Glu Lys Ser Gly Met Gln Phe Ile Asp Phe Asp Asp
             95                 100                 105

Ala Gly Thr Lys Thr Tyr Gln Val Tyr Gln Pro Phe Ile Leu Asp Lys
        110                 115                 120

Glu Glu Ala Ile Tyr Gly Leu Gly Gln Leu Gln Asn Gly Lys Met Ile
    125                 130                 135

Gln Arg Asn Met Thr Lys Asn Leu Ile Gln Gly Asn Val Glu Asp Val
140                 145                 150                 155

Ser Pro Phe Phe Gln Ser Thr Lys Gly Tyr Gly Val Phe Trp Asp Asn
                160                 165                 170

Tyr Ser Pro Thr Leu Phe Thr Asp Asn Glu Val Glu Thr Ser Phe Arg
            175                 180                 185

Ser Glu Val Gly Asp Cys Val Asp Tyr Tyr Phe Met Tyr Gly Lys Asp
        190                 195                 200

Ala Asp Gly Val Ile Ala Gln Val Arg Ser Leu Thr Gly Gln Ala Pro
    205                 210                 215

Met Phe Pro Leu Trp Thr Tyr Gly Tyr Trp Gln Ser Lys Glu Arg Tyr
220                 225                 230                 235

Lys Ser Gln Glu Glu Val Val Asp Val Val Arg Lys Tyr Arg Glu Leu
                240                 245                 250

Gly Ile Pro Leu Asp Gly Ile Ile Gln Asp Trp Gln Tyr Trp Gly His
            255                 260                 265

Asn Tyr Leu Trp Asn Ala Met Asp Phe Gln Asn Pro Thr Phe Asn Asn
            270                 275                 280

Pro Gln Lys Met Ile Glu Asp Val His Ala Met Asn Ala His Met Ala
285                 290                 295

Ile Ser Ile Trp Ser Ser Phe Gly Pro Met Thr Lys Pro Tyr Arg Glu
300                 305                 310                 315

Leu Asp Lys Lys Gly Met Leu Phe Asn Phe Thr Thr Trp Pro Gln Ser
                320                 325                 330

Gly Leu Glu Ser Trp Pro Pro Asn Met Glu Tyr Pro Ser Gly Val Arg
            335                 340                 345

Val Tyr Asp Ala Tyr Asn Pro Glu Ala Arg Asp Ile Tyr Trp Lys Tyr
        350                 355                 360

Leu Asn Gly Gly Ile Phe Lys Leu Gly Met Asp Ala Trp Trp Met Asp
    365                 370                 375

Ser Thr Glu Pro Asp His Leu Asp Trp Lys Pro Glu Asp Met Asp Thr
380                 385                 390                 395

Lys Thr Tyr Leu Gly Ser Phe Arg Lys Val Arg Asn Ala Tyr Pro Leu
                400                 405                 410

Met Thr Val Gly Gly Val Tyr Asp His Gln Arg Glu Val Thr Ser Asp
            415                 420                 425

Lys Arg Val Phe Ile Leu Thr Arg Ser Gly Phe Leu Gly Gln Gln Arg
        430                 435                 440

Tyr Gly Ala Asn Val Trp Ser Gly Asp Val Ala Ser Thr Trp Glu Ser
    445                 450                 455

Phe Arg Asn Gln Ile Pro Ala Gly Leu Asn Phe Ser Leu Cys Gly Met
460                 465                 470                 475

Pro His Trp Asn Ser Asp Ile Gly Gly Phe Phe Ala Gly His Tyr Asn
                480                 485                 490

Lys Ser Trp Asn Asp Asp Ser Ala Ser Lys Asn Pro Leu Tyr Gln Glu
            495                 500                 505

Leu Tyr Val Arg Trp Leu Gln Phe Gly Thr Phe Asn Pro Met Met Arg
```

```
                510                 515                 520
Ser His Gly Thr Asp Val Tyr Arg Glu Ile Tyr Lys Phe Gly Lys Lys
    525                 530                 535
Gly Glu Pro Val Tyr Asp Ala Ile Glu Lys Met Ile Gly Leu Arg Tyr
540                 545                 550                 555
Ser Leu Leu Pro Tyr Ile Tyr Ser Thr Ser Trp Glu Val Ser Asn Arg
                560                 565                 570
Gln Ser Ser Phe Met Arg Ala Leu Met Met Asp Phe Val Asp Asp Arg
            575                 580                 585
Lys Val Trp Asp Ile Asn Asp Glu Tyr Met Phe Gly Lys Ser Ile Leu
            590                 595                 600
Val Ala Pro Ile Ala His Ala Gln Tyr Thr Pro Glu Ala Val Val Lys
    605                 610                 615
Val Ser Glu Glu Glu Gly Trp Asn Arg Asp Gly Ala Lys Lys Thr Lys
620                 625                 630                 635
Thr Asp Ala Ala Val Asp Phe Met Glu Thr Lys Ser Thr Asn Ile Tyr
                640                 645                 650
Leu Pro Ala Gly Thr Leu Trp Tyr Asp Phe Trp Thr Asn Glu Lys His
            655                 660                 665
Glu Gly Gly Lys Glu Ile Thr Lys Glu Thr Thr Leu Asp Val Ile Pro
            670                 675                 680
Leu Tyr Val Lys Ala Gly Ser Ile Ile Pro Val Gly Pro Gln Val Gln
    685                 690                 695
Tyr Ala Thr Glu Lys Pro Trp Asp His Leu Glu Leu Lys Val Tyr Ala
700                 705                 710                 715
Gly Ala Asn Gly Asn Phe Ile Leu Tyr Glu Asp Glu Phe Asp Asn Tyr
                720                 725                 730
Asn Tyr Glu Lys Gly Ala Tyr Thr Glu Ile Pro Ile Ser Trp Asn Asn
            735                 740                 745
Ala Ser Arg Lys Leu Thr Ile Gly Ala Arg Lys Gly Ala Tyr Glu Gly
            750                 755                 760
Met Leu Lys Asn Arg Lys Phe Thr Val Thr Leu Gln Asp Gly Thr Gln
    765                 770                 775
Lys Asn Val Asp Tyr Asn Gly Lys Ala Ile Ser Val Lys Phe
780                 785                 790
```

POLYPEPTIDES HAVING α-XYLOSIDASE ACTIVITY AND POLYNUCLEOTIDES ENCODING SAME

CROSS-REFERENCE TO RELATED APPLICATIONS

This application is a 35 U.S.C. 371 national application of PCT/EP2014/066080 filed Jul. 25, 2014, which claims priority or the benefit under 35 U.S.C. 119 of European application no. 13178255.9 filed Jul. 26, 2013. The contents of each application are fully incorporated herein by reference.

REFERENCE TO A SEQUENCE LISTING

This application contains a Sequence Listing in computer readable form, which is incorporated herein by reference.

REFERENCE TO A DEPOSIT OF BIOLOGICAL MATERIAL

This application contains a reference to a public deposit of biological material, which deposit is incorporated herein by reference (ATCC 8483).

BACKGROUND OF THE INVENTION

Field of the Invention

The present invention relates to the use of polypeptides having α-xylosidase activity and belonging to the glycoside hydrolase family 31 (GH31, www.cazy.org & PMID: 18838391) Cantarel et al.), especially the GH31 α-xylosidase designated BACOVA 03422.

Nucleic Acids Res. 2009 January; 37 (Database issue): D233-8. doi: 10.1093/nar/gkn663. Epub 2008 Oct. 5.

The Carbohydrate-Active EnZymes database (CAZy): an expert resource for Glycogenomics.

Cantarel B L, Coutinho P M, Rancurel C, Bernard T, Lombard V, Henrissat B., and polynucleotides encoding the polypeptides and catalytic domains. The invention also relates to nucleic acid constructs, vectors, and host cells comprising the polynucleotides as well as methods of producing and using the polypeptides and catalytic domains.

Description of the Related Art

α-xylosidases of which the sequence is known belong to family GH31. To date, three bacterial GH31 α-xylosidases have been characterized (CjXyl31A, Larsbrink et al. 2011, Biochem. J. 436:567-580; YicI, Okuyama et al. 2004, Protein Expr. Purif. 37:170-179; XylQ, Chaillou et al. 1998, J. Bacteriol. 180:2312-2320). In archea, one α-xylosidase has been described (XylS, Moracci et al. 2000, J. Biol. Chem. 275:22082-22089). Two fungal GH31 α-xylosidases have also been described, *Aspergillus niger* (AxIA, Scott-Craig et al. 2011, J. Biol. Chem. 286:42848-42854) and an *Aspergillus nidulans* α-xylosidase (Bauer et al. 2006, Proc Natl. Acad. Sci. U.S.A. 130:11417-11422). The *A. niger* AxIA has been shown to enhance the yield of fermentable sugars on some substrates when supplemented to commercial cellulase preparations. The mechanism of action was assumed to be in aiding in xyloglucan hydrolysis (Jabbour et al. 2013, Biotechnol. Biofuels 6:online version).

In plants, several GH31 α-xylosidase have been described (AXyl1 and *Brassica* GH31, Sampedro et al. 2001, Plant Physiol. 126:910-920 and Iglesias et al. 2006, Plant Cell Physiol. 47:55-63; from *Tropaeolum majus*, Crombie et al. 2002, Planta 214:406-413; from *Oryza sativa*, Nakai et al. 2007, J. Biochem 142:491-500). Apart from these another four α-xylosidases have been found in various species but their amino acid or nucleotide sequences have never been determined: *Aspergillus flavus* MO-5 α-xylosidase (Yoshikawa et al. 1993, Biosci. Biotechnol. Biochem. 57:1281-1285; Yoshikawa et al. 1993, Biosci. Biotechnol. Biochem. 58:121-125;); *Pisum sativum* α-xylosidase (O'Neill et al. 1989, J. Biol. Chem. 264:20430-20437); *Bacillus* α-xylosidase (Zong et al. 1989, Agric. Biol. Chem. 53:2129-2139); *Aspergillus niger* (Yoshikawa et al. 1994, Biosci. Biotechnol. Biochem. 58:1392-1398). All of these are less than 50% identical to the mature protein of SEQ ID NO: 2 herein.

A number of sequences have been published in the UNIPROT database (reference) that are indicated as Glycosyl hydrolases belonging to family 31 (EC=3.2.1.-;) or simply as "protein". This includes also SEQ ID NOs: 2 and 3 as exemplified herein. The sequence identities of these sequences to SEQ ID NO: 2 range from 100% to 97.8%. Further related sequences (by sequence identity) are below 77.2% identity.

SEQ ID NO: 2 is thus published as UNIPROT:A7LZZ5 with the reference Fulton, L Clifton, S Fulton, B Xu, J Minx, P Pepin, K H Johnson, M Thiruvilangam, P Bhonagiri, V Nash, W E Mardis, E R Wilson, R K. Submitted (March-2007) to the EMBL/GenBank/DDBJ databases, and Sudarsanam, P Ley, R Guruge, J Turnbaugh, P J Mahowald, M Liep, D Gordon, J. Draft genome sequence of *Bacteroides ovatus* (ATCC 8483). Submitted (April-2007) to the EMBL/GenBank/DDBJ databases.

Sequences having between 99.2 and 97.8% identities to SEQ ID NO: 2 are disclosed as UNIPROT:I9STF6 (*Bacteroides* CL02T12C04), UNIPROT:D7J3T4 (*Bacteroides* sp. D22), UNIPROT:I9ADV6 (*Bacteroides xylanisolvens* CL03T12C04), UNIPROT:D4VSZ2 (*Bacteroides ovatus* SD CC 2a), UNIPROT:C3QER3 (*Bacteroides* sp 2_1_22), UNIPROT:D4WF36 (*Bacteroides* xylanisolvens SD CC 1b) and a few more The present invention provides the use in animal feed of polypeptides having α-xylosidase activity and polynucleotides encoding the polypeptides. In comparison to other GH31 α-xylosidases acting on para nitro phenol α-D-xylose or on the X motif (Fry et al. 1993, Physiol. Plant. 89:1-3) on the non-reducing end of xylogluco oligosaccharides. The α-xylosidase in SEQ ID NO: 2 (GH31 α-xylosidase designated BACOVA 03422) is corn-xylan-specific and has a higher specific activity on corn xylan compared to CjXyl31.

SUMMARY OF THE INVENTION

The present invention relates to the use in animal feed of isolated polypeptides having α-xylosidase activity selected from the group consisting of:

(a) a polypeptide having at least 80% sequence identity to the mature polypeptide of SEQ ID NO: 2;

(b) a polypeptide encoded by a polynucleotide that hybridizes under high, or very high stringency conditions with (i) the mature polypeptide coding sequence of SEQ ID NO: 1, or (ii) the full-length complement of (i);

(c) a polypeptide encoded by a polynucleotide having at least 97.8% sequence identity to the mature polypeptide coding sequence of SEQ ID NO:

(e) a fragment of the polypeptide of (a), (b) or (c) that has α-xylosidase activity.

The present invention also relates to isolated polypeptides comprising a catalytic domain selected from the group consisting of:

(a) a catalytic domain having at least 97.8% sequence identity to amino acids 22 to 814 of SEQ ID NO: 2

(b) a catalytic domain encoded by a polynucleotide that hybridizes under high, or very high stringency conditions with (i) nucleotides 64 to 2442 of SEQ ID NO: 1, or (ii) the full-length complement of (i);

(c) a catalytic domain encoded by a polynucleotide having at least 97.8% sequence identity to nucleotides 64 to 2442 of SEQ ID NO: 1

(e) a fragment of the catalytic domain of (a), (b), (c), that has α-xylosidase activity.

The present invention also relates to isolated polynucleotides encoding the polypeptides of the present invention; nucleic acid constructs; recombinant expression vectors; recombinant host cells comprising the polynucleotides; and methods of producing the polypeptides.

The present invention also relates to variant polypeptides having α-xylosidase activity and having at least 80%, e.g. at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to SEQ ID NO: 3 comprising at least one substitution, deletion, and/or insertion of at least one or more (several) amino acids of SEQ ID NO: 3.

The present invention further relates to compositions comprising an isolated polypeptide having α-xylosidase activity, selected from the group consisting of:

(a) a polypeptide having at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to SEQ ID NO: 3;

(b) a polypeptide encoded by a polynucleotide that hybridizes under, high stringency conditions or very-high stringency conditions with:

(i) the mature polypeptide coding sequence of SEQ ID NO: 1; and/or (ii) the full-length complementary strand of (i);

(c) a polypeptide encoded by a polynucleotide having at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the mature polypeptide coding sequence of SEQ ID NO: 1;

(d) a variant comprising a substitution, deletion, and/or insertion of one or more (several) amino acids of SEQ ID NO: 3; and (e) a fragment of a polypeptide of (a), (b), (c) or (d), that has α-xylosidase activity.

The compositions can be animal feed compositions. The present invention also relates to isolated polynucleotides encoding the polypeptides of the present invention, nucleic acid constructs, recombinant expression vectors, recombinant host cells comprising the polynucleotides, and to methods of recombinantly producing the polypeptides. The present invention also relates to methods for preparing a composition for use in animal feed, methods for improving the nutritional value of an animal feed, and methods of treating proteins to be used in animal feed compositions.

The present invention also relates to a polynucleotide encoding a signal peptide comprising or consisting of amino acids 1 to 21 of SEQ ID NO: 2, which is operably linked to a gene encoding a protein; nucleic acid constructs, expression vectors, and recombinant host cells comprising the polynucleotides; and methods of producing a protein.

The invention also provides animal feed compositions comprising the polypeptides used. The present invention also relates to methods for preparing a composition for use in animal feed, for improving the nutritional value of an animal feed, and methods of treating plant ingredients to be used in animal feed compositions.

BRIEF DESCRIPTION OF THE FIGURES

FIG. 1 shows a partial alignment of a section of YicI and SEQ ID NO: 2, BoXyl31A (the α-xylosidase of SEQ ID NO: 2) showing the active site residues in bold letters. The positions of the active site residues are also marked with an asterisk above the alignment. Asp 400 (no. 36 in the figure) and the acid/base Asp 473 (no. 102 in the figure) of SEQ ID NO: 2 are the nucleophile and acid/base, respectively.

FIG. 2 shows thin layer chromatography showing *B. ovatus* GH31 activity against decorated xylans. Lanes D-H: xylans alone. Lanes I-M: xylans+GH31. Rye arabinoxylan (lanes D and H), Birchwood glucuronoxylan (lanes E and I), Oat spelt xylan (lanes F and J), Wheat arabinoxylan (lanes G and K). Corn bran xylan (lanes H and L). Lane A is X1 to X6 mix of D-xylo-oligosaccharide standards (Megazyme). Lanes B and C are L-arabinose and L-galactose standards, respectively (Sigma).

monosaccharides released by different enzyme treatments. The monosaccharides are indicated in the figures as follows: arabinose, galactose, fucose, glucose, xylose.

Figure 3:
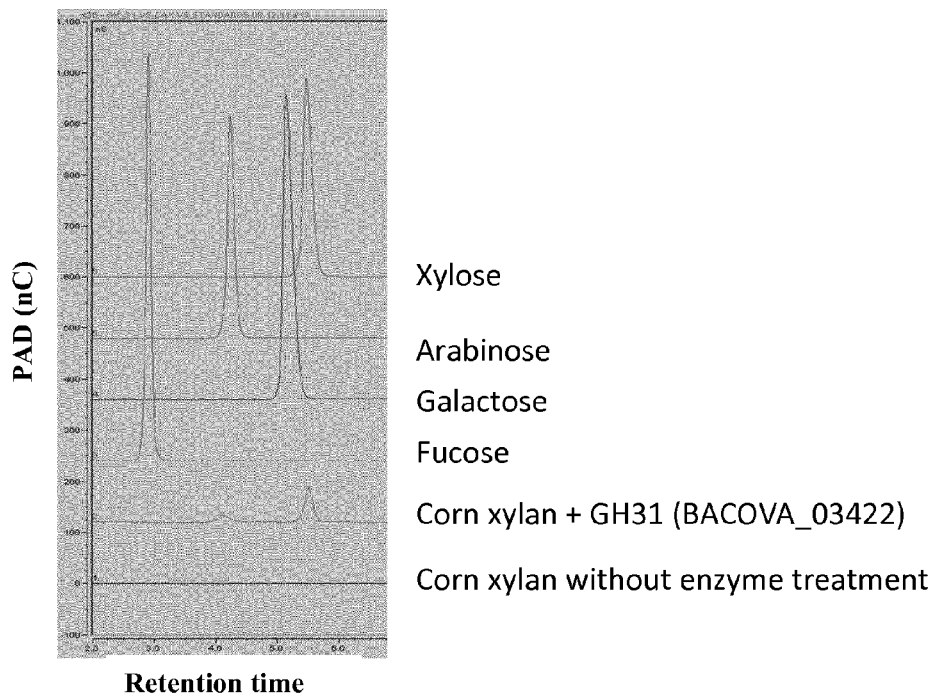

FIG. 3 shows high performance liquid chromatography (HPLC) traces showing that GH31 (BACOVA_03422) releases xylose from corn xylan (Example 2).

Figure 4:
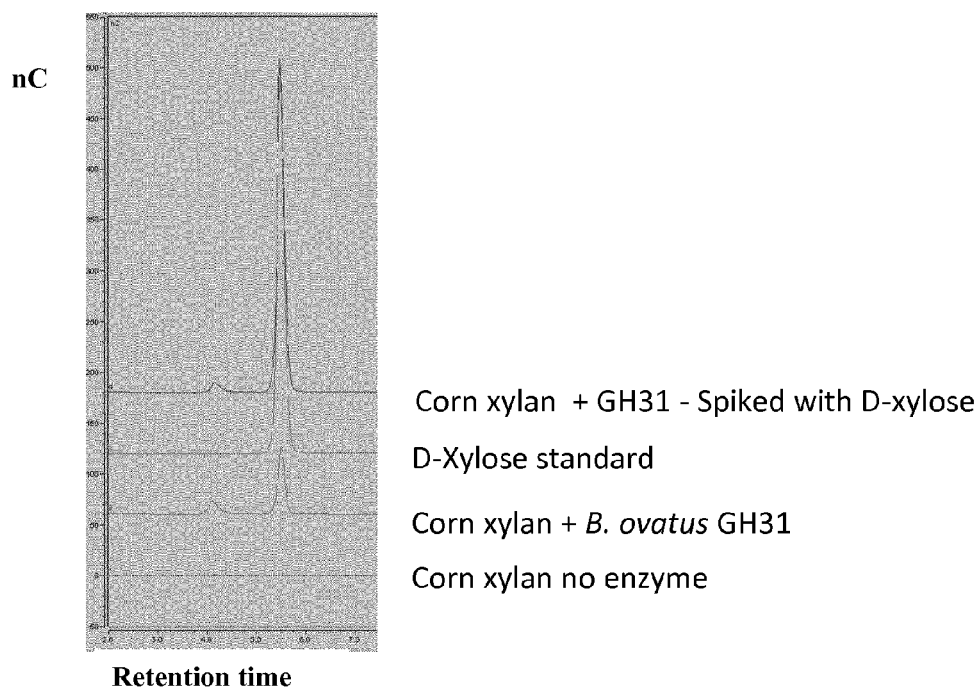

FIG. 4 shows high performance liquid chromatography (HPLC) trace showing GH31 (BACOVA_03422) product spiked with D-xylose standard to confirm identity (Example 2).

Figure 5:
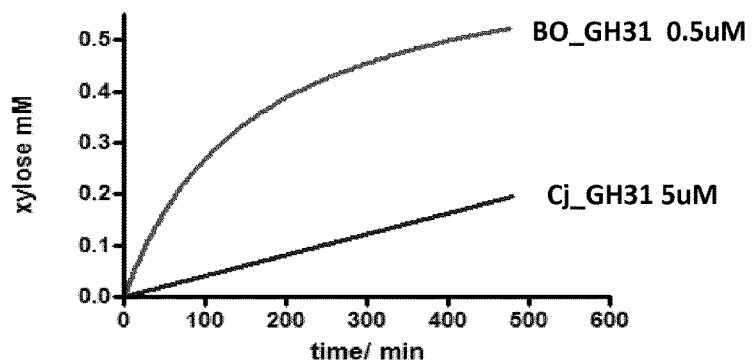

FIG. 5 compares activities of GH31 (BACOVA_03422) and *C. japonicus* GH31 (ACE86259) Bo GH31 and *C. japonicus* GH31 that acts on xyloglucan oligosaccharides. It is seen that GH31 (BACOVA_03422) is much less active vs xyloglucan heptasaccharide (XXXG) than Cj GH31 (>50, 000×). However, *B. ovatus* GH31 is >100 times more active on corn xylan than *C. japonicus* GH31 α-xylosidase (Example 2).

Figure 6:
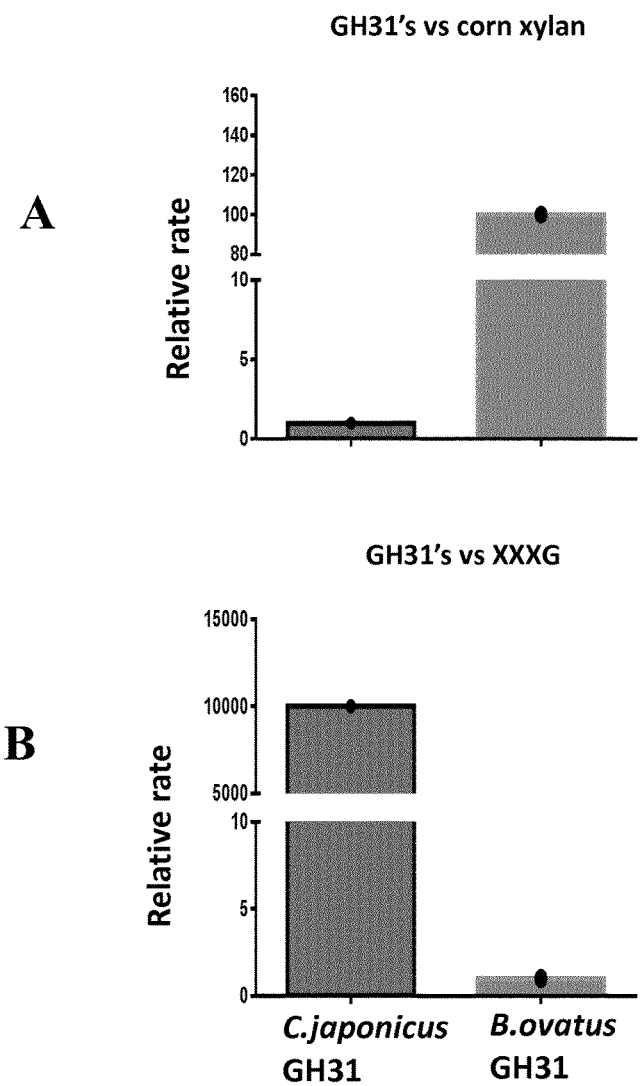

FIG. 6 also shows the difference between relative rates of GH31 (BACOVA_03422) and *C. japonicus* GH31 (ACE86259) against corn bran xylan and xyloglucan heptasaccharide (XXXG). *B. ovatus* GH31 α-xylosidase is about 100 times more active on corn xylan than *C. japonicus* GH31 α-xylosidase (panel A). Relative rates of the two enzymes on the xyloglucan heptasaccharide XXXG (panel B). *B. ovatus* GH31 α-xylosidase is about 10000 times less active on the XXXG oligosaccharide substrate than *C. japonicus* GH31 α-xylosidase (Example 2).

Figure 7:
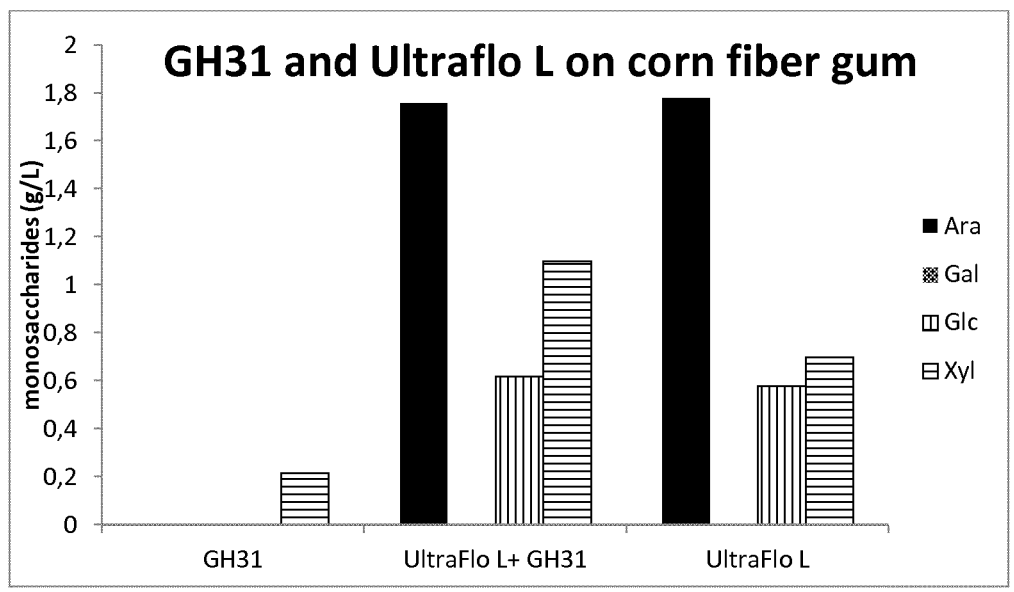

FIG. 7 shows (GH31): Monosaccharides released from corn fiber gum after three different enzyme treatments using the GH31 α-xylosidase, UltraFlo L and a combination. GH31 has a synergistic effect on the release of xylose from corn fiber gum when used together with UltraFlo L (Examples 3 and 4).

Figure 8:
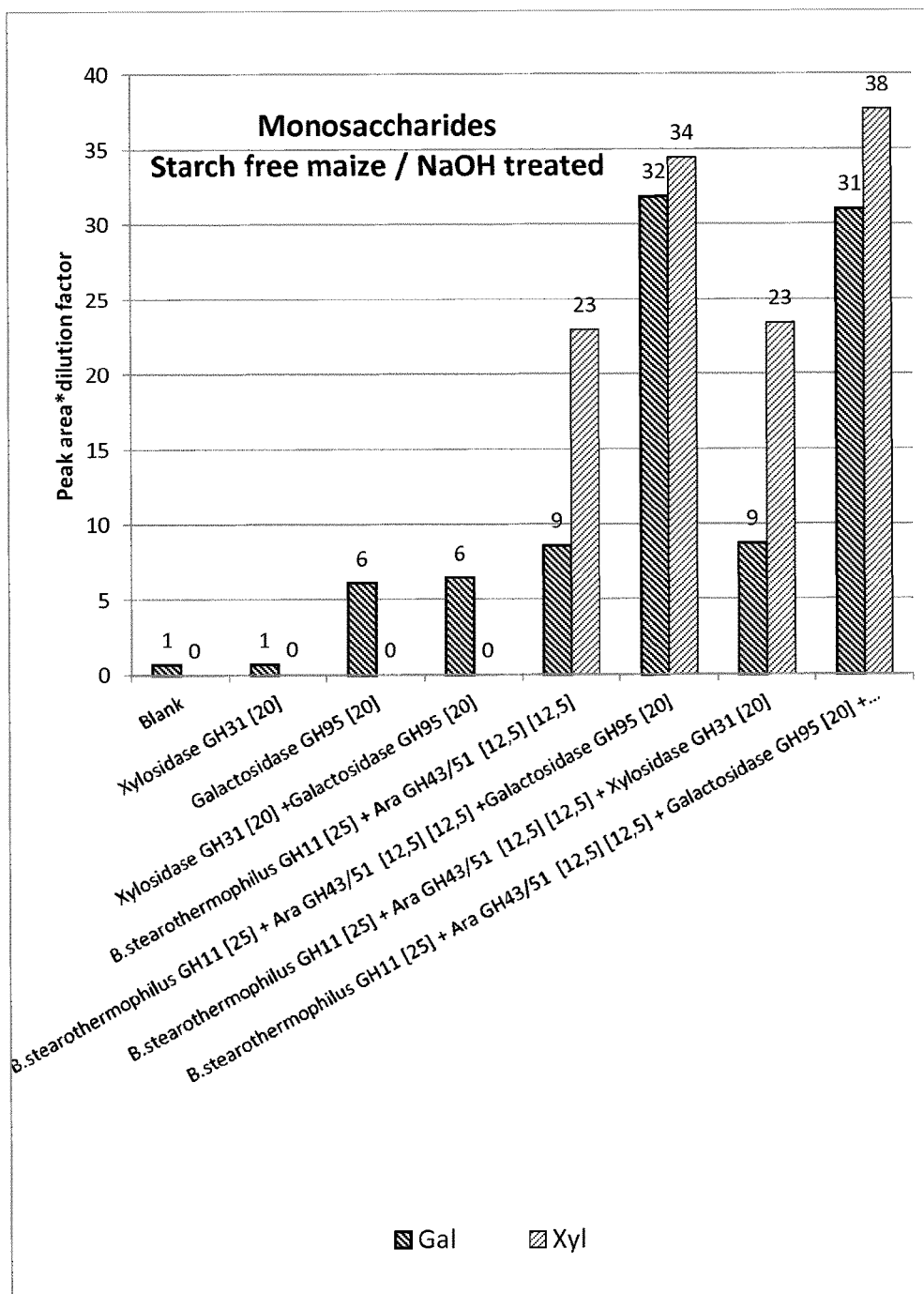

FIG. 8 shows the effect of GH31 α-xylosidase on released monosaccharides from destarched corn bran. Sugar levels are expressed as area under curve times a dilution factor. The figure also shows the effects of GH95 α-L-galactosidase and other enzymes (GH11, GH43/51 and combinations (Examples 3 and 4).

BRIEF DESCRIPTION OF THE SEQUENCE LISTING

In the sequence listing

SEQ ID NO: 1 shows the DNA sequence of the α-xylosidase as isolated from *Bacteroides ovatus* (ATCC 8483).

SEQ ID NO: 2 shows the amino acid sequence as deduced from SEQ ID NO: 1 (UNIPROT:A7LZZ5).

SEQ ID NO: 3 shows the amino acid sequence of the mature peptide from *Bacteroides ovatus* α-xylosidase.

SEQ ID NO: 4 shows the amino acid sequence of the mature peptide from *Bacteroides* CL SEQ ID NO: 5 shows the amino acid sequence of the mature peptide from *Bacteroides* sp. D22.

Identity Matrix of Sequences

| SEQ ID NO: | 2 | 3 | 4 | 5 |
|---|---|---|---|---|
| 2 | 100 | 99.2 | 98.8 | 99.3 |
| 3 | 99.2 | 100 | 98.2 | 99.0 |
| 4 | 98.8 | 98.2 | 100 | 98.6 |
| 5 | 99.3 | 99.0 | 98.6 | 100 |

Definitions

α-xylosidase: The term α-xylosidase means an enzyme displaying α-xylosidase activity (EC 3.2.1.177) that catalyzes the hydrolysis of α-xylosyl units in xylan. For purposes of the present invention, α-xylosidase activity is determined according to the procedure described in the Examples. In one aspect, the polypeptides of the present invention have at least 20%, e.g., at least 40%, at least 50%, at least 60%, at least 70%, at least 80%, at least 90%, at least 95%, or at least 100% of the α-xylosidase activity of the mature polypeptide of SEQ ID NO: 2.

Allelic variant: The term "allelic variant" means any of two or more alternative forms of a gene occupying the same chromosomal locus. Allelic variation arises naturally through mutation, and may result in polymorphism within populations. Gene mutations can be silent (no change in the encoded polypeptide) or may encode polypeptides having altered amino acid sequences. An allelic variant of a polypeptide is a polypeptide encoded by an allelic variant of a gene.

Catalytic domain: The term "catalytic domain" means the region of an enzyme containing the catalytic machinery of the enzyme.

cDNA: The term "cDNA" means a DNA molecule that can be prepared by reverse transcription from a mature, spliced, mRNA molecule obtained from a eukaryotic or prokaryotic cell. cDNA lacks intron sequences that may be present in the corresponding genomic DNA. The initial, primary RNA transcript is a precursor to mRNA that is processed through a series of steps, including splicing, before appearing as mature spliced mRNA.

Coding sequence: The term "coding sequence" means a polynucleotide, which directly specifies the amino acid sequence of a polypeptide. The boundaries of the coding sequence are generally determined by an open reading frame, which begins with a start codon such as ATG, GTG, or TTG and ends with a stop codon such as TAA, TAG, or TGA. The coding sequence may be a genomic DNA, cDNA, synthetic DNA, or a combination thereof.

Control sequences: The term "control sequences" means nucleic acid sequences necessary for expression of a polynucleotide encoding a mature polypeptide of the present invention. Each control sequence may be native (i.e., from the same gene) or foreign (i.e., from a different gene) to the polynucleotide encoding the polypeptide or native or foreign to each other. Such control sequences include, but are not limited to, a leader, polyadenylation sequence, propeptide sequence, promoter, signal peptide sequence, and transcription terminator. At a minimum, the control sequences include a promoter, and transcriptional and translational stop signals. The control sequences may be provided with linkers for the purpose of introducing specific restriction sites facilitating ligation of the control sequences with the coding region of the polynucleotide encoding a polypeptide.

Expression: The term "expression" includes any step involved in the production of a polypeptide including, but not limited to, transcription, post-transcriptional modification, translation, post-translational modification, and secretion.

Expression vector: The term "expression vector" means a linear or circular DNA molecule that comprises a polynucleotide encoding a polypeptide and is operably linked to control sequences that provide for its expression.

Fragment: The term "fragment" means a polypeptide or a catalytic domain having one or more (e.g., several) amino acids absent from the amino and/or carboxyl terminus of a mature polypeptide or domain; wherein the fragment has α-xylosidase activity. In one aspect, a fragment contains at least at least 85%, at least 90% or at least 95% of the amino acids of the mature peptide.

Host cell: The term "host cell" means any cell type that is susceptible to transformation, transfection, transduction, or the like with a nucleic acid construct or expression vector comprising a polynucleotide of the present invention. The term "host cell" encompasses any progeny of a parent cell that is not identical to the parent cell due to mutations that occur during replication.

Isolated: The term "isolated" means a substance in a form or environment that does not occur in nature. Non-limiting examples of isolated substances include (1) any non-naturally occurring substance, (2) any substance including, but not limited to, any enzyme, variant, nucleic acid, protein, peptide or cofactor, that is at least partially removed from one or more or all of the naturally occurring constituents with which it is associated in nature; (3) any substance modified by the hand of man relative to that substance found in nature; or (4) any substance modified by increasing the amount of the substance relative to other components with which it is naturally associated (e.g., recombinant production in a host cell; multiple copies of a gene encoding the substance; and use of a stronger promoter than the promoter naturally associated with the gene encoding the substance).

Mature polypeptide: The term "mature polypeptide" means a polypeptide in its final form following translation and any post-translational modifications, such as N-terminal processing, C-terminal truncation, glycosylation, phosphorylation, etc. In one aspect, the mature polypeptide is amino acids 1 to 793 (number 22 to 814 if counted with the signal peptide) of SEQ ID NO: 2 or SEQ ID NO: 3 based on the SignalP (Nielsen et al., 1997, Protein Engineering 10: 1-6) that indicates amino acids 1 to 21 of SEQ ID NO: 2 to be a signal peptide. It is known in the art that a host cell may produce a mixture of two or more different mature polypeptides (i.e., with a different C-terminal and/or N-terminal amino acid) expressed by the same polynucleotide. It is also known in the art that different host cells process polypeptides differently, and thus, one host cell expressing a polynucleotide may produce a different mature polypeptide (e.g., having a different C-terminal and/or N-terminal amino acid) as compared to another host cell expressing the same polynucleotide. In one aspect, a mature polypeptide contains up to 105%, 110%, or 115% of the number of amino acids of the mature polypeptide.

Mature polypeptide coding sequence: The term "mature polypeptide coding sequence" means a polynucleotide that encodes a mature polypeptide having α-xylosidase activity. In one aspect, the mature polypeptide coding sequence is nucleotides 64 to 2442 of SEQ ID NO: 1 based on SignalP (Nielsen et al., 1997, supra) that predicts nucleotides 1 to 63 of SEQ ID NO: 1 encode a signal peptide.

Nucleic acid construct: The term "nucleic acid construct" means a nucleic acid molecule, either single- or double-stranded, which is isolated from a naturally occurring gene or is modified to contain segments of nucleic acids in a manner that would not otherwise exist in nature or which is synthetic, which comprises one or more control sequences.

Operably linked: The term "operably linked" means a configuration in which a control sequence is placed at an appropriate position relative to the coding sequence of a polynucleotide such that the control sequence directs expression of the coding sequence.

Sequence identity: The relatedness between two amino acid sequences or between two nucleotide sequences is described by the parameter "sequence identity.

For purposes of the present invention, the sequence identity between two amino acid sequences is determined using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, *Trends Genet.* 16: 276-277), preferably version 5.0.0 or later. The parameters used are gap open penalty of 10, gap extension penalty of 0.5, and the EBLOSUM62 (EMBOSS version of BLOSUM62) substitution matrix. The output of Needle labeled "longest identity" (obtained using the -nobrief option) is used as the percent identity and is calculated as follows:

(Identical Residues×100)/(Length of Alignment–
Total Number of Gaps in Alignment)

For purposes of the present invention, the sequence identity between two deoxyribonucleotide sequences is determined using the Needleman-Wunsch algorithm (Needleman and Wunsch, 1970, supra) as implemented in the Needle program of the EMBOSS package (EMBOSS: The European Molecular Biology Open Software Suite, Rice et al., 2000, supra), preferably version 5.0.0 or later. The parameters used are gap open penalty of 10, gap extension penalty of 0.5, and the EDNAFULL (EMBOSS version of NCBI NUC4.4) substitution matrix. The output of Needle labeled "longest identity" (obtained using the -nobrief option) is used as the percent identity and is calculated as follows:

(Identical Deoxyribonucleotides×100)/(Length of
Alignment–Total Number of Gaps in Alignment)

Stringency conditions: The different stringency conditions are defined as follows The term "very low stringency conditions" means for probes of at least 100 nucleotides in length, prehybridization and hybridization at 42° C. in 5×SSPE, 0.3% SDS, 200 micrograms/ml sheared and denatured salmon sperm DNA, and 25% formamide, following standard Southern blotting procedures for 12 to 24 hours. The carrier material is finally washed three times each for 15 minutes using 2×SSC, 0.2% SDS at 45° C.

The term "low stringency conditions" means for probes of at least 100 nucleotides in length, prehybridization and hybridization at 42° C. in 5×SSPE, 0.3% SDS, 200 micrograms/ml sheared and denatured salmon sperm DNA, and 25% formamide, following standard Southern blotting procedures for 12 to 24 hours. The carrier material is finally washed three times each for 15 minutes using 2×SSC, 0.2% SDS at 50° C.

The term "medium stringency conditions" means for probes of at least 100 nucleotides in length, prehybridization and hybridization at 42° C. in 5×SSPE, 0.3% SDS, 200 micrograms/ml sheared and denatured salmon sperm DNA, and 35% formamide, following standard Southern blotting procedures for 12 to 24 hours. The carrier material is finally washed three times each for 15 minutes using 2×SSC, 0.2% SDS at 55° C.

The term "medium-high stringency conditions" means for probes of at least 100 nucleotides in length, prehybridization and hybridization at 42° C. in 5×SSPE, 0.3% SDS, 200 micrograms/ml sheared and denatured salmon sperm DNA, and 35% formamide, following standard Southern blotting procedures for 12 to 24 hours. The carrier material is finally washed three times each for 15 minutes using 2×SSC, 0.2% SDS at 60° C.

The term "high stringency conditions" means for probes of at least 100 nucleotides in length, prehybridization and hybridization at 42° C. in 5×SSPE, 0.3% SDS, 200 micrograms/ml sheared and denatured salmon sperm DNA, and 50% formamide, following standard Southern blotting procedures for 12 to 24 hours. The carrier material is finally washed three times each for 15 minutes using 2×SSC, 0.2% SDS at 65° C.

The term "very high stringency conditions" means for probes of at least 100 nucleotides in length, prehybridization and hybridization at 42° C. in 5×SSPE, 0.3% SDS, 200 micrograms/ml sheared and denatured salmon sperm DNA, and 50% formamide, following standard Southern blotting procedures for 12 to 24 hours. The carrier material is finally washed three times each for 15 minutes using 2×SSC, 0.2% SDS at 70° C.

Subsequence: The term "subsequence" means a polynucleotide having one or more (e.g., several) nucleotides absent from the 5' and/or 3' end of a mature polypeptide coding sequence; wherein the subsequence encodes a fragment having α-xylosidase activity. In one aspect, a subsequence contains at least 85%, 90% or 95% of the nucleotides coding the mature polypeptide of SEQ ID NO: 2

Variant: The term "variant" means a polypeptide having α-xylosidase activity comprising an alteration, i.e., a substitution, insertion, and/or deletion, at one or more (e.g., several) positions. A substitution means replacement of the amino acid occupying a position with a different amino acid; a deletion means removal of one or more (e.g., several) amino acids, e.g., 1-5 amino acids, adjacent to the amino acid occupying a position; and an insertion means adding one or more (e.g., several) amino acids, e.g., 1-5 amino acids, adjacent to the amino acid occupying a position.

DETAILED DESCRIPTION OF THE INVENTION

Polypeptides Having α-Xylosidase Activity

In an embodiment, the present invention relates to the use in animal feed of isolated polypeptides having a sequence identity to the mature polypeptide of SEQ ID NO: 2 of at least 80%, at least 82%, at least 84%, at least 85%, at least 87%, at least 89%, at least 90%, at least 93%, at least 95%, at least 96%, at least 97%, at least 98%, at least 99%, or 100%, which have α-xylosidase activity. In one aspect, the polypeptides differ by up to 30, 25, 20, 19, 18, 17, 16, 15, 14, 13, 12, 11, or 10 amino acids, e.g., 1, 2, 3, 4, 5, 6, 7, 8, 9, or 10 amino acids, from the mature polypeptide of SEQ ID NO: 2.

The present invention also relates to the use in animal feed of isolated polypeptides having a sequence identity to the mature polypeptide of SEQ ID NO: 4 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%, which have α-xylosidase activity. In one aspect, the polypeptides differ by no than thirty-six amino acids, e.g., by thirty amino acids, by twenty-five amino acids, by twenty amino acids, by fifteen amino acids, by ten amino acids, by nine amino acids, by eight amino acids, by seven amino acids, by six amino acids, by five amino acids, by four amino acids, by three amino acids, by two amino acids, and by one amino acid from the mature polypeptide of SEQ ID NO: 4.

The present invention further relates to the use in animal feed of isolated polypeptides having a sequence identity to the mature polypeptide of SEQ ID NO: 5 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%, which have α-xylosidase activity. In one aspect, the polypeptides differ by no more than thirty-six amino acids, e.g., by thirty amino acids, by twenty-five amino acids, by twenty amino acids, by fifteen amino acids, by ten amino acids, by nine amino acids, by eight amino acids, by seven amino acids, by six amino acids, by five amino acids, by four amino acids, by three amino acids, by two amino acids, and by one amino acid from the mature polypeptide of SEQ ID NO: 5.

An embodiment of the invention uses a polypeptide or a polypeptide encoded by a polynucleotide in animal feed having at least 80% sequence identity to the (mature) polypeptide of SEQ ID NO: 2.

An embodiment of the invention uses a polypeptide or a polypeptide encoded by a polynucleotide in animal feed having at least 82% sequence identity to the (mature) polypeptide of SEQ ID NO: 2.

An embodiment of the invention uses a polypeptide or a polypeptide encoded by a polynucleotide in animal feed having at least 84% sequence identity to the (mature) polypeptide of SEQ ID NO: 2.

An embodiment of the invention uses a polypeptide or a polypeptide encoded by a polynucleotide in animal feed having at least 85% sequence identity to the (mature) polypeptide of SEQ ID NO: 2.

An embodiment of the invention uses a polypeptide or a polypeptide encoded by a polynucleotide in animal feed having at least 86% sequence identity to the (mature) polypeptide of SEQ ID NO: 2.

An embodiment of the invention uses a polypeptide or a polypeptide encoded by a polynucleotide in animal feed having at least 87% sequence identity to the (mature) polypeptide of SEQ ID NO: 2.

An embodiment of the invention uses a polypeptide or a polypeptide encoded by a polynucleotide in animal feed having at least 88% sequence identity to the (mature) polypeptide of SEQ ID NO: 2.

An embodiment of the invention uses a polypeptide or a polypeptide encoded by a polynucleotide in animal feed having at least 89% sequence identity to the (mature) polypeptide of SEQ ID NO: 2.

An embodiment of the invention uses a polypeptide or a polypeptide encoded by a polynucleotide in animal feed having at least 90% sequence identity to the (mature) polypeptide of SEQ ID NO: 2.

An embodiment of the invention uses a polypeptide or a polypeptide encoded by a polynucleotide for use in animal feed or detergents having at least 91% sequence identity to the (mature) polypeptide of SEQ ID NO: 2.

An embodiment of the invention uses a polypeptide or a polypeptide encoded by a polynucleotide in animal feed having at least 92% sequence identity to the (mature) polypeptide of SEQ ID NO: 2.

An embodiment of the invention uses a polypeptide or a polypeptide encoded by a polynucleotide in animal feed having at least 93% sequence identity to the (mature) polypeptide of SEQ ID NO: 2.

An embodiment of the invention uses a polypeptide or a polypeptide encoded by a polynucleotide in animal feed having at least 94% sequence identity to the (mature) polypeptide of SEQ ID NO: 2.

An embodiment of the invention uses a polypeptide or a polypeptide encoded by a polynucleotide in animal feed having at least 95% sequence identity to the (mature) polypeptide of SEQ ID NO: 2.

An embodiment of the invention uses a polypeptide or a polypeptide encoded by a polynucleotide in animal feed having at least 96% sequence identity to the (mature) polypeptide of SEQ ID NO: 2.

An embodiment of the invention uses a polypeptide or a polypeptide encoded by a polynucleotide in animal feed having at least 97% sequence identity to the (mature) polypeptide of SEQ ID NO: 2.

An embodiment of the invention uses a polypeptide or a polypeptide encoded by a polynucleotide in animal feed having at least 98% sequence identity to the (mature) polypeptide of SEQ ID NO: 2.

An embodiment of the invention uses a polypeptide or a polypeptide encoded by a polynucleotide in animal feed having at least 99% sequence identity to the (mature) polypeptide of SEQ ID NO: 2.

An embodiment of the invention uses a polypeptide or a polypeptide encoded by a polynucleotide in animal feed having 100% sequence identity to the (mature) polypeptide of SEQ ID NO: 2.

Each of the above embodiments also relate to not only SEQ ID NO:2, but also to any of SEQ ID NO:4 and 5. The invention therefore also relates to the following.

An embodiment of the invention uses a polypeptide or a polypeptide encoded by a polynucleotide in animal feed having at least 80% sequence identity to the (mature) polypeptide of SEQ ID NO: 4.

An embodiment of the invention uses a polypeptide or a polypeptide encoded by a polynucleotide in animal feed having at least 82% sequence identity to the (mature) polypeptide of SEQ ID NO: 4.

An embodiment of the invention uses a polypeptide or a polypeptide encoded by a polynucleotide in animal feed having at least 84% sequence identity to the (mature) polypeptide of SEQ ID NO: 4.

An embodiment of the invention uses a polypeptide or a polypeptide encoded by a polynucleotide in animal feed having at least 85% sequence identity to the (mature) polypeptide of SEQ ID NO: 4.

An embodiment of the invention uses a polypeptide or a polypeptide encoded by a polynucleotide in animal feed having at least 86% sequence identity to the (mature) polypeptide of SEQ ID NO: 4.

An embodiment of the invention uses a polypeptide or a polypeptide encoded by a polynucleotide in animal feed having at least 87% sequence identity to the (mature) polypeptide of SEQ ID NO: 4.

An embodiment of the invention uses a polypeptide or a polypeptide encoded by a polynucleotide in animal feed having at least 88% sequence identity to the (mature) polypeptide of SEQ ID NO: 4.

An embodiment of the invention uses a polypeptide or a polypeptide encoded by a polynucleotide in animal feed having at least 89% sequence identity to the (mature) polypeptide of SEQ ID NO: 4.

An embodiment of the invention uses a polypeptide or a polypeptide encoded by a polynucleotide in animal feed having at least 90% sequence identity to the (mature) polypeptide of SEQ ID NO: 4.

An embodiment of the invention uses a polypeptide or a polypeptide encoded by a polynucleotide for use in animal feed or detergents having at least 91% sequence identity to the (mature) polypeptide of SEQ ID NO: 4.

An embodiment of the invention uses a polypeptide or a polypeptide encoded by a polynucleotide in animal feed having at least 92% sequence identity to the (mature) polypeptide of SEQ ID NO: 4.

An embodiment of the invention uses a polypeptide or a polypeptide encoded by a polynucleotide in animal feed having at least 93% sequence identity to the (mature) polypeptide of SEQ ID NO: 4.

An embodiment of the invention uses a polypeptide or a polypeptide encoded by a polynucleotide in animal feed having at least 94% sequence identity to the (mature) polypeptide of SEQ ID NO: 4.

An embodiment of the invention uses a polypeptide or a polypeptide encoded by a polynucleotide in animal feed having at least 95% sequence identity to the (mature) polypeptide of SEQ ID NO: 4.

An embodiment of the invention uses a polypeptide or a polypeptide encoded by a polynucleotide in animal feed having at least 96% sequence identity to the (mature) polypeptide of SEQ ID NO: 4.

An embodiment of the invention uses a polypeptide or a polypeptide encoded by a polynucleotide in animal feed having at least 97% sequence identity to the (mature) polypeptide of SEQ ID NO: 4.

An embodiment of the invention uses a polypeptide or a polypeptide encoded by a polynucleotide in animal feed having at least 98% sequence identity to the (mature) polypeptide of SEQ ID NO: 4.

An embodiment of the invention uses a polypeptide or a polypeptide encoded by a polynucleotide in animal feed having at least 99% sequence identity to the (mature) polypeptide of SEQ ID NO: 4.

An embodiment of the invention uses a polypeptide or a polypeptide encoded by a polynucleotide in animal feed having 100% sequence identity to the (mature) polypeptide of SEQ ID NO: 4.

And

An embodiment of the invention uses a polypeptide or a polypeptide encoded by a polynucleotide in animal feed having at least 80% sequence identity to the (mature) polypeptide of SEQ ID NO: 5.

An embodiment of the invention uses a polypeptide or a polypeptide encoded by a polynucleotide in animal feed having at least 82% sequence identity to the (mature) polypeptide of SEQ ID NO: 5.

An embodiment of the invention uses a polypeptide or a polypeptide encoded by a polynucleotide in animal feed having at least 84% sequence identity to the (mature) polypeptide of SEQ ID NO: 5.

An embodiment of the invention uses a polypeptide or a polypeptide encoded by a polynucleotide in animal feed having at least 85% sequence identity to the (mature) polypeptide of SEQ ID NO: 5.

An embodiment of the invention uses a polypeptide or a polypeptide encoded by a polynucleotide in animal feed having at least 86% sequence identity to the (mature) polypeptide of SEQ ID NO: 5.

An embodiment of the invention uses a polypeptide or a polypeptide encoded by a polynucleotide in animal feed having at least 87% sequence identity to the (mature) polypeptide of SEQ ID NO: 5.

An embodiment of the invention uses a polypeptide or a polypeptide encoded by a polynucleotide in animal feed having at least 88% sequence identity to the (mature) polypeptide of SEQ ID NO: 5.

An embodiment of the invention uses a polypeptide or a polypeptide encoded by a polynucleotide in animal feed having at least 89% sequence identity to the (mature) polypeptide of SEQ ID NO: 5.

An embodiment of the invention uses a polypeptide or a polypeptide encoded by a polynucleotide in animal feed having at least 90% sequence identity to the (mature) polypeptide of SEQ ID NO: 5.

An embodiment of the invention uses a polypeptide or a polypeptide encoded by a polynucleotide for use in animal feed or detergents having at least 91% sequence identity to the (mature) polypeptide of SEQ ID NO: 5.

An embodiment of the invention uses a polypeptide or a polypeptide encoded by a polynucleotide in animal feed having at least 92% sequence identity to the (mature) polypeptide of SEQ ID NO: 5.

An embodiment of the invention uses a polypeptide or a polypeptide encoded by a polynucleotide in animal feed having at least 93% sequence identity to the (mature) polypeptide of SEQ ID NO: 5.

An embodiment of the invention uses a polypeptide or a polypeptide encoded by a polynucleotide in animal feed having at least 94% sequence identity to the (mature) polypeptide of SEQ ID NO: 5.

An embodiment of the invention uses a polypeptide or a polypeptide encoded by a polynucleotide in animal feed having at least 95% sequence identity to the (mature) polypeptide of SEQ ID NO: 5.

An embodiment of the invention uses a polypeptide or a polypeptide encoded by a polynucleotide in animal feed having at least 96% sequence identity to the (mature) polypeptide of SEQ ID NO: 5.

An embodiment of the invention uses a polypeptide or a polypeptide encoded by a polynucleotide in animal feed having at least 97% sequence identity to the (mature) polypeptide of SEQ ID NO: 5.

An embodiment of the invention uses a polypeptide or a polypeptide encoded by a polynucleotide in animal feed having at least 98% sequence identity to the (mature) polypeptide of SEQ ID NO: 5.

An embodiment of the invention uses a polypeptide or a polypeptide encoded by a polynucleotide in animal feed having at least 99% sequence identity to the (mature) polypeptide of SEQ ID NO: 5.

An embodiment of the invention uses a polypeptide or a polypeptide encoded by a polynucleotide in animal feed having 100% sequence identity to the (mature) polypeptide of SEQ ID NO: 5.

A polypeptide to be used in the present invention preferably comprises or consists of the amino acid sequence of SEQ ID NO: 2, SEQ ID NO: 4 and/or SEQ ID NO: 5 or an allelic variant thereof; or is a fragment thereof missing e.g. 30, 25, 20, 15, 10 or 5 amino acids from the N- and/or C-terminal and having α-xylosidase activity. In another aspect, the polypeptide comprises or consists of the mature polypeptide of SEQ ID NO: 2, SEQ ID NO: 4 and/or SEQ ID NO: 5. In another aspect, the polypeptide comprises or consists of amino acids 22 to 814 of SEQ ID NO: 2, amino acids 22 to 814 of SEQ ID NO: 4 and/or amino acids 22 to 814 of SEQ ID NO: 5.

In another embodiment, the present invention relates to the use in animal feed of an isolated polypeptide having α-xylosidase activity encoded by a polynucleotide that hybridizes under high stringency conditions, or very high stringency conditions with (i) the mature polypeptide coding sequence of SEQ ID NO: 1, or (ii) the full-length complement of (i) (Sambrook et al., 1989, *Molecular Cloning, A Laboratory Manual*, 2d edition, Cold Spring Harbor, N.Y.).

The polynucleotide of SEQ ID NO: 1 or a subsequence thereof, as well as the polypeptide of SEQ ID NO: 2 or a fragment thereof, may be used to design nucleic acid probes to identify and clone DNA encoding polypeptides having α-xylosidase activity from strains of different genera or species according to methods well known in the art. In particular, such probes can be used for hybridization with the genomic DNA or cDNA of a cell of interest, following standard Southern blotting procedures, in order to identify and isolate the corresponding gene therein. Such probes can be considerably shorter than the entire sequence, but should be at least 15, e.g., at least 25, at least 35, or at least 70 nucleotides in length. Preferably, the nucleic acid probe is at least 100 nucleotides in length, e.g., at least 200 nucleotides, at least 300 nucleotides, at least 400 nucleotides, at least 500 nucleotides, at least 600 nucleotides, at least 700 nucleotides, at least 800 nucleotides, or at least 900 nucleotides in length. Both DNA and RNA probes can be used. The probes are typically labeled for detecting the corresponding gene (for example, with $^{32}P$, $^{3}H$, $^{35}S$, biotin, or avidin). Such probes are encompassed by the present invention.

A genomic DNA or cDNA library prepared from such other strains may be screened for DNA that hybridizes with the probes described above and encodes a polypeptide having alpha xylosidase activity. Genomic or other DNA from such other strains may be separated by agarose or polyacrylamide gel electrophoresis, or other separation techniques. DNA from the libraries or the separated DNA may be transferred to and immobilized on nitrocellulose or other suitable carrier material. In order to identify a clone or DNA that hybridizes with SEQ ID NO: 1 or a subsequence thereof, the carrier material is used in a Southern blot.

For purposes of the present invention, hybridization indicates that the polynucleotide hybridizes to a labeled nucleic acid probe corresponding to (i) SEQ ID NO: 1; (ii) the mature polypeptide coding sequence of SEQ ID NO: 1; (iii) the full-length complement thereof; or (iv) a subsequence thereof; under very low to very high stringency conditions. Molecules to which the nucleic acid probe hybridizes under these conditions can be detected using, for example, X-ray film or any other detection means known in the art.

In one aspect, the nucleic acid probe is the mature polypeptide coding sequence of SEQ ID NO: 1. In another aspect, the nucleic acid probe is a polynucleotide that encodes the polypeptide of SEQ ID NO: 2; the mature polypeptide thereof; or a fragment thereof. In another aspect, the nucleic acid probe is SEQ ID NO: 1. In another aspect, the nucleic acid probe is the mature polypeptide coding region contained in *B. Ovatum* ATCC-8483.

For long probes of at least 100 nucleotides in length, high to very high stringency conditions are defined as prehybridization and hybridization at 42° C. in 5×SSPE, 0.3% SDS, 200 micrograms/ml sheared and denatured salmon sperm DNA, and either 25% formamide for very low and low stringencies, 35% formamide for medium and medium-high stringencies, or 50% formamide for high and very high stringencies, following standard Southern blotting procedures for 12 to 24 hours optimally. The carrier material is finally washed three times each for 15 minutes using 2×SSC, 0.2% SDS at 65° C. (high stringency), and at 70° C. (very high stringency).

For short probes of about 15 nucleotides to about 70 nucleotides in length, stringency conditions are defined as prehybridization and hybridization at about 5° C. to about 10° C. below the calculated $T_m$ using the calculation according to Bolton and McCarthy (1962, *Proc. Natl. Acad. Sci. USA* 48:1390) in 0.9 M NaCl, 0.09 M Tris-HCl pH 7.6, 6 mM EDTA, 0.5% NP-40, 1×Denhardt's solution, 1 mM sodium pyrophosphate, 1 mM sodium monobasic phosphate, 0.1 mM ATP, and 0.2 mg of yeast RNA per ml following standard Southern blotting procedures for 12 to 24 hours optimally. The carrier material is finally washed once in 6×SCC plus 0.1% SDS for 15 minutes and twice each for 15 minutes using 6×SSC at 5° C. to 10° C. below the calculated $T_m$.

In another embodiment, the present invention relates to an isolated polypeptide for use in animal feed having α-xylosidase activity encoded by a polynucleotide having a sequence identity to the mature polypeptide coding sequence of SEQ ID NO: 1 of at least 97.8%, at least 98%, at least 99%, or 100%.

In another embodiment, the present invention relates to variants for use in animal feed of the mature polypeptide of SEQ ID NO: 2 comprising a substitution, deletion, and/or insertion at one or more (e.g., several) positions. In an embodiment, the number of amino acid substitutions, deletions and/or insertions introduced into the mature polypeptide of SEQ ID NO: 2 is up to 10, e.g., 1, 2, 3, 4, 5, 6, 7, 8, 9, or 10. The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function, such as a poly-histidine tract, an antigenic epitope or a binding domain.

Examples of conservative substitutions are within the groups of basic amino acids (arginine, lysine and histidine), acidic amino acids (glutamic acid and aspartic acid), polar amino acids (glutamine and asparagine), hydrophobic amino acids (leucine, isoleucine and valine), aromatic amino acids (phenylalanine, tryptophan and tyrosine), and small amino acids (glycine, alanine, serine, threonine and methionine). Amino acid substitutions that do not generally alter specific activity are known in the art and are described, for example, by H. Neurath and R. L. Hill, 1979, In, *The Proteins*, Academic Press, New York. Common substitutions are Ala/Ser, Val/Ile, Asp/Glu, Thr/Ser, Ala/Gly, Ala/Thr, Ser/

Asn, Ala/Val, Ser/Gly, Tyr/Phe, Ala/Pro, Lys/Arg, Asp/Asn, Leu/Ile, Leu/Val, Ala/Glu, and Asp/Gly.

Alternatively, the amino acid changes are of such a nature that the physico-chemical properties of the polypeptides are altered. For example, amino acid changes may improve the thermal stability of the polypeptide, alter the substrate specificity, change the pH optimum, and the like.

Essential amino acids in a polypeptide can be identified according to procedures known in the art, such as site-directed mutagenesis or alanine-scanning mutagenesis (Cunningham and Wells, 1989, *Science* 244: 1081-1085). In the latter technique, single alanine mutations are introduced at every residue in the molecule, and the resultant mutant molecules are tested for activity to identify amino acid residues that are critical to the activity of the molecule. See also, Hilton et al., 1996, *J. Biol. Chem.* 271: 4699-4708. The active site of the enzyme or other biological interaction can also be determined by physical analysis of structure, as determined by such techniques as nuclear magnetic resonance, crystallography, electron diffraction, or photoaffinity labeling, in conjunction with mutation of putative contact site amino acids. See, for example, de Vos et al., 1992, *Science* 255: 306-312; Smith et al., 1992, *J. Mol. Biol.* 224: 899-904; Wlodaver et al., 1992, *FEBS Lett.* 309: 59-64. The identity of essential amino acids can also be inferred from an alignment with a related polypeptide. The catalytic residues of SEQ ID NO:2 are the nucleophile Asp 400 (no. 36 in FIG. 1) and the acid/base Asp 473 (no. 102 in FIG. 1) based upon homology with other GH31 hydrolases (see the alignment in FIG. 1).

Single or multiple amino acid substitutions, deletions, and/or insertions can be made and tested using known methods of mutagenesis, recombination, and/or shuffling, followed by a relevant screening procedure, such as those disclosed by Reidhaar-Olson and Sauer, 1988, *Science* 241: 53-57; Bowie and Sauer, 1989, *Proc. Natl. Acad. Sci. USA* 86: 2152-2156; WO 95/17413; or WO 95/22625. Other methods that can be used include error-prone PCR, phage display (e.g., Lowman et al., 1991, *Biochemistry* 30: 10832-10837; U.S. Pat. No. 5,223,409; WO 92/06204), and region-directed mutagenesis (Derbyshire et al., 1986, *Gene* 46: 145; Ner et al., 1988, *DNA* 7: 127).

Mutagenesis/shuffling methods can be combined with high-throughput, automated screening methods to detect activity of cloned, mutagenized polypeptides expressed by host cells (Ness et al., 1999, *Nature Biotechnology* 17: 893-896). Mutagenized DNA molecules that encode active polypeptides can be recovered from the host cells and rapidly sequenced using standard methods in the art. These methods allow the rapid determination of the importance of individual amino acid residues in a polypeptide.

The polypeptide may be a hybrid polypeptide in which a region of one polypeptide is fused at the N-terminus or the C-terminus of a region of another polypeptide.

The polypeptide may be a fusion polypeptide or cleavable fusion polypeptide in which another polypeptide is fused at the N-terminus or the C-terminus of the polypeptide of the present invention. A fusion polypeptide is produced by fusing a polynucleotide encoding another polypeptide to a polynucleotide of the present invention. Techniques for producing fusion polypeptides are known in the art, and include ligating the coding sequences encoding the polypeptides so that they are in frame and that expression of the fusion polypeptide is under control of the same promoter(s) and terminator. Fusion polypeptides may also be constructed using intein technology in which fusion polypeptides are created post-translationally (Cooper et al., 1993, *EMBO J.* 12: 2575-2583; Dawson et al., 1994, *Science* 266: 776-779).

A fusion polypeptide can further comprise a cleavage site between the two polypeptides. Upon secretion of the fusion protein, the site is cleaved releasing the two polypeptides. Examples of cleavage sites include, but are not limited to, the sites disclosed in Martin et al., 2003, *J. Ind. Microbiol. Biotechnol.* 3: 568-576; Svetina et al., 2000, *J. Biotechnol.* 76: 245-251; Rasmussen-Wilson et al., 1997, *Appl. Environ. Microbiol.* 63: 3488-3493; Ward et al., 1995, *Biotechnology* 13: 498-503; and Contreras et al., 1991, *Biotechnology* 9: 378-381; Eaton et al., 1986, *Biochemistry* 25: 505-512; Collins-Racie et al., 1995, *Biotechnology* 13: 982-987; Carter et al., 1989, *Proteins: Structure, Function, and Genetics* 6: 240-248; and Stevens, 2003, *Drug Discovery World* 4: 35-48.

Sources of Polypeptides Having α-Xylosidase Activity

A polypeptide having α-xylosidase activity of the present invention may be obtained from microorganisms of any genus. For purposes of the present invention, the term "obtained from" as used herein in connection with a given source shall mean that the polypeptide encoded by a polynucleotide is produced by the source or by a strain in which the polynucleotide from the source has been inserted. In one aspect, the polypeptide obtained from a given source is secreted extracellularly.

The polypeptide may be a bacterial polypeptide. For example, the polypeptide may be a Gram-negative bacterial polypeptide such as a *Bacteroides, Campylobacter, E. coli, Flavobacterium, Fusobacterium, Helicobacter, Ilyobacter, Neisseria, Pseudomonas, Salmonella,* or *Ureaplasma* polypeptide or a Gram-positive bacterial polypeptide such as a *Bacillus, Clostridium, Enterococcus, Geobacillus, Lactobacillus, Lactococcus, Oceanobacillus, Staphylococcus, Streptococcus,* or *Streptomyces* polypeptide having alpha xylosidase activity.

In one aspect, the polypeptide is a *Bacteroides ovatus, Bacteroides acidifaciens, Bacteroides gracilis, Bacteroides oris, Bacteroides putredinis, Bacteroides pyogenes* or *Bacteroides vulgatus* polypeptide.

In another aspect, the polypeptide is a *Bacteroides ovatus* polypeptide, e.g., a polypeptide obtained from *Bacteroides ovatus* ATCC 8483.

In another aspect, the polypeptide is a *Bacillus alkalophilus, Bacillus amyloliquefaciens, Bacillus brevis, Bacillus circulans, Bacillus clausii, Bacillus coagulans, Bacillus firmus, Bacillus lautus, Bacillus lentus, Bacillus licheniformis, Bacillus megaterium, Bacillus pumilus, Bacillus stearothermophilus, Bacillus subtilis,* or *Bacillus thuringiensis* polypeptide.

In another aspect, the polypeptide is a *Streptococcus equisimilis, Streptococcus pyogenes, Streptococcus uberis,* or *Streptococcus equi* subsp. *Zooepidemicus* polypeptide.

In another aspect, the polypeptide is a *Streptomyces achromogenes, Streptomyces avermitilis, Streptomyces coelicolor, Streptomyces griseus,* or *Streptomyces lividans* polypeptide.

The polypeptide may be a fungal polypeptide. For example, the polypeptide may be a yeast polypeptide such as a *Candida, Kluyveromyces, Pichia, Saccharomyces, Schizosaccharomyces,* or *Yarrowia* polypeptide; or a filamentous fungal polypeptide such as an *Acremonium, Agaricus, Alternaria, Aspergillus, Aureobasidium, Botryosphaeria, Ceriporiopsis, Chaetomidium, Chrysosporium, Claviceps, Cochliobolus, Coprinopsis, Coptotermes, Corynascus, Cryphonectria, Cryptococcus, Diplodia, Exidia, Filibasidium, Fusarium, Gibberella, Holomastigotoides, Humi-* cola, Irpex, Lentinula, Leptospaeria, Magnaporthe, Melanocarpus, Meripilus, Mucor, Myceliophthora, Neocallimastix, Neurospora, Paecilomyces, Penicillium, Phanerochaete, Piromyces, Poitrasia, Pseudoplectania, Pseudotrichonympha, Rhizomucor, Schizophyllum, Scytalidium, Talaromyces, Thermoascus, Thielavia, Tolypocladium, Trichoderma, Trichophaea, Verticillium, Volvariella, or Xylaria polypeptide.

In another aspect, the polypeptide is a Saccharomyces carlsbergensis, Saccharomyces cerevisiae, Saccharomyces diastaticus, Saccharomyces douglasii, Saccharomyces kluyveri, Saccharomyces norbensis, or Saccharomyces oviformis polypeptide.

In another aspect, the polypeptide is an Acremonium cellulolyticus, Aspergillus aculeatus, Aspergillus awamori, Aspergillus foetidus, Aspergillus fumigatus, Aspergillus japonicus, Aspergillus nidulans, Aspergillus niger, Aspergillus oryzae, Chrysosporium inops, Chrysosporium keratinophilum, Chrysosporium lucknowense, Chrysosporium merdarium, Chrysosporium pannicola, Chrysosporium queenslandicum, Chrysosporium tropicum, Chrysosporium zonatum, Fusarium bactridioides, Fusarium cerealis, Fusarium crookwellense, Fusarium culmorum, Fusarium graminearum, Fusarium graminum, Fusarium heterosporum, Fusarium negundi, Fusarium oxysporum, Fusarium reticulatum, Fusarium roseum, Fusarium sambucinum, Fusarium sarcochroum, Fusarium sporotrichioides, Fusarium sulphureum, Fusarium torulosum, Fusarium trichothecioides, Fusarium venenatum, Humicola grisea, Humicola insolens, Humicola lanuginosa, Irpex lacteus, Mucor miehei, Myceliophthora thermophila, Neurospora crassa, Penicillium funiculosum, Penicillium purpurogenum, Phanerochaete chrysosporium, Thielavia achromatica, Thielavia albomyces, Thielavia albopilosa, Thielavia australeinsis, Thielavia fimeti, Thielavia microspora, Thielavia ovispora, Thielavia peruviana, Thielavia setosa, Thielavia spededonium, Thielavia subthermophila, Thielavia terrestris, Trichoderma harzianum, Trichoderma koningii, Trichoderma longibrachiatum, Trichoderma reesei, or Trichoderma viride polypeptide.

It will be understood that for the aforementioned species, the invention encompasses both the perfect and imperfect states, and other taxonomic equivalents, e.g., anamorphs, regardless of the species name by which they are known. Those skilled in the art will readily recognize the identity of appropriate equivalents.

Strains of these species are readily accessible to the public in a number of culture collections, such as the American Type Culture Collection (ATCC), Deutsche Sammlung von Mikroorganismen and Zellkulturen GmbH (DSMZ), Centraalbureau Voor Schimmelcultures (CBS), and Agricultural Research Service Patent Culture Collection, Northern Regional Research Center (NRRL).

The polypeptide may be identified and obtained from other sources including microorganisms isolated from nature (e.g., soil, composts, water, etc.) or DNA samples obtained directly from natural materials (e.g., soil, composts, water, etc.) using the above-mentioned probes. Techniques for isolating microorganisms and DNA directly from natural habitats are well known in the art. A polynucleotide encoding the polypeptide may then be obtained by similarly screening a genomic DNA or cDNA library of another microorganism or mixed DNA sample. Once a polynucleotide encoding a polypeptide has been detected with the probe(s), the polynucleotide can be isolated or cloned by utilizing techniques that are known to those of ordinary skill in the art (see, e.g., Sambrook et al., 1989, supra).

Catalytic Domains

In one embodiment, the present invention also relates to catalytic domains having a sequence identity to amino acids 22 to 814 of SEQ ID NO: 2 of at least 97.8%, at least 80%, at least 85%, at least 86%, at least 87%, at least 88%, at least 89%, least 90%, at least 91%, at least 92%, at least 93%, at least 94%, at least 95%, at least 96%, at least 97%, at least 98%, at least 99%, least 92%, at least 95%, at least 96%, at least 97%, at least 98%, at least 99%, or 100%. In one aspect, the catalytic domains comprise amino acid sequences that differ by up to 10 amino acids, e.g., 1, 2, 3, 4, 5, 6, 7, 8, 9, or 10, from amino acids 22 to 814 of SEQ ID NO: 2.

The catalytic domain preferably comprises or consists of amino acids 1 to 793 of SEQ ID NO: 2 or an allelic variant thereof; or is a fragment thereof having alpha xylosidase activity.

In another embodiment, the present invention also relates to catalytic domains encoded by polynucleotides that hybridize under very low stringency conditions, low stringency conditions, medium stringency conditions, medium-high stringency conditions, high stringency conditions, or very high stringency conditions (as defined above) with (i) the nucleotides 64 to 2442 of SEQ ID NO: 1, or (iii) the full-length complement of (i) (Sambrook et al., 1989, supra).

In another embodiment, the present invention also relates to catalytic domains encoded by polynucleotides having a sequence identity to nucleotides 64 to 2442 of SEQ ID NO: 1 of at least 80%, at least 85%, at least 86%, at least 87%, at least 88%, at least 89%, least 90%, at least 91%, at least 92%, at least 93%, at least 94%, at least 95%, at least 96%, at least 97%, at least 98%, at least 99%, least 92%, at least 95%, at least 96%, at least 97%, at least 98%, at least 99%, or 100%.

The polynucleotide encoding the catalytic domain preferably comprises or consists of nucleotides 64 to 2442 of SEQ ID NO: 1 or is the sequence contained in ATCC 8483.

In another embodiment, the present invention also relates to catalytic domain variants of amino acids 22 to 814 SEQ ID NO: 2 comprising a substitution, deletion, and/or insertion at one or more (e.g., several) positions. In one aspect, the number of amino acid substitutions, deletions and/or insertions introduced into the sequence of amino acids 22 to 814 of SEQ ID NO: 2 is up to 10, e.g., 1, 2, 3, 4, 5, 6, 8, 9, or 10.

Polynucleotides

The present invention also relates to isolated polynucleotides encoding a polypeptide, a catalytic domain as described herein.

The techniques used to isolate or clone a polynucleotide are known in the art and include isolation from genomic DNA or cDNA, or a combination thereof. The cloning of the polynucleotides from genomic DNA can be effected, e.g., by using the well-known polymerase chain reaction (PCR) or antibody screening of expression libraries to detect cloned DNA fragments with shared structural features. See, e.g., Innis et al., 1990, PCR: A Guide to Methods and Application, Academic Press, New York. Other nucleic acid amplification procedures such as ligase chain reaction (LCR), ligation activated transcription (LAT) and polynucleotide-based amplification (NASBA) may be used. The polynucleotides may be cloned from a strain of Bacteroides, or a related organism and thus, for example, may be an allelic or species variant of the polypeptide encoding region of the polynucleotide.

Modification of a polynucleotide encoding a polypeptide of the present invention may be necessary for synthesizing polypeptides substantially similar to the polypeptide. The term "substantially similar" to the polypeptide refers to non-naturally occurring forms of the polypeptide. These polypeptides may differ in some engineered way from the polypeptide isolated from its native source, e.g., variants that differ in specific activity, thermostability, pH optimum, or the like. The variants may be constructed on the basis of the polynucleotide presented as the mature polypeptide coding sequence of SEQ ID NO: 1

Nucleic Acid Constructs

The present invention also relates to nucleic acid constructs comprising a polynucleotide of the present invention operably linked to one or more control sequences that direct the expression of the coding sequence in a suitable host cell under conditions compatible with the control sequences.

The polynucleotide may be manipulated in a variety of ways to provide for expression of the polypeptide. Manipulation of the polynucleotide prior to its insertion into a vector may be desirable or necessary depending on the expression vector. The techniques for modifying polynucleotides utilizing recombinant DNA methods are well known in the art.

The control sequence may be a promoter, a polynucleotide that is recognized by a host cell for expression of a polynucleotide encoding a polypeptide of the present invention. The promoter contains transcriptional control sequences that mediate the expression of the polypeptide. The promoter may be any polynucleotide that shows transcriptional activity in the host cell including mutant, truncated, and hybrid promoters, and may be obtained from genes encoding extracellular or intracellular polypeptides either homologous or heterologous to the host cell.

Examples of suitable promoters for directing transcription of the nucleic acid constructs of the present invention in a bacterial host cell are the promoters obtained from the *Bacillus amyloliquefaciens* alpha-amylase gene (amyQ), *Bacillus licheniformis* alpha-amylase gene (amyL), *Bacillus licheniformis* penicillinase gene (penP), *Bacillus stearothermophilus* maltogenic amylase gene (amyM), *Bacillus subtilis* levansucrase gene (sacB), *Bacillus subtilis* xylA and xylB genes, *Bacillus thuringiensis* cryIIIA gene (Agaisse and Lereclus, 1994, *Molecular Microbiology* 13: 97-107), *E. coli* lac operon, *E. coli* trc promoter (Egon et al., 1988, *Gene* 69: 301-315), *Streptomyces coelicolor* agarase gene (dagA), and prokaryotic beta-lactamase gene (Villa-Kamaroff et al., 1978, *Proc. Natl. Acad. Sci. USA* 75: 3727-3731), as well as the tac promoter (DeBoer et al., 1983, *Proc. Natl. Acad. Sci. USA* 80: 21-25). Further promoters are described in "Useful proteins from recombinant bacteria" in Gilbert et al., 1980, *Scientific American* 242: 74-94; and in Sambrook et al., 1989, supra. Examples of tandem promoters are disclosed in WO 99/43835.

Examples of suitable promoters for directing transcription of the nucleic acid constructs of the present invention in a filamentous fungal host cell are promoters obtained from the genes for *Aspergillus nidulans* acetamidase, *Aspergillus niger* neutral alpha-amylase, *Aspergillus niger* acid stable alpha-amylase, *Aspergillus niger* or *Aspergillus awamori* glucoamylase (glaA), *Aspergillus oryzae* TAKA amylase, *Aspergillus oryzae* alkaline protease, *Aspergillus oryzae* triose phosphate isomerase, *Fusarium oxysporum* trypsin-like protease (WO 96/00787), *Fusarium venenatum* amyloglucosidase (WO 00/56900), *Fusarium venenatum* Daria (WO 00/56900), *Fusarium venenatum* Quinn (WO 00/56900), *Rhizomucor miehei* lipase, *Rhizomucor miehei* aspartic proteinase, *Trichoderma reesei* beta-glucosidase, *Trichoderma reesei* cellobiohydrolase I, *Trichoderma reesei* cellobiohydrolase II, *Trichoderma reesei* endoglucanase I, *Trichoderma reesei* endoglucanase II, *Trichoderma reesei* endoglucanase III, *Trichoderma reesei* endoglucanase V, *Trichoderma reesei* xylanase I, *Trichoderma reesei* xylanase II, *Trichoderma reesei* xylanase III, *Trichoderma reesei* beta-xylosidase, and *Trichoderma reesei* translation elongation factor, as well as the NA2-tpi promoter (a modified promoter from an *Aspergillus* neutral alpha-amylase gene in which the untranslated leader has been replaced by an untranslated leader from an *Aspergillus* triose phosphate isomerase gene; non-limiting examples include modified promoters from an *Aspergillus niger* neutral alpha-amylase gene in which the untranslated leader has been replaced by an untranslated leader from an *Aspergillus nidulans* or *Aspergillus oryzae* triose phosphate isomerase gene); and mutant, truncated, and hybrid promoters thereof. Other promoters are described in U.S. Pat. No. 6,011,147.

In a yeast host, useful promoters are obtained from the genes for *Saccharomyces cerevisiae* enolase (ENO-1), *Saccharomyces cerevisiae* galactokinase (GAL1), *Saccharomyces cerevisiae* alcohol dehydrogenase/glyceraldehyde-3-phosphate dehydrogenase (ADH1, ADH2/GAP), *Saccharomyces cerevisiae* triose phosphate isomerase (TPI), *Saccharomyces cerevisiae* metallothionein (CUP1), and *Saccharomyces cerevisiae* 3-phosphoglycerate kinase. Other useful promoters for yeast host cells are described by Romanos et al., 1992, *Yeast* 8: 423-488.

The control sequence may also be a transcription terminator, which is recognized by a host cell to terminate transcription. The terminator is operably linked to the 3'-terminus of the polynucleotide encoding the polypeptide. Any terminator that is functional in the host cell may be used in the present invention.

Preferred terminators for bacterial host cells are obtained from the genes for *Bacillus clausii* alkaline protease (aprH), *Bacillus licheniformis* alpha-amylase (amyL), and *Escherichia coli* ribosomal RNA (rrnB).

Preferred terminators for filamentous fungal host cells are obtained from the genes for *Aspergillus nidulans* acetamidase, *Aspergillus nidulans* anthranilate synthase, *Aspergillus niger* glucoamylase, *Aspergillus niger* alpha-glucosidase, *Aspergillus oryzae* TAKA amylase, *Fusarium oxysporum* trypsin-like protease, *Trichoderma reesei* beta-glucosidase, *Trichoderma reesei* cellobiohydrolase I, *Trichoderma reesei* cellobiohydrolase II, *Trichoderma reesei* endoglucanase I, *Trichoderma reesei* endoglucanase II, *Trichoderma reesei* endoglucanase III, *Trichoderma reesei* endoglucanase V, *Trichoderma reesei* xylanase I, *Trichoderma reesei* xylanase II, *Trichoderma reesei* xylanase III, *Trichoderma reesei* beta-xylosidase, and *Trichoderma reesei* translation elongation factor.

Preferred terminators for yeast host cells are obtained from the genes for *Saccharomyces cerevisiae* enolase, *Saccharomyces cerevisiae* cytochrome C (CYC1), and *Saccharomyces cerevisiae* glyceraldehyde-3-phosphate dehydrogenase. Other useful terminators for yeast host cells are described by Romanos et al., 1992, supra.

The control sequence may also be an mRNA stabilizer region downstream of a promoter and upstream of the coding sequence of a gene which increases expression of the gene.

Examples of suitable mRNA stabilizer regions are obtained from a *Bacillus thuringiensis* cryIIIA gene (WO 94/25612) and a *Bacillus subtilis* SP82 gene (Hue et al., 1995, *Journal of Bacteriology* 177: 3465-3471).

The control sequence may also be a leader, a nontranslated region of an mRNA that is important for translation by the host cell. The leader is operably linked to the 5'-terminus of the polynucleotide encoding the polypeptide. Any leader that is functional in the host cell may be used.

Preferred leaders for filamentous fungal host cells are obtained from the genes for *Aspergillus oryzae* TAKA amylase and *Aspergillus nidulans* triose phosphate isomerase.

Suitable leaders for yeast host cells are obtained from the genes for *Saccharomyces cerevisiae* enolase (ENO-1), *Saccharomyces cerevisiae* 3-phosphoglycerate kinase, *Saccharomyces cerevisiae* alpha-factor, and *Saccharomyces cerevisiae* alcohol dehydrogenase/glyceraldehyde-3-phosphate dehydrogenase (ADH2/GAP).

The control sequence may also be a polyadenylation sequence, a sequence operably linked to the 3'-terminus of the polynucleotide and, when transcribed, is recognized by the host cell as a signal to add polyadenosine residues to transcribed mRNA. Any polyadenylation sequence that is functional in the host cell may be used.

Preferred polyadenylation sequences for filamentous fungal host cells are obtained from the genes for *Aspergillus nidulans* anthranilate synthase, *Aspergillus niger* glucoamylase, *Aspergillus niger* alpha-glucosidase *Aspergillus oryzae* TAKA amylase, and *Fusarium oxysporum* trypsin-like protease.

Useful polyadenylation sequences for yeast host cells are described by Guo and Sherman, 1995, *Mol. Cellular Biol.* 15: 5983-5990.

The control sequence may also be a signal peptide coding region that encodes a signal peptide linked to the N-terminus of a polypeptide and directs the polypeptide into the cell's secretory pathway. The 5'-end of the coding sequence of the polynucleotide may inherently contain a signal peptide coding sequence naturally linked in translation reading frame with the segment of the coding sequence that encodes the polypeptide. Alternatively, the 5'-end of the coding sequence may contain a signal peptide coding sequence that is foreign to the coding sequence. A foreign signal peptide coding sequence may be required where the coding sequence does not naturally contain a signal peptide coding sequence. Alternatively, a foreign signal peptide coding sequence may simply replace the natural signal peptide coding sequence in order to enhance secretion of the polypeptide. However, any signal peptide coding sequence that directs the expressed polypeptide into the secretory pathway of a host cell may be used.

Effective signal peptide coding sequences for bacterial host cells are the signal peptide coding sequences obtained from the genes for *Bacillus* NCIB 11837 maltogenic amylase, *Bacillus licheniformis* subtilisin, *Bacillus licheniformis* beta-lactamase, *Bacillus stearothermophilus* alpha-amylase, *Bacillus stearothermophilus* neutral proteases (nprT, nprS, nprM), and *Bacillus subtilis* prsA. Further signal peptides are described by Simonen and Palva, 1993, *Microbiological Reviews* 57: 109-137.

Effective signal peptide coding sequences for filamentous fungal host cells are the signal peptide coding sequences obtained from the genes for *Aspergillus niger* neutral amylase, *Aspergillus niger* glucoamylase, *Aspergillus oryzae* TAKA amylase, *Humicola insolens* cellulase, *Humicola insolens* endoglucanase V, *Humicola lanuginosa* lipase, and *Rhizomucor miehei* aspartic proteinase.

Useful signal peptides for yeast host cells are obtained from the genes for *Saccharomyces cerevisiae* alpha-factor and *Saccharomyces cerevisiae* invertase. Other useful signal peptide coding sequences are described by Romanos et al., 1992, supra.

The control sequence may also be a propeptide coding sequence that encodes a propeptide positioned at the N-terminus of a polypeptide. The resultant polypeptide is known as a proenzyme or propolypeptide (or a zymogen in some cases). A propolypeptide is generally inactive and can be converted to an active polypeptide by catalytic or autocatalytic cleavage of the propeptide from the propolypeptide. The propeptide coding sequence may be obtained from the genes for *Bacillus subtilis* alkaline protease (aprE), *Bacillus subtilis* neutral protease (nprT), *Myceliophthora thermophila* laccase (WO 95/33836), *Rhizomucor miehei* aspartic proteinase, and *Saccharomyces cerevisiae* alpha-factor.

Where both signal peptide and propeptide sequences are present, the propeptide sequence is positioned next to the N-terminus of a polypeptide and the signal peptide sequence is positioned next to the N-terminus of the propeptide sequence.

It may also be desirable to add regulatory sequences that regulate expression of the polypeptide relative to the growth of the host cell. Examples of regulatory sequences are those that cause expression of the gene to be turned on or off in response to a chemical or physical stimulus, including the presence of a regulatory compound. Regulatory sequences in prokaryotic systems include the lac, tac, and trp operator systems. In yeast, the ADH2 system or GAL1 system may be used. In filamentous fungi, the *Aspergillus niger* glucoamylase promoter, *Aspergillus oryzae* TAKA alpha-amylase promoter, and *Aspergillus oryzae* glucoamylase promoter, *Trichoderma reesei* cellobiohydrolase I promoter, and *Trichoderma reesei* cellobiohydrolase II promoter may be used. Other examples of regulatory sequences are those that allow for gene amplification. In eukaryotic systems, these regulatory sequences include the dihydrofolate reductase gene that is amplified in the presence of methotrexate, and the metallothionein genes that are amplified with heavy metals. In these cases, the polynucleotide encoding the polypeptide would be operably linked to the regulatory sequence.

Expression Vectors

The present invention also relates to recombinant expression vectors comprising a polynucleotide of the present invention, a promoter, and transcriptional and translational stop signals. The various nucleotide and control sequences may be joined together to produce a recombinant expression vector that may include one or more convenient restriction sites to allow for insertion or substitution of the polynucleotide encoding the polypeptide at such sites. Alternatively, the polynucleotide may be expressed by inserting the polynucleotide or a nucleic acid construct comprising the polynucleotide into an appropriate vector for expression. In creating the expression vector, the coding sequence is located in the vector so that the coding sequence is operably linked with the appropriate control sequences for expression.

The recombinant expression vector may be any vector (e.g., a plasmid or virus) that can be conveniently subjected to recombinant DNA procedures and can bring about expression of the polynucleotide. The choice of the vector will typically depend on the compatibility of the vector with the host cell into which the vector is to be introduced. The vector may be a linear or closed circular plasmid.

The vector may be an autonomously replicating vector, i.e., a vector that exists as an extrachromosomal entity, the replication of which is independent of chromosomal replication, e.g., a plasmid, an extrachromosomal element, a minichromosome, or an artificial chromosome. The vector may contain any means for assuring self-replication. Alternatively, the vector may be one that, when introduced into the host cell, is integrated into the genome and replicated together with the chromosome(s) into which it has been integrated. Furthermore, a single vector or plasmid or two or more vectors or plasmids that together contain the total DNA to be introduced into the genome of the host cell, or a transposon, may be used.

The vector preferably contains one or more selectable markers that permit easy selection of transformed, transfected, transduced, or the like cells. A selectable marker is a gene the product of which provides for biocide or viral resistance, resistance to heavy metals, prototrophy to auxotrophs, and the like.

Examples of bacterial selectable markers are *Bacillus licheniformis* or *Bacillus subtilis* dal genes, or markers that confer antibiotic resistance such as ampicillin, chloramphenicol, kanamycin, neomycin, spectinomycin, or tetracycline resistance. Suitable markers for yeast host cells include, but are not limited to, ADE2, HIS3, LEU2, LYS2, MET3, TRP1, and URA3. Selectable markers for use in a filamentous fungal host cell include, but are not limited to, adeA (phosphoribosylaminoimidazole-succinocarboxamide synthase), adeB (phosphoribosyl-aminoimidazole synthase), amdS (acetamidase), argB (ornithine carbamoyltransferase), bar (phosphinothricin acetyltransferase), hph (hygromycin phosphotransferase), niaD (nitrate reductase), pyrG (orotidine-5'-phosphate decarboxylase), sC (sulfate adenyltransferase), and trpC (anthranilate synthase), as well as equivalents thereof. Preferred for use in an *Aspergillus* cell are *Aspergillus nidulans* or *Aspergillus oryzae* amdS and pyrG genes and a *Streptomyces hygroscopicus* bar gene. Preferred for use in a *Trichoderma* cell are adeA, adeB, amdS, hph, and pyrG genes.

The selectable marker may be a dual selectable marker system as described in WO 2010/039889. In one aspect, the dual selectable marker is an hph-tk dual selectable marker system.

The vector preferably contains an element(s) that permits integration of the vector into the host cell's genome or autonomous replication of the vector in the cell independent of the genome.

For integration into the host cell genome, the vector may rely on the polynucleotide's sequence encoding the polypeptide or any other element of the vector for integration into the genome by homologous or non-homologous recombination. Alternatively, the vector may contain additional polynucleotides for directing integration by homologous recombination into the genome of the host cell at a precise location(s) in the chromosome(s). To increase the likelihood of integration at a precise location, the integrational elements should contain a sufficient number of nucleic acids, such as 100 to 10,000 base pairs, 400 to 10,000 base pairs, and 800 to 10,000 base pairs, which have a high degree of sequence identity to the corresponding target sequence to enhance the probability of homologous recombination. The integrational elements may be any sequence that is homologous with the target sequence in the genome of the host cell. Furthermore, the integrational elements may be non-encoding or encoding polynucleotides. On the other hand, the vector may be integrated into the genome of the host cell by non-homologous recombination.

For autonomous replication, the vector may further comprise an origin of replication enabling the vector to replicate autonomously in the host cell in question. The origin of replication may be any plasmid replicator mediating autonomous replication that functions in a cell. The term "origin of replication" or "plasmid replicator" means a polynucleotide that enables a plasmid or vector to replicate in vivo.

Examples of bacterial origins of replication are the origins of replication of plasmids pBR322, pUC19, pACYC177, and pACYC184 permitting replication in *E. coli*, and pUB110, pE194, pTA1060, and pAMβ1 permitting replication in *Bacillus*.

Examples of origins of replication for use in a yeast host cell are the 2 micron origin of replication, ARS1, ARS4, the combination of ARS1 and CEN3, and the combination of ARS4 and CEN6.

Examples of origins of replication useful in a filamentous fungal cell are AMA1 and ANSI (Gems et al., 1991, *Gene* 98: 61-67; Cullen et al., 1987, *Nucleic Acids Res.* 15: 9163-9175; WO 00/24883). Isolation of the AMA1 gene and construction of plasmids or vectors comprising the gene can be accomplished according to the methods disclosed in WO 00/24883.

More than one copy of a polynucleotide of the present invention may be inserted into a host cell to increase production of a polypeptide. An increase in the copy number of the polynucleotide can be obtained by integrating at least one additional copy of the sequence into the host cell genome or by including an amplifiable selectable marker gene with the polynucleotide where cells containing amplified copies of the selectable marker gene, and thereby additional copies of the polynucleotide, can be selected for by cultivating the cells in the presence of the appropriate selectable agent.

The procedures used to ligate the elements described above to construct the recombinant expression vectors of the present invention are well known to one skilled in the art (see, e.g., Sambrook et al., 1989, supra).

Host Cells

The present invention also relates to recombinant host cells, comprising a polynucleotide of the present invention operably linked to one or more control sequences that direct the production of a polypeptide of the present invention. A construct or vector comprising a polynucleotide is introduced into a host cell so that the construct or vector is maintained as a chromosomal integrant or as a self-replicating extra-chromosomal vector as described earlier. The term "host cell" encompasses any progeny of a parent cell that is not identical to the parent cell due to mutations that occur during replication. The choice of a host cell will to a large extent depend upon the gene encoding the polypeptide and its source.

The host cell may be any cell useful in the recombinant production of a polypeptide of the present invention, e.g., a prokaryote or a eukaryote.

The prokaryotic host cell may be any Gram-positive or Gram-negative bacterium. Gram-positive bacteria include, but are not limited to, *Bacillus, Clostridium, Enterococcus, Geobacillus, Lactobacillus, Lactococcus, Oceanobacillus, Staphylococcus, Streptococcus*, and *Streptomyces*. Gram-negative bacteria include, but are not limited to, *Campylobacter, E. coli, Flavobacterium, Fusobacterium, Helicobacter, Ilyobacter, Neisseria, Pseudomonas, Salmonella*, and *Ureaplasma*.

The bacterial host cell may be any *Bacillus* cell including, but not limited to, *Bacillus alkalophilus, Bacillus amyloliquefaciens, Bacillus brevis, Bacillus circulans, Bacillus clausii, Bacillus coagulans, Bacillus firmus, Bacillus lautus, Bacillus lentus, Bacillus licheniformis, Bacillus megaterium, Bacillus pumilus, Bacillus stearothermophilus, Bacillus subtilis*, and *Bacillus thuringiensis* cells.

The bacterial host cell may also be any *Streptococcus* cell including, but not limited to, *Streptococcus equisimilis*, *Streptococcus pyogenes*, *Streptococcus uberis*, and *Streptococcus equi* subsp. *Zooepidemicus* cells.

The bacterial host cell may also be any *Streptomyces* cell including, but not limited to, *Streptomyces achromogenes*, *Streptomyces avermitilis*, *Streptomyces coelicolor*, *Streptomyces griseus*, and *Streptomyces lividans* cells.

The introduction of DNA into a *Bacillus* cell may be effected by protoplast transformation (see, e.g., Chang and Cohen, 1979, *Mol. Gen. Genet.* 168: 111-115), competent cell transformation (see, e.g., Young and Spizizen, 1961, *J. Bacteriol.* 81: 823-829, or Dubnau and Davidoff-Abelson, 1971, *J. Mol. Biol.* 56: 209-221), electroporation (see, e.g., Shigekawa and Dower, 1988, *Biotechniques* 6: 742-751), or conjugation (see, e.g., Koehler and Thorne, 1987, *J. Bacteriol.* 169: 5271-5278). The introduction of DNA into an *E. coli* cell may be effected by protoplast transformation (see, e.g., Hanahan, 1983, *J. Mol. Biol.* 166: 557-580) or electroporation (see, e.g., Dower et al., 1988, *Nucleic Acids Res.* 16: 6127-6145). The introduction of DNA into a *Streptomyces* cell may be effected by protoplast transformation, electroporation (see, e.g., Gong et al., 2004, *Folia Microbiol.* (Praha) 49: 399-405), conjugation (see, e.g., Mazodier et al., 1989, *J. Bacteriol.* 171: 3583-3585), or transduction (see, e.g., Burke et al., 2001, *Proc. Natl. Acad. Sci. USA* 98: 6289-6294). The introduction of DNA into a *Pseudomonas* cell may be effected by electroporation (see, e.g., Choi et al., 2006, *J. Microbiol. Methods* 64: 391-397) or conjugation (see, e.g., Pinedo and Smets, 2005, *Appl. Environ. Microbiol.* 71: 51-57). The introduction of DNA into a *Streptococcus* cell may be effected by natural competence (see, e.g., Perry and Kuramitsu, 1981, *Infect. Immun.* 32: 1295-1297), protoplast transformation (see, e.g., Catt and Jollick, 1991, *Microbios* 68: 189-207), electroporation (see, e.g., Buckley et al., 1999, *Appl. Environ. Microbiol.* 65: 3800-3804), or conjugation (see, e.g., Clewell, 1981, *Microbiol. Rev.* 45: 409-436). However, any method known in the art for introducing DNA into a host cell can be used.

The host cell may also be a eukaryote, such as a mammalian, insect, plant, or fungal cell.

The host cell may be a fungal cell. "Fungi" as used herein includes the phyla Ascomycota, Basidiomycota, Chytridiomycota, and Zygomycota as well as the Oomycota and all mitosporic fungi (as defined by Hawksworth et al., In, *Ainsworth and Bisby's Dictionary of The Fungi*, 8th edition, 1995, CAB International, University Press, Cambridge, UK).

The fungal host cell may be a yeast cell. "Yeast" as used herein includes ascosporogenous yeast (Endomycetales), basidiosporogenous yeast, and yeast belonging to the Fungi Imperfecti (Blastomycetes). Since the classification of yeast may change in the future, for the purposes of this invention, yeast shall be defined as described in *Biology and Activities of Yeast* (Skinner, Passmore, and Davenport, editors, *Soc. App. Bacteriol. Symposium Series No. 9*, 1980).

The yeast host cell may be a *Candida*, *Hansenula*, *Kluyveromyces*, *Pichia*, *Saccharomyces*, *Schizosaccharomyces*, or *Yarrowia* cell, such as a *Kluyveromyces lactis*, *Saccharomyces carlsbergensis*, *Saccharomyces cerevisiae*, *Saccharomyces diastaticus*, *Saccharomyces douglasii*, *Saccharomyces kluyveri*, *Saccharomyces norbensis*, *Saccharomyces oviformis*, or *Yarrowia lipolytica* cell.

The fungal host cell may be a filamentous fungal cell. "Filamentous fungi" include all filamentous forms of the subdivision Eumycota and Oomycota (as defined by Hawksworth et al., 1995, supra). The filamentous fungi are generally characterized by a mycelial wall composed of chitin, cellulose, glucan, chitosan, mannan, and other complex polysaccharides. Vegetative growth is by hyphal elongation and carbon catabolism is obligately aerobic. In contrast, vegetative growth by yeasts such as *Saccharomyces cerevisiae* is by budding of a unicellular thallus and carbon catabolism may be fermentative.

The filamentous fungal host cell may be an *Acremonium*, *Aspergillus*, *Aureobasidium*, *Bjerkandera*, *Ceriporiopsis*, *Chrysosporium*, *Coprinus*, *Coriolus*, *Cryptococcus*, *Filibasidium*, *Fusarium*, *Humicola*, *Magnaporthe*, *Mucor*, *Myceliophthora*, *Neocallimastix*, *Neurospora*, *Paecilomyces*, *Penicillium*, *Phanerochaete*, *Phlebia*, *Piromyces*, *Pleurotus*, *Schizophyllum*, *Talaromyces*, *Thermoascus*, *Thielavia*, *Tolypocladium*, *Trametes*, or *Trichoderma* cell.

For example, the filamentous fungal host cell may be an *Aspergillus awamori*, *Aspergillus foetidus*, *Aspergillus fumigatus*, *Aspergillus japonicus*, *Aspergillus nidulans*, *Aspergillus niger*, *Aspergillus oryzae*, *Bjerkandera adusta*, *Ceriporiopsis aneirina*, *Ceriporiopsis caregiea*, *Ceriporiopsis gilvescens*, *Ceriporiopsis pannocinta*, *Ceriporiopsis rivulosa*, *Ceriporiopsis subrufa*, *Ceriporiopsis subvermispora*, *Chrysosporium inops*, *Chrysosporium keratinophilum*, *Chrysosporium lucknowense*, *Chrysosporium merdarium*, *Chrysosporium pannicola*, *Chrysosporium queenslandicum*, *Chrysosporium tropicum*, *Chrysosporium zonatum*, *Coprinus cinereus*, *Coriolus hirsutus*, *Fusarium bactridioides*, *Fusarium cerealis*, *Fusarium crookwellense*, *Fusarium culmorum*, *Fusarium graminearum*, *Fusarium graminum*, *Fusarium heterosporum*, *Fusarium negundi*, *Fusarium oxysporum*, *Fusarium reticulatum*, *Fusarium roseum*, *Fusarium sambucinum*, *Fusarium sarcochroum*, *Fusarium sporotrichioides*, *Fusarium sulphureum*, *Fusarium torulosum*, *Fusarium trichothecioides*, *Fusarium venenatum*, *Humicola insolens*, *Humicola lanuginosa*, *Mucor miehei*, *Myceliophthora thermophila*, *Neurospora crassa*, *Penicillium purpurogenum*, *Phanerochaete chrysosporium*, *Phlebia radiata*, *Pleurotus eryngii*, *Thielavia terrestris*, *Trametes villosa*, *Trametes versicolor*, *Trichoderma harzianum*, *Trichoderma koningii*, *Trichoderma longibrachiatum*, *Trichoderma reesei*, or *Trichoderma viride* cell.

Fungal cells may be transformed by a process involving protoplast formation, transformation of the protoplasts, and regeneration of the cell wall in a manner known per se. Suitable procedures for transformation of *Aspergillus* and *Trichoderma* host cells are described in EP 238023, Yelton et al., 1984, *Proc. Natl. Acad. Sci. USA* 81: 1470-1474, and Christensen et al., 1988, *Bio/Technology* 6: 1419-1422. Suitable methods for transforming *Fusarium* species are described by Malardier et al., 1989, *Gene* 78: 147-156, and WO 96/00787. Yeast may be transformed using the procedures described by Becker and Guarente, In Abelson, J. N. and Simon, M. I., editors, *Guide to Yeast Genetics and Molecular Biology, Methods in Enzymology*, Volume 194, pp 182-187, Academic Press, Inc., New York; Ito et al., 1983, *J. Bacteriol.* 153: 163; and Hinnen et al., 1978, *Proc. Natl. Acad. Sci. USA* 75: 1920.

Methods of Production

The present invention also relates to methods of producing a polypeptide of the present invention, comprising (a) cultivating a cell, which in its wild-type form produces the polypeptide, under conditions conducive for production of the polypeptide; and optionally, (b) recovering the polypeptide. In one aspect, the cell is a *Bacteroides* cell. In another aspect, the cell is a *Bacteroides ovatus* cell. In another aspect, the cell is *Bacteroides ovatus* ATCC 8483.

The present invention also relates to methods of producing a polypeptide of the present invention, comprising (a) cultivating a recombinant host cell of the present invention under conditions conducive for production of the polypeptide; and optionally, (b) recovering the polypeptide.

The host cells are cultivated in a nutrient medium suitable for production of the polypeptide using methods known in the art. For example, the cells may be cultivated by shake flask cultivation, or small-scale or large-scale fermentation (including continuous, batch, fed-batch, or solid state fermentations) in laboratory or industrial fermentors in a suitable medium and under conditions allowing the polypeptide to be expressed and/or isolated. The cultivation takes place in a suitable nutrient medium comprising carbon and nitrogen sources and inorganic salts, using procedures known in the art. Suitable media are available from commercial suppliers or may be prepared according to published compositions (e.g., in catalogues of the American Type Culture Collection). If the polypeptide is secreted into the nutrient medium, the polypeptide can be recovered directly from the medium. If the polypeptide is not secreted, it can be recovered from cell lysates.

The polypeptide may be detected using methods known in the art that are specific for the polypeptides. These detection methods include, but are not limited to, use of specific antibodies, formation of an enzyme product, or disappearance of an enzyme substrate. For example, an enzyme assay using paranitro-phenol-□-D-xylose may be used to determine the activity of the polypeptide.

The polypeptide may be recovered using methods known in the art. For example, the polypeptide may be recovered from the nutrient medium by conventional procedures including, but not limited to, collection, centrifugation, filtration, extraction, spray-drying, evaporation, or precipitation. In one aspect, a fermentation broth comprising the polypeptide is recovered.

The polypeptide may be purified by a variety of procedures known in the art including, but not limited to, chromatography (e.g., ion exchange, affinity, hydrophobic, chromatofocusing, and size exclusion), electrophoretic procedures (e.g., preparative isoelectric focusing), differential solubility (e.g., ammonium sulfate precipitation), SDS-PAGE, or extraction (see, e.g., *Protein Purification*, Janson and Ryden, editors, VCH Publishers, New York, 1989) to obtain substantially pure polypeptides.

In an alternative aspect, the polypeptide is not recovered, but rather a host cell of the present invention expressing the polypeptide is used as a source of the polypeptide.

Removal or Reduction of Alpha Xylosidase Activity

The present invention also relates to methods of producing a mutant of a parent cell, which comprises disrupting or deleting a polynucleotide, or a portion thereof, encoding a polypeptide of the present invention, which results in the mutant cell producing less of the polypeptide than the parent cell when cultivated under the same conditions.

The mutant cell may be constructed by reducing or eliminating expression of the polynucleotide using methods well known in the art, for example, insertions, disruptions, replacements, or deletions. In a preferred aspect, the polynucleotide is inactivated. The polynucleotide to be modified or inactivated may be, for example, the coding region or a part thereof essential for activity, or a regulatory element required for expression of the coding region. An example of such a regulatory or control sequence may be a promoter sequence or a functional part thereof, i.e., a part that is sufficient for affecting expression of the polynucleotide.

Other control sequences for possible modification include, but are not limited to, a leader, polyadenylation sequence, propeptide sequence, signal peptide sequence, transcription terminator, and transcriptional activator.

Modification or inactivation of the polynucleotide may be performed by subjecting the parent cell to mutagenesis and selecting for mutant cells in which expression of the polynucleotide has been reduced or eliminated. The mutagenesis, which may be specific or random, may be performed, for example, by use of a suitable physical or chemical mutagenizing agent, by use of a suitable oligonucleotide, or by subjecting the DNA sequence to PCR generated mutagenesis. Furthermore, the mutagenesis may be performed by use of any combination of these mutagenizing agents.

Examples of a physical or chemical mutagenizing agent suitable for the present purpose include ultraviolet (UV) irradiation, hydroxylamine, N-methyl-N'-nitro-N-nitrosoguanidine (MNNG), O-methyl hydroxylamine, nitrous acid, ethyl methane sulphonate (EMS), sodium bisulphite, formic acid, and nucleotide analogues.

When such agents are used, the mutagenesis is typically performed by incubating the parent cell to be mutagenized in the presence of the mutagenizing agent of choice under suitable conditions, and screening and/or selecting for mutant cells exhibiting reduced or no expression of the gene.

Modification or inactivation of the polynucleotide may be accomplished by insertion, substitution, or deletion of one or more nucleotides in the gene or a regulatory element required for transcription or translation thereof. For example, nucleotides may be inserted or removed so as to result in the introduction of a stop codon, the removal of the start codon, or a change in the open reading frame. Such modification or inactivation may be accomplished by site-directed mutagenesis or PCR generated mutagenesis in accordance with methods known in the art. Although, in principle, the modification may be performed in vivo, i.e., directly on the cell expressing the polynucleotide to be modified, it is preferred that the modification be performed in vitro as exemplified below.

An example of a convenient way to eliminate or reduce expression of a polynucleotide is based on techniques of gene replacement, gene deletion, or gene disruption. For example, in the gene disruption method, a nucleic acid sequence corresponding to the endogenous polynucleotide is mutagenized in vitro to produce a defective nucleic acid sequence that is then transformed into the parent cell to produce a defective gene. By homologous recombination, the defective nucleic acid sequence replaces the endogenous polynucleotide. It may be desirable that the defective polynucleotide also encodes a marker that may be used for selection of transformants in which the polynucleotide has been modified or destroyed. In an aspect, the polynucleotide is disrupted with a selectable marker such as those described herein.

The present invention also relates to methods of inhibiting the expression of a polypeptide having alpha xylosidase activity in a cell, comprising administering to the cell or expressing in the cell a double-stranded RNA (dsRNA) molecule, wherein the dsRNA comprises a subsequence of a polynucleotide of the present invention. In a preferred aspect, the dsRNA is about 15, 16, 17, 18, 19, 20, 21, 22, 23, 24, 25 or more duplex nucleotides in length.

The dsRNA is preferably a small interfering RNA (sRNA) or a micro RNA (miRNA). In a preferred aspect, the dsRNA is small interfering RNA for inhibiting transcription. In another preferred aspect, the dsRNA is micro RNA for inhibiting translation.

The present invention also relates to such double-stranded RNA (dsRNA) molecules, comprising a portion of the mature polypeptide coding sequence of SEQ ID NO: 1 for inhibiting expression of the polypeptide in a cell. While the present invention is not limited by any particular mechanism of action, the dsRNA can enter a cell and cause the degradation of a single-stranded RNA (ssRNA) of similar or identical sequences, including endogenous mRNAs. When a cell is exposed to dsRNA, mRNA from the homologous gene is selectively degraded by a process called RNA interference (RNAi).

The dsRNAs of the present invention can be used in gene-silencing. In one aspect, the invention provides methods to selectively degrade RNA using a dsRNAi of the present invention. The process may be practiced in vitro, ex vivo or in vivo. In one aspect, the dsRNA molecules can be used to generate a loss-of-function mutation in a cell, an organ or an animal. Methods for making and using dsRNA molecules to selectively degrade RNA are well known in the art; see, for example, U.S. Pat. Nos. 6,489,127; 6,506,559; 6,511,824; and 6,515,109.

The present invention further relates to a mutant cell of a parent cell that comprises a disruption or deletion of a polynucleotide encoding the polypeptide or a control sequence thereof or a silenced gene encoding the polypeptide, which results in the mutant cell producing less of the polypeptide or no polypeptide compared to the parent cell.

The polypeptide-deficient mutant cells are particularly useful as host cells for expression of native and heterologous polypeptides. Therefore, the present invention further relates to methods of producing a native or heterologous polypeptide, comprising (a) cultivating the mutant cell under conditions conducive for production of the polypeptide; and (b) recovering the polypeptide. The term "heterologous polypeptides" means polypeptides that are not native to the host cell, e.g., a variant of a native protein. The host cell may comprise more than one copy of a polynucleotide encoding the native or heterologous polypeptide.

The methods used for cultivation and purification of the product of interest may be performed by methods known in the art.

The methods of the present invention for producing an essentially alpha xylosidase-free product are of particular interest in the production of eukaryotic polypeptides, in particular fungal proteins such as enzymes. The alpha xylosidase-deficient cells may also be used to express heterologous proteins of pharmaceutical interest such as hormones, growth factors, receptors, and the like. The term "eukaryotic polypeptides" includes not only native polypeptides, but also those polypeptides, e.g., enzymes, which have been modified by amino acid substitutions, deletions or additions, or other such modifications to enhance activity, thermostability, pH tolerance and the like.

In a further aspect, the present invention relates to a protein product essentially free from alpha xylosidase activity that is produced by a method of the present invention.

Fermentation Broth Formulations or Cell Compositions

The present invention also relates to a fermentation broth formulation or a cell composition comprising a polypeptide of the present invention. The fermentation broth product further comprises additional ingredients used in the fermentation process, such as, for example, cells (including, the host cells containing the gene encoding the polypeptide of the present invention which are used to produce the polypeptide of interest), cell debris, biomass, fermentation media and/or fermentation products. In some embodiments, the composition is a cell-killed whole broth containing organic acid(s), killed cells and/or cell debris, and culture medium.

The term "fermentation broth" as used herein refers to a preparation produced by cellular fermentation that undergoes no or minimal recovery and/or purification. For example, fermentation broths are produced when microbial cultures are grown to saturation, incubated under carbon-limiting conditions to allow protein synthesis (e.g., expression of enzymes by host cells) and secretion into cell culture medium. The fermentation broth can contain unfractionated or fractionated contents of the fermentation materials derived at the end of the fermentation. Typically, the fermentation broth is unfractionated and comprises the spent culture medium and cell debris present after the microbial cells (e.g., filamentous fungal cells) are removed, e.g., by centrifugation. In some embodiments, the fermentation broth contains spent cell culture medium, extracellular enzymes, and viable and/or nonviable microbial cells.

In an embodiment, the fermentation broth formulation and cell compositions comprise a first organic acid component comprising at least one 1-5 carbon organic acid and/or a salt thereof and a second organic acid component comprising at least one 6 or more carbon organic acid and/or a salt thereof. In a specific embodiment, the first organic acid component is acetic acid, formic acid, propionic acid, a salt thereof, or a mixture of two or more of the foregoing and the second organic acid component is benzoic acid, cyclohexanecarboxylic acid, 4-methylvaleric acid, phenylacetic acid, a salt thereof, or a mixture of two or more of the foregoing.

In one aspect, the composition contains an organic acid(s), and optionally further contains killed cells and/or cell debris. In one embodiment, the killed cells and/or cell debris are removed from a cell-killed whole broth to provide a composition that is free of these components.

The fermentation broth formulations or cell compositions may further comprise a preservative and/or anti-microbial (e.g., bacteriostatic) agent, including, but not limited to, sorbitol, sodium chloride, potassium sorbate, and others known in the art.

The cell-killed whole broth or composition may contain the unfractionated contents of the fermentation materials derived at the end of the fermentation. Typically, the cell-killed whole broth or composition contains the spent culture medium and cell debris present after the microbial cells (e.g., filamentous fungal cells) are grown to saturation, incubated under carbon-limiting conditions to allow protein synthesis. In some embodiments, the cell-killed whole broth or composition contains the spent cell culture medium, extracellular enzymes, and killed filamentous fungal cells. In some embodiments, the microbial cells present in the cell-killed whole broth or composition can be permeabilized and/or lysed using methods known in the art.

A whole broth or cell composition as described herein is typically a liquid, but may contain insoluble components, such as killed cells, cell debris, culture media components, and/or insoluble enzyme(s). In some embodiments, insoluble components may be removed to provide a clarified liquid composition.

The whole broth formulations and cell compositions of the present invention may be produced by a method described in WO 90/15861 or WO 2010/096673.

Enzyme Compositions

The present invention also relates to compositions comprising a polypeptide of the present invention. Preferably, the compositions are enriched in such a polypeptide. The term "enriched" indicates that the α-xylosidase activity of the composition has been increased, e.g., with an enrichment factor of at least 1.1.

In one aspect, the composition comprises an isolated polypeptide having α-xylosidase activity, selected from the group consisting of:

(a) a polypeptide having at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to SEQ ID NO: 3;

(b) a polypeptide encoded by a polynucleotide that hybridizes under high stringency conditions, or very high stringency conditions with:

(i) the mature polypeptide coding sequence of SEQ ID NO: 1; and/or (iii) the full-length complementary strand of (i);

(c) a polypeptide encoded by a polynucleotide having at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the mature polypeptide coding sequence of SEQ ID NO: 1;

(d) a variant comprising a substitution, deletion, and/or insertion of one or more (several) amino acids of the mature polypeptide of SEQ ID NO: 3; and (e) a fragment of a polypeptide of (a), (b), (c) or (d), that has α-xylosidase activity.

An embodiment of the invention is a composition comprising an isolated polypeptide having at least 85% sequence identity to the mature polypeptide of SEQ ID NO: 3.

An embodiment of the invention is a composition comprising an isolated polypeptide having at least 86% sequence identity to the mature polypeptide of SEQ ID NO: 3.

An embodiment of the invention is a composition comprising an isolated polypeptide having at least 87% sequence identity to the mature polypeptide of SEQ ID NO: 3.

An embodiment of the invention is a composition comprising an isolated polypeptide having at least 88% sequence identity to the mature polypeptide of SEQ ID NO: 3.

An embodiment of the invention is a composition comprising an isolated polypeptide having at least 89% sequence identity to the mature polypeptide of SEQ ID NO: 3.

An embodiment of the invention is a composition comprising an isolated polypeptide having at least 90% sequence identity to the mature polypeptide of SEQ ID NO: 3.

An embodiment of the invention is a composition comprising an isolated polypeptide having at least 91% sequence identity to the mature polypeptide of SEQ ID NO: 3.

An embodiment of the invention is a composition comprising an isolated polypeptide having at least 92% sequence identity to the mature polypeptide of SEQ ID NO: 3.

An embodiment of the invention is a composition comprising an isolated polypeptide having at least 93% sequence identity to the mature polypeptide of SEQ ID NO: 3.

An embodiment of the invention is a composition comprising an isolated polypeptide having at least 94% sequence identity to the mature polypeptide of SEQ ID NO: 3.

An embodiment of the invention is a composition comprising an isolated polypeptide having at least 95% sequence identity to the mature polypeptide of SEQ ID NO: 3.

An embodiment of the invention is a composition comprising an isolated polypeptide having at least 96% sequence identity to the mature polypeptide of SEQ ID NO: 3.

An embodiment of the invention is a composition comprising an isolated polypeptide having at least 97% sequence identity to the mature polypeptide of SEQ ID NO: 3.

An embodiment of the invention is a composition comprising an isolated polypeptide having at least 98% sequence identity to the mature polypeptide of SEQ ID NO: 3.

An embodiment of the invention is a composition comprising an isolated polypeptide having at least 99% sequence identity to the mature polypeptide of SEQ ID NO: 3.

An embodiment of the invention is a composition comprising an isolated polypeptide having 100% sequence identity to the mature polypeptide of SEQ ID NO: 3.

In one aspect, the composition comprises or consists of the mature amino acid sequence of SEQ ID NO: 3 or an allelic variant thereof; or is a fragment thereof having α-xylosidase activity. In another aspect, the composition comprises or consists of the mature polypeptide of SEQ ID NO: 2. In a further aspect, the composition comprises or consists of the mature polypeptide of SEQ ID NO: 3. In another aspect, the composition comprises or consists of amino acids 1 to 160 of SEQ ID NO: 2, amino acids 5 to 154 of SEQ ID NO: 2, or amino acids 10 to 149 of SEQ ID NO: 2. In another aspect, the polypeptide comprises or consists of amino acids 1 to 160 of SEQ ID NO: 3, amino acids 5 to 154 of SEQ ID NO: 3, or amino acids 10 to 149 of SEQ ID NO: 3.

The present invention also relates to compositions comprising isolated polypeptides having α-xylosidase activity that are encoded by polynucleotides that hybridize under high stringency conditions, or very high stringency conditions with (i) the mature polypeptide coding sequence of SEQ ID NO: 1, and/or (ii) the full-length complementary strand of (i) (J. Sambrook, E. F. Fritsch, and T. Maniatis, 1989, *Molecular Cloning, A Laboratory Manual,* 2d edition, Cold Spring Harbor, N.Y.).

The present invention further relates to compositions comprising isolated polypeptides that differ by no more than one hundred amino acid residues, e.g., by ninety amino acids, by eighty amino acids, by seventy amino acids, by sixty amino acids, by fifty amino acids, by forty amino acids, by thirty amino acids, by twenty-five amino acids, by twenty amino acids, by fifteen amino acids, by ten amino acids, by eight amino acids, by seven amino acids, by six amino acids, by five amino acids, by four amino acids, by three amino acids, by two amino acids, and by one amino acid from the polypeptide of SEQ ID NO: 3.

The present invention also relates to compositions comprising variants comprising a substitution, deletion, and/or insertion of one or more (or several) amino acids of SEQ ID NO: 3 or a homologous sequence thereof. The total number of positions having amino acid substitutions, deletions and/or insertions in SEQ ID NO: 3 is not more than 100, e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 40, 50, 60, 70, 80, 90 or 100. Preferably, amino acid changes are of a minor nature, that is conservative amino acid substitutions, insertions or deletions that do not significantly affect the folding and/or activity of the protein; small deletions, typically of one to about 30 amino acids; small amino- or carboxyl-terminal extensions, such as an amino-terminal methionine residue; a small linker peptide of up to about 20-25 residues; or a small extension that facilitates purification by changing net charge or another function, such as a poly-histidine tract, an antigenic epitope or a binding domain.

The embodiments indicated above in respect of SEQ ID NO: 3 apply correspondingly to compositions comprising or consisting of polypeptides as provided by SEQ ID NO: 2.

The embodiments indicated above in respect of SEQ ID NO: 3 apply correspondingly to compositions comprising or consisting of polypeptides as provided by SEQ ID NO: 4.

The embodiments indicated above in respect of SEQ ID NO: 3 apply correspondingly to compositions comprising or consisting of polypeptides as provided by SEQ ID NO: 5.

The composition may comprise a α-xylosidase of the present invention as the major enzymatic component, e.g., a mono-component composition. Alternatively, the composition may comprise multiple enzymatic activities, such as an aminopeptidase, amylase, carbohydrase, carboxypeptidase, catalase, cellulase, chitinase, cutinase, cyclodextrin glycosyltransferase, deoxyribonuclease, esterase, alpha-galactosidase, beta-galactosidase, glucoamylase, alpha-glucosidase, beta-glucosidase, haloperoxidase, invertase, laccase, lipase, mannosidase, oxidase, pectinolytic enzyme, peptidoglutaminase, peroxidase, protease, phytase, polyphenoloxidase, proteolytic enzyme, ribonuclease, transglutaminase, or xylanase.

The additional enzyme(s) may be produced, for example, by a microorganism such as bacteria or fungi or by plants or by animals. The compositions may be prepared in accordance with methods known in the art and may be in the form of a liquid or a dry composition. For instance, the composition may be in the form of a granulate or a microgranulate. The α-xylosidase may be stabilized in accordance with methods known in the art.

The compositions may comprise a polypeptide of the present invention as the major enzymatic component, e.g., a mono-component composition. Alternatively, the compositions may comprise multiple enzymatic activities, such as one or more (e.g., several) enzymes selected from the group consisting of hydrolase, isomerase, ligase, lyase, oxidoreductase, or transferase, e.g., an alpha-galactosidase, alpha-glucosidase, aminopeptidase, amylase, beta-galactosidase, beta-glucosidase, beta-xylosidase, carbohydrase, carboxypeptidase, catalase, cellobiohydrolase, cellulase, chitinase, cutinase, cyclodextrin glycosyltransferase, deoxyribonuclease, endoglucanase, esterase, glucoamylase, invertase, laccase, lipase, mannosidase, mutanase, oxidase, pectinolytic enzyme, peroxidase, phytase, polyphenoloxidase, proteolytic enzyme, ribonuclease, transglutaminase, or xylanase.

The compositions may be prepared in accordance with methods known in the art and may be in the form of a liquid or a dry composition. The compositions may be stabilized in accordance with methods known in the art.

Examples are given below of preferred uses of the compositions of the present invention. The dosage of the composition and other conditions under which the composition is used may be determined on the basis of methods known in the art.

Use of α-Xylosidases of the Invention in Animal Feed

The term animal includes all animals. Examples of animals are non-ruminants, and ruminants. Ruminant animals include, for example, animals such as sheep, goats, and cattle, e.g. beef cattle, cows, and young calves. In a particular embodiment, the animal is a non-ruminant animal. Non-ruminant animals include mono-gastric animals, e.g. pigs or swine (including, but not limited to, piglets, growing pigs, and sows); poultry such as turkeys, ducks and chicken (including but not limited to broiler chicks, layers); horses (including but not limited to hotbloods, coldbloods and warm bloods), young calves; and fish (including but not limited to salmon, trout, tilapia, catfish and carps); and crustaceans (including but not limited to shrimps and prawns).

The term feed or feed composition means any compound, preparation, mixture, or composition suitable for, or intended for intake by an animal. In the use according to the invention the α-xylosidase can be fed to the animal before, after, or simultaneously with the diet. The latter is preferred.

In a particular embodiment, the α-xylosidase, in the form in which it is added to the feed, or when being included in a feed additive, is well-defined. Well-defined means that the α-xylosidase preparation is at least 50% pure as determined by Size-exclusion chromatography (see Example 12 of WO 01/58275). In other particular embodiments the α-xylosidase preparation is at least 60, 70, 80, 85, 88, 90, 92, 94, or at least 95% pure as determined by this method.

A well-defined α-xylosidase preparation is advantageous. For instance, it is much easier to dose correctly to the feed an α-xylosidase that is essentially free from interfering or contaminating other proteases or other proteins in general. The term dose correctly refers in particular to the objective of obtaining consistent and constant results, and the capability of optimising dosage based upon the desired effect.

For the use in animal feed, however, the α-xylosidase need not be that pure; it may e.g. include other enzymes, in which case it could be termed an α-xylosidase preparation.

The α-xylosidase preparation can be (a) added directly to the feed (or used directly in a protein treatment process), or (b) it can be used in the production of one or more intermediate compositions such as feed additives or premixes that is subsequently added to the feed (or used in a treatment process). The degree of purity described above refers to the purity of the original α-xylosidase preparation, whether used according to (a) or (b) above.

α-xylosidase preparations with purities of this order of magnitude are in particular obtainable using recombinant methods of production, whereas they are not so easily obtained and also subject to a much higher batch-to-batch variation when the α-xylosidase is produced by traditional fermentation methods. Such α-xylosidase preparation may of course be mixed with other enzymes to obtain a preparation with two or more purified enzymes with different or similar activities.

The substrate protein may be an animal protein, such as meat and bone meal, feather meal, and/or fish meal; or it may be a vegetable protein.

The substrate source is preferentially of vegetable origin. The term vegetable proteins as used herein refers to any compound, composition, preparation or mixture that includes at least one protein derived from or originating from a vegetable, including modified proteins and protein-derivatives. In particular embodiments, the protein content of the vegetable proteins is at least 10, 20, 30, 40, 50, or 60% (w/w).

Vegetable proteins may be derived from vegetable protein sources containing galactose cell wall constituents, such as legumes and cereals (Bach Knudsen, K. E. (1997). Carbohydrate and lignin contents of plant materials used in animal feeding. Animal Feed Science and Technology 67: 319-338), for example materials from plants of the families Fabaceae (Leguminosae), Cruciferaceae, Chenopodiaceae, and Poaceae, such as soy bean meal, lupin meal and rapeseed meal. In a particular embodiment, the vegetable protein source is material from one or more plants of the family Fabaceae, e.g. soybean, lupine, pea, or bean. In another particular embodiment, the vegetable protein source is material from one or more plants of the family Chenopodiaceae, e.g. beet, sugar beet, spinach or quinoa. Other examples of vegetable protein sources are rapeseed, sunflower seed, cotton seed, and cabbage. Soybean is a preferred vegetable protein source. Other examples of vegetable protein sources are cereals such as barley, wheat, rye, oat, maize (corn), rice, triticale, sorghum, dried distillers grains with solubles (DDGS) and microalgae.

In a particular embodiment of a treatment process the α-xylosidase(s) in question is affecting (or acting on, or exerting its hydrolyzing or degrading influence on) xylosidase containing cell wall architecture of the protein source thereby increasing nutrient release. This release is not only limited to protein but also includes other nutrients such as starch, fat and low-molecular weight sugars stored within the vegetable cell. To achieve this, the protein To achieve this, the protein or protein source is typically suspended in a solvent, e.g. an aqueous solvent such as water, and the pH and temperature values are adjusted paying due regard to the characteristics of the enzyme in question. For example, the treatment may take place at a pH-value at which the activity of the actual α-xylosidase is at least 5%, 10%, 20%, 30%, 40%, 50%, 60%, 70%, 80%, or at least 90%. Likewise, for example, the treatment may take place at a temperature at which the activity of the actual α-xylosidase is at least 5%, 10%, 20%, 30%, 40%, 50%, 60%, 70%, 80%, or at least 90%. The above percentage activity indications are relative to the maximum activities. The enzymatic reaction is continued until the desired result is achieved, following which it may or may not be stopped by inactivating the enzyme, e.g. by a heat-treatment step.

In another particular embodiment of a treatment process of the invention, the α-xylosidase action is sustained, meaning e.g. that the α-xylosidase is added to the vegetable proteins, but its hydrolysing influence is so to speak not switched on until later when desired, once suitable hydrolysing conditions are established, or once any enzyme inhibitors are inactivated, or whatever other means could have been applied to postpone the action of the enzyme.

In one embodiment, the treatment is a pre-treatment of animal feed or proteins for use in animal feed, i.e. the vegetable protein sources are hydrolysed before intake.

The term improving the nutritional value of an animal feed means improving the availability of nutrients in the feed. In this invention improving the nutritional values refers in particular to improving the availability of the protein fraction of the feed, thereby leading to increased protein extraction, higher protein yields, and/or improved protein utilization. When the nutritional value of the feed is increased, the protein and/or amino acid digestibility is increased and the growth rate and/or weight gain and/or feed conversion (i.e. the weight of ingested feed relative to weight gain) of the animal might be improved.

The α-xylosidase can be added to the feed in any form, be it as a relatively pure α-xylosidase, or in admixture with other components intended for addition to animal feed, i.e. in the form of animal feed additives, such as the so-called pre-mixes for animal feed.

In a further aspect the present invention relates to compositions for use in animal feed, such as animal feed, and animal feed additives, e.g. premixes.

Apart from the α-xylosidase of the invention, the animal feed additives of the invention contain at least one fat-soluble vitamin, and/or at least one water soluble vitamin, and/or at least one trace mineral, and/or at least one macro mineral.

Further, optional, feed-additive ingredients are colouring agents, e.g. carotenoids such as beta-carotene, astaxanthin, and lutein; stabilisers; growth improving additives and aroma compounds/flavourings, e.g. creosol, anethol, deca-, undeca- and/or dodeca-lactones, ionones, irone, gingerol, piperidine, propylidene phatalide, butylidene phatalide, capsaicin and/or tannin; antimicrobial peptides; polyunsaturated fatty acids (PUFAs); reactive oxygen generating species; also, a support may be used that may contain, for example, 40-50% by weight of wood fibres, 8-10% by weight of stearine, 4-5% by weight of curcuma powder, 4-58% by weight of rosemary powder, 22-28% by weight of limestone, 1-3% by weight of a gum, such as gum arabic, 5-50% by weight of sugar and/or starch and 5-15% by weight of water.

A feed or a feed additive of the invention may also comprise at least one other enzyme selected from amongst phytase (EC 3.1.3.8 or 3.1.3.26); xylanase (EC 3.2.1.8); galactanase (EC 3.2.1.89); alpha-galactosidase (EC 3.2.1.22); protease (EC 3.4), phospholipase A1 (EC 3.1.1.32); phospholipase A2 (EC 3.1.1.4); lysophospholipase (EC 3.1.1.5); phospholipase C (3.1.4.3); phospholipase D (EC 3.1.4.4); amylase such as, for example, alpha-amylase (EC 3.2.1.1); and/or beta-glucanase (EC 3.2.1.4 or EC 3.2.1.6).

In a particular embodiment, the feed or a feed additive of the invention also comprises a protease (EC 3.4).

In a particular embodiment, the feed or a feed additive of the invention also comprises a phytase (EC 3.1.3.8 or 3.1.3.26).

In a particular embodiment, the feed or a feed additive of the invention also comprises a xylanase (EC 3.2.1.8).

A feed or a feed additive of the invention may also comprise at least one probiotic or direct fed microbial (DFM) optionally together with one or more other enzymes selected from amongst phytase (EC 3.1.3.8 or 3.1.3.26); xylanase (EC 3.2.1.8); galactanase (EC 3.2.1.89); alpha-galactosidase (EC 3.2.1.22); protease (EC 3.4), phospholipase A1 (EC 3.1.1.32); phospholipase A2 (EC 3.1.1.4); lysophospholipase (EC 3.1.1.5); phospholipase C (3.1.4.3); phospholipase D (EC 3.1.4.4); amylase such as, for example, alpha-amylase (EC 3.2.1.1); and/or beta-glucanase (EC 3.2.1.4 or EC 3.2.1.6.

The DFM may be added to the animal feed such that the daily dose of DFM is between $1 \times 10^5$ CFU and $1 \times 10^{13}$ CFU, preferably between $1 \times 10^6$ CFU and $1 \times 10^{12}$ CFU, more preferably between $1 \times 10^7$ CFU and $1 \times 10^{11}$ CFU and even more preferably between $5 \times 10^7$ CFU and $1 \times 10^{10}$ CFU. Alternatively, the DFM may be added to the animal feed such that the concentration of DFM in the feed is between $1 \times 10^3$ CFU/g feed and $1 \times 10^8$ CFU/g feed, preferably between $5 \times 10^3$ CFU/g feed and $1 \times 10^7$ CFU/g feed, more preferably between $1 \times 10^4$ CFU/g feed and $5 \times 10^6$ CFU/g feed and even more preferably between $2.5 \times 10^4$ CFU/g feed and $1 \times 10^6$ CFU/g feed.

The direct fed microbial may be a bacterium from one or more of the following genera: *Lactobacillus, Lactococcus, Streptococcus, Bacillus, Pediococcus, Enterococcus, Leuconostoc, Carnobacterium, Propionibacterium, Bifidobacterium, Clostridium* and *Megasphaera* or any combination thereof, preferably from *Bacillus subtilis, Bacillus licheniformis, Bacillus amyloliquefaciens, Enterococcus faecium, Enterococcus* spp, and *Pediococcus* spp, *Lactobacillus* spp, *Bifidobacterium* spp, *Lactobacillus acidophilus, Pediococcus acidilactici, Lactococcus lactis, Bifidobacterium bifidum, Propionibacterium thoenii, Lactobacillus farciminus, lactobacillus rhamnosus, Clostridium butyricum, Bifidobacterium animalis* ssp. *animalis, Lactobacillus reuteri, Bacillus cereus, Lactobacillus salivarius* ssp. *salivarius, Megasphaera elsdenii, Propionibacteria* sp and more preferably from *Bacillus subtilis* strains 3A-P4 (PTA-6506); 15A-P4 (PTA-6507); 22C-P1 (PTA-6508); 2084 (NRRL B-500130);

LSSA01 (NRRL-B-50104); BS27 (NRRL B-501 05); BS 18 (NRRL B-50633); and BS 278 (NRRL B-50634).

In a particular embodiment these other enzymes are well-defined (as defined above for In a particular embodiment, the feed or a feed additive of the invention also comprises a xylanase (EC 3.2.1.8).

Examples of antimicrobial peptides (AMP's) are CAP18, Leucocin A, Tritrpticin, Protegrin-1, Thanatin, Defensin, Lactoferrin, Lactoferricin, and Ovispirin such as Novispirin (Robert Lehrer, 2000), Plectasins, and Statins, including the compounds and polypeptides disclosed in WO 03/044049 and WO 03/048148, as well as variants or fragments of the above that retain antimicrobial activity.

Examples of antifungal polypeptides (AFP's) are the *Aspergillus giganteus*, and *Aspergillus niger* peptides, as well as variants and fragments thereof which retain antifungal activity, as disclosed in WO 94/01459 and WO 02/090384.

Examples of polyunsaturated fatty acids are O18, C20 and C22 polyunsaturated fatty acids, such as arachidonic acid, docosohexaenoic acid, eicosapentaenoic acid and gamma-linoleic acid.

Examples of reactive oxygen generating species are chemicals such as perborate, persulphate, or percarbonate; and enzymes such as an oxidase, an oxygenase or a syntethase.

Usually fat- and water-soluble vitamins, as well as trace minerals form part of a so-called premix intended for addition to the feed, whereas macro minerals are usually separately added to the feed. Either of these composition types, when enriched with a α-xylosidase of the invention, is an animal feed additive of the invention.

In a particular embodiment, the animal feed additive of the invention is intended for being included (or prescribed as having to be included) in animal diets or feed at levels of 0.01 to 10.0%; more particularly 0.05 to 5.0%; or 0.2 to 1.0% (% meaning g additive per 100 g feed). This is so in particular for premixes.

The following are non-exclusive lists of examples of these components:

Examples of fat-soluble vitamins are vitamin A, vitamin D3, vitamin E, and vitamin K, e.g. vitamin K3.

Examples of water-soluble vitamins are vitamin B12, biotin and choline, vitamin B1, vitamin B2, vitamin B6, niacin, folic acid and panthothenate, e.g. Ca-D-panthothenate.

Examples of trace minerals are manganese, zinc, iron, copper, iodine, selenium, and cobalt.

Examples of macro minerals are calcium, phosphorus and sodium.

The nutritional requirements of these components (exemplified with poultry and piglets/pigs) are listed in Table A of WO 01/58275. Nutritional requirement means that these components should be provided in the diet in the concentrations indicated.

In the alternative, the animal feed additive of the invention comprises at least one of the individual components specified in Table A of WO 01/58275. At least one means either of, one or more of, one, or two, or three, or four and so forth up to all thirteen, or up to all fifteen individual components. More specifically, this at least one individual component is included in the additive of the invention in such an amount as to provide an in-feed-concentration within the range indicated in column four, or column five, or column six of Table A.

In a still further embodiment, the animal feed additive of the invention comprises at least one of the below vitamins, preferably to provide an in-feed-concentration within the ranges specified in the below Table 1 (for piglet diets, and broiler diets, respectively).

TABLE 1

Typical vitamin recommendations

| Vitamin | Piglet diet | Broiler diet |
|---|---|---|
| Vitamin A | 10,000-15,000 IU/kg feed | 8-12,500 IU/kg feed |
| Vitamin D3 | 1800-2000 IU/kg feed | 3000-5000 IU/kg feed |
| Vitamin E | 60-100 mg/kg feed | 150-240 mg/kg feed |
| Vitamin K3 | 2-4 mg/kg feed | 2-4 mg/kg feed |
| Vitamin B1 | 2-4 mg/kg feed | 2-3 mg/kg feed |
| Vitamin B2 | 6-10 mg/kg feed | 7-9 mg/kg feed |
| Vitamin B6 | 4-8 mg/kg feed | 3-6 mg/kg feed |
| Vitamin B12 | 0.03-0.05 mg/kg feed | 0.015-0.04 mg/kg feed |
| Niacin (Vitamin B3) | 30-50 mg/kg feed | 50-80 mg/kg feed |
| Pantothenic acid | 20-40 mg/kg feed | 10-18 mg/kg feed |
| Folic acid | 1-2 mg/kg feed | 1-2 mg/kg feed |
| Biotin | 0.15-0.4 mg/kg feed | 0.15-0.3 mg/kg feed |
| Choline chloride | 200-400 mg/kg feed | 300-600 mg/kg feed |

The present invention also relates to animal feed compositions. Animal feed compositions or diets have a relatively high content of protein. Poultry and pig diets can be characterised as indicated in Table B of WO 01/58275, columns 2-3. Fish diets can be characterised as indicated in column 4 of this Table B. Furthermore such fish diets usually have a crude fat content of 200-310 g/kg. WO 01/58275 corresponds to U.S. Ser. No. 09/779,334 which is hereby incorporated by reference.

An animal feed composition according to the invention has a crude protein content of 50-800 g/kg, and furthermore comprises at least one α-xylosidase as claimed herein.

Furthermore, or in the alternative (to the crude protein content indicated above), the animal feed composition of the invention has a content of metabolisable energy of 10-30 MJ/kg; and/or a content of calcium of 0.1-200 g/kg; and/or a content of available phosphorus of 0.1-200 g/kg; and/or a content of methionine of 0.1-100 g/kg; and/or a content of methionine plus cysteine of 0.1-150 g/kg; and/or a content of lysine of 0.5-50 g/kg.

In particular embodiments, the content of metabolisable energy, crude protein, calcium, phosphorus, methionine, methionine plus cysteine, and/or lysine is within any one of ranges 2, 3, 4 or 5 in Table B of WO 01/58275 (R. 2-5).

Crude protein is calculated as nitrogen (N) multiplied by a factor 6.25, i.e. Crude protein (g/kg)=N (g/kg)×6.25. The nitrogen content is determined by the Kjeldahl method (A.O.A.C., 1984, Official Methods of Analysis 14th ed., Association of Official Analytical Chemists, Washington D.C.).

Metabolisable energy can be calculated on the basis of the NRC publication Nutrient requirements in swine, ninth revised edition 1988, subcommittee on swine nutrition, committee on animal nutrition, board of agriculture, national research council. National Academy Press, Washington, D.C., pp. 2-6, and the European Table of Energy Values for Poultry Feed-stuffs, Spelderholt centre for poultry research and extension, 7361 DA Beekbergen, The Netherlands. Grafisch bedrijf Ponsen & Iooijen bv, Wageningen, ISBN 90-71463-12-5.

The dietary content of calcium, available phosphorus and amino acids in complete animal diets is calculated on the basis of feed tables such as Veevoedertabel 1997, gegevens over chemische samenstelling, verteerbaarheid en voederwaarde van voedermiddelen, Central Veevoederbureau, Runderweg 6, 8219 pk Lelystad, ISBN 90-72839-13-7.

In a particular embodiment, the animal feed composition of the invention contains at least one vegetable protein as defined above.

The animal feed composition of the invention may also contain animal protein, such as Meat and Bone Meal, Feather meal, and/or Fish Meal, typically in an amount of 0-25%. The animal feed composition of the invention may also comprise Dried Distillers Grains with Solubles (DDGS), typically in amounts of 0-30%.

In still further particular embodiments, the animal feed composition of the invention contains 0-80% maize; and/or 0-80% sorghum; and/or 0-70% wheat; and/or 0-70% barley; and/or 0-30% oats; and/or 0-40% soybean meal; and/or 0-25% fish meal; and/or 0-25% meat and bone meal; and/or 0-20% whey.

Animal diets can e.g. be manufactured as mash feed (non-pelleted) or pelleted feed. Typically, the milled feedstuffs are mixed and sufficient amounts of essential vitamins and minerals are added according to the specifications for the species in question. Enzymes can be added as solid or liquid enzyme formulations. For example, for mash feed a solid or liquid enzyme formulation may be added before or during the ingredient mixing step. For pelleted feed the (liquid or solid) α-xylosidase/enzyme preparation may also be added before or during the feed ingredient step. Typically a liquid α-xylosidase/enzyme preparation is added after the pelleting step. The enzyme may also be incorporated in a feed additive or premix.

The final enzyme concentration in the diet is within the range of 0.01-200 mg enzyme protein per kg diet, for example in the range of 0.5-25 mg enzyme protein per kg animal diet.

The α-xylosidase should of course be applied in an effective amount, i.e. in an amount adequate for improving protein hydrolysis, protein and amino acid digestibility, and/or improving nutritional value of feed. It is at present contemplated that the enzyme is administered in one or more of the following amounts (dosage ranges): 0.01-200; 0.01-100; 0.5-100; 1-50; 5-100; 10-100; 0.05-50; or 0.10-10—all these ranges being in mg α-xylosidase protein per kg feed (ppm).

For determining mg α-xylosidase protein per kg feed, the α-xylosidase is purified from the feed composition, and the specific activity of the purified α-xylosidase is determined using a relevant assay (see under α-xylosidase activity, substrates, and assays). The α-xylosidase activity of the feed composition as such is also determined using the same assay, and on the basis of these two determinations, the dosage in mg α-xylosidase protein per kg feed is calculated.

The same principles apply for determining mg α-xylosidase protein in feed additives. Of course, if a sample is available of the α-xylosidase used for preparing the feed additive or the feed, the specific activity is determined from this sample (no need to purify the α-xylosidase from the feed composition or the additive).

Signal Peptide

The present invention also relates to an isolated polynucleotide encoding a signal peptide comprising or consisting of amino acids 1 to 21 of SEQ ID NO: 2. The polynucleotides may further comprise a gene encoding a protein, which is operably linked to the signal peptide. The protein is preferably foreign to the signal peptide. In one aspect, the polynucleotide encoding the signal peptide is nucleotides 1 to 63 of SEQ ID NO: 1.

Nucleic Acid Constructs, Expression Vectors, Recombinant Host Cells, and Methods for Production of α-Xylosidase The present invention also relates to nucleic acid constructs, expression vectors and recombinant host cells comprising such polynucleotides.encoding the α-xylosidase of the invention.

The present invention also relates to methods of producing a α-xylosidase, comprising: (a) cultivating a recombinant host cell comprising such polynucleotide; and (b) recovering the protein.

The protein may be native or heterologous to a host cell. The term "protein" is not meant herein to refer to a specific length of the encoded product and, therefore, encompasses peptides, oligopeptides, and polypeptides. The term "protein" also encompasses two or more polypeptides combined to form the encoded product. The proteins also include hybrid polypeptides and fused polypeptides.

Preferably, the protein is a hormone, enzyme, receptor or portion thereof, antibody or portion thereof, or reporter. For example, the protein may be a α-xylosidase, hydrolase, isomerase, ligase, lyase, oxidoreductase, or transferase, e.g., an alpha-galactosidase, alpha-glucosidase, aminopeptidase, amylase, beta-galactosidase, beta-glucosidase, beta-xylosidase, carbohydrase, carboxypeptidase, catalase, cellobiohydrolase, cellulase, chitinase, cutinase, cyclodextrin glycosyltransferase, deoxyribonuclease, endoglucanase, esterase, glucoamylase, invertase, laccase, lipase, mannosidase, mutanase, oxidase, pectinolytic enzyme, peroxidase, phytase, polyphenoloxidase, proteolytic enzyme, ribonuclease, transglutaminase, or xylanase.

Preferably, the protein is a α-xylosidase.

The gene may be obtained from any prokaryotic, eukaryotic, or other source.

The present invention is further described by the following examples that should not be construed as limiting the scope of the invention.

EXAMPLES

Strains

Reference has been made herein to the publicly available deposit of the microbial strain *Bacteroides ovatus* (ATCC 8483), deposited with the ATCC in 1933 by Eggerth (Eggerth A H, Gagnon B H. The *bacteroides* of human feces. J. Bacteriol. 25: 389-413, 1933).

Example 1

Construction of Plasmids and Protein Production

To produce protein constructs DNA sequences encoding *Bacteroides ovatus* GH31 (BACOVA 03422; accession A7LZZ5) and GH95 (BACOVA 03438; accession A7M011) were amplified by PCR from *B. ovatus* ATCC8483 genomic DNA using suitable primers. The GH31 was cloned into BamHI and HindIII digested pRSET_A vector (Invitrogen). The amplified DNA fragment encoding the GH95 was cloned into NdeI and XhoI restricted pET21a (Novagen).

Soluble recombinant proteins were produced by inoculating recombinant *E. coli* (BL21; Novagen) into LB medium (1 L) in 2 L flasks supplemented with ampicillin (50 μg/mL) and incubating the cultures at 37° C. with shaking (200 rpm) until the OD600 reached 0.4. Isopropyl β-D-thiogalactopyranoside was added to final concentration of 1 mM to induce protein production, and the culture was incubated for an additional 5 h at 37° C. Cells were harvested by centrifugation (fixed angle) at 5000 g/10 min/

4° C., resuspended in 10 mL of 20 mM Tris-HCl, pH 8.0, containing 300 mM NaCl (buffer A) per liter of culture and disrupted by sonication. Following clarification of the cell lysate by centrifugation at 15000 g/30 min/4° C., the polypeptide was purified by immobilized metal affinity chromatography using Talon resin (Clontech). Proteins were eluted with buffer A containing 150 mM imidazole (GH31 FIG. 3 and GH95 FIG. 4). *B. ovatus* GH31 was dialysed with 20 mM Tris-HCl buffer, pH7.5, containing 150 mM NaCl. *B. ovatus* GH95 was dialysed against 50 mM Na2PO4 buffer, pH 7.5.

The cloned DNA sequence of BACOVA 03422 is provided as SEQ ID NO:1 and the deduced amino acid sequence as SEQ ID NO:2. The mature amino acid sequence is provided as SEQ ID NO: 3

Example 2

Biochemical Characterisation of BACOVA_03422 GH31

Sources of Carbohydrates Used:

Wheat and rye arabinoxylans and xylo-oligosaccharides were from Megazyme (Megazyme International Ireland). Birch and Oat Spelt xylans and all monosaccharides were from Sigma. Corn bran xylan was kindly provided by Drs Kevin Hicks and Madhav Yadav (USDA).

Thin Layer Chromatography (TLC):

Activity of the GH31 enzymes against a range of decorated xylans was initially assessed by TLC. Xylans (1% w/v final) from rye, wheat, birch, oat and corn bran were incubated with 0.5 µM of each enzyme. Reactions were carried out in 50 mM K2PO4, 120 mM citric acid pH 6.5. Polysaccharides where incubated with enzymes for 5 h at 37° C. Then samples (6 µl each) were loaded at 1 cm intervals on the TLC plate and dried using a hair drier after each loading of 2 µl. The TLC plate was then placed in 1 L glass tank containing running buffer (butanol/acetic acid/water at 2:2:1), to a depth 0.5 cm and sealed with glass plate. When the running buffer reached ~1 cm from the top of the plate, the plate was taken out dried with hair drier and immersed for a few seconds in an orcinol sulphuric acid reagent (sulphuric acid/ethanol/water 3:70:20 v/v, orcinol 1%), and dried at 120° C. until sugars were revealed (~5-10 min).

Activity of *B. ovatus* GH31, BACOVA_03422.

TLC analysis revealed that BACOVA_03422 GH31 was not active against decorated xylans from wheat, rye, oat spelt or birchwood, but that the enzyme released a single product from corn bran xylan that co-migrated with D-xylose (FIG. 2).

High Performance Liquid Chromatography (HPLC):

HPLC was used to quantify the products of corn xylan hydrolysis by the GH31, using an analytical CARBOPAC™ PA-100 anion exchange column (Dionex) equipped with a CARBOPAC™ PA-100 guard column. The fully automated system had a loop size of 100 µl, flow rate of 1.0 ml/min, pressure of ~2000 psi and sugars were detected by pulsed amperometric detection (PAD). The PAD settings were E1=+0.05, E2=+0.6 and E3=−0.6. The elution conditions used were 0-5 minutes 100 mM NaOH, 5-15 min 100 mM NaOH with 0-75 mM sodium acetate gradient and 15-25 min 100 mM NaOH containing 75 mM sodium acetate. Before and after each run the column was washed with 500 mM sodium acetate for 10 min and then 500 mM sodium hydroxide for 5 min and then equilibrated with 100 mM sodium hydroxide for 10 min.

Enzyme reactions were performed in 50 mM PC buffer, pH 6.5 containing 1 mg/ml BSA. The final reaction volume was calculated to allow 4-8 aliquots to be analysed from each reaction, which was started by addition of suitably diluted enzyme (1/100th of final volume). Reactions were terminated by boiling aliquots for 10 min. Data were collected and analysed using XChrom V.2.04 Software (LabSystems) via a VG Chromatography Server (Fisons Instruments).

HPLC analysis was used to further investigate the *B. ovatus* GH31 product released from corn bran xylan and quantify the rate of product release. The data (FIG. 3) revealed the enzyme released a single major product from corn xylan with retention time corresponding to the D-xylose standard. To confirm that the GH31 enzyme releases xylose, the sample was spiked D-xylose standard and analysed using HPLC (FIG. 4). As enzymes from GH31 target α-D-glycosidic linkages and no activity was observed vs β-linked D-xylo-oligosaccharides from X2-X6 (not shown) these data reveal that BACOVA_03422 is α-D-xylosidase active on corn bran xylan.

The activity of the *B. ovatus* enzyme GH31 (BACOVA_03422) was then compared to a previously characterized GH31 α-xylosidase from *C. japonicus* (ACE86259) that is active on xyloglucan oligosaccharides. The results (FIGS. 5 and 6) show that, although *C. japonicus* enzyme is able to liberate xylose from corn bran xylan, the activity of the *B. ovatus* GH31 on the same amount of polymeric substrate was about 100 times greater, demonstrating that α-xylosidase activity against corn xylan is not a general property of GH31 enzymes.

Example 3

Corn Destarching and Corn Fiber Gum (CFG) Extraction

Destarched Corn 107 kg pre-milled corn (<1.0 mm) mixed with 253 kg water at 53° C. The mixture was heated to 95° C. and the pH adjusted to 6.2 with 1 M NaOH. 1.12 kg, Termamyl 120 L was added and the reaction was kept around 90° C. for 3 hrs. After 3 hrs, cold water was added to a total reaction weight of 600 kg. Liquid solid separation was done with a Westfalia decanter, CA-225-110, 4950 rpm, flow 600 L/hour. The solid fiber fraction was re-slurried and separated twice with water to a total weight of 600 kg followed by separation as described above. The final fiber fraction was divided into smaller portions and freeze dried for 3-4 days.

Corn Fiber Gum Extraction 20 g of destarched corn was added to 200 mL boiling MilliQ™ water together with 0.8 g of NaOH and 0.8 g of Ca(OH)2. The mixture was kept for 1 hour at 96 C and then centrifuged for 20 min at 6000 g.

The supernatant looked milky and fatty and therefore fats were extracted by shaking with hexane (1 part hexane to 4 parts corn fiber gum). After a resting time the hexane was removed by pipetting.

A 2nd extraction (CFG2) was made by dissolving the pellet in 200 mL 1 M NaOH. The mixture was kept for 1 hour at 96 C and then centrifuged for 20 min at 6000 g and the supernatant adjusted to pH 6 with 4 M HCl.

Both CFG fractions were concentrated using a rotavap and precipitated in EtOH at a final concentration of 90%. The pellet from the 0.1 M NaOH will from now on be called CFG1. Due to the high pH in 1 M NaOH extract (CFG2) this fraction was dialysed on a 2 L measuring cylinder with deionised water with the tap dripping overnight using a 3 kDa dialysis membrane.

Before application trials both CFG1 and CFG2 were centrifuged at 25000 g for 25 min and filtered through a 0.44 µm syringe filter. The dry matter in CFG2 fractions was determined with a Mettler Toledo HR73.

Enzymatic Corn Fiber Gum Hydrolysis

The enzymatic hydrolysis was performed using the CFG2 fraction (vide supra).

The 400 µL assays were run at 40° C. on a shaking Eppendorph Thermomixer, 1200 rpm for 17 hrs and the reactions were stopped by heat at 97° C. for 10 min. The assay setup can be found in Table 1. Seven different reactions were run in parallel and the enzymes in the respective samples can be found in Table 2.

TABLE 2

|  | µL |
| --- | --- |
| CFG2 2.3% DM | 350 |
| 0.25M Na citrate pH 6 | 20 |
| Enzyme[a] | 10 |
| MilliQ | to 400 |

| Sample | Enzymes in samples |
| --- | --- |
| 1 | GH31* |
| 2 | GH95** |
| 3 | GH31 + GH95 |
| 4 | UltraFlo L + GH31 |
| 5 | UltraFlo L + GH95 |
| 6 | UltraFlo L + GH31 + GH95 |
| 7 | UltraFlo L |

[a]10 µL per enzyme. Enzyme dosage: GH31, 0.7 g/L; GH95, 0.7 g/L; UltraFlo L 8% (v/v)
*GH31 is the α-xylosidase disclosed and claimed in the present application
**GH95 is the α-L-galactosidase disclosed in our co-pending patent application filed concurrently with this application
UltraFlo L is a commercial product from Novozymes A/S.

HPLC Analysis of Produced Monosaccharides

The supernatants were analysed on a Dionex ICS-5000 by high performance anion exchange chromatography with pulsed amperometric detection (HPAEC-PAD) using a CarboPac-20 guard and analytical column. The system was controlled by Chromeleon v. 6.8. Released monosaccharides were quantified against a 6-point standard curve of arabinose, galactose, glucose and xylose from 0.0002-0.02 g/L. 25 µL were injected of each sample using the program in Table 3. The eluents were degassed by bubbling with helium for 10 min and had the following composition: A, MilliQ water; B, 0.5 M NaOH; C, 0.5 M NaOAc; D, 60 mM NaOAc. Sample 1-3 were diluted 1:50 and samples 4-7 were diluted 1:200, both in water before injection.

TABLE 3

PA-20 eluent program with a flow of 0.5 mL/min.

| | Eluent (%) | | | | |
| --- | --- | --- | --- | --- | --- |
| Min | A | B | C | D | Curve |
| 0-8.5 | 80 | 0 | 0 | 20 | 5 |
| 8.5-25 | 80-50 | 0-30 | 20 | 0 | 4 |
| 25-27 | 0-100 | 0 | 100-0 | 0 | 9 |
| 27-40 | 80 | 0 | 0 | 20 | 5 |

GH31 released xylose from corn fiber gum. GH31 seems to add to the hydrolysis achieved by UltraFlo L.

The data shown in FIGS. 7 and 8 clearly demonstrate that GH31 could be used to aid in the degradation of corn xylan as well as releasing specific monosaccharides from corn xylan.

Example 4

Material and Methods

Substrates
a) Milled maize (kernels milled to pass a 0.5 mm screen)
b) Industrially prepared de-starched maize (IPDM)-Milled maize was treated with amylase, Termamyl® from Novozymes A/S, for 1.25 hours at 92-95° C. and then centrifuged. The residue was washed 3 times with tap water (Temp 13° C.) and finally freeze dried before use. From a 107 kg of starting material we obtained 64.5 kg (before freeze drying) resulting in approximately 20 kg air dry material.
c) NaOH treated IPDM: IDPM was stirred with 0.2 M NaOH at room temperature for 6 h. The pH was adjusted to 5.5 after the 6 h and washed 5 times with tap water, before being dried with acetone in the lab. From previous studies it has been ascertained that this NaOH treatment of maize removes the acetic and ferulic acid from milled maize.

Methods and Protocols

Samples were incubated in glass test tubes at 40° C. for 4 h, using NaAc buffer (pH 5). They were centrifuged; supernatant was collected for xylose assay (determination of soluble xylan as xylose) for samples h-m (Table 4). Small aliquots of the supernatants were analysed for monosaccharide and oligosaccharide content using a Dionex implemented method (Table 1 samples h-m)

Residue of samples from a-g (Table 4) were analysed for monosaccharides using the NSP method for insoluble fiber.

200 mg De-starched corn (DC) FFS-2013-00063/Alkali treated de-starched corn FFS-2013-00064

Conditions
4.9/4.8 ml NaAc-buffer incl $Ca^{++}$ pH 5
100/200 ul Enzyme
4 hours at 40° C.

TABLE 4

| | Treatment | Milled Maize | Industrially prepared de-starched maize (IPDM) | NaOH treated IPDM | NSP | Xylose/Dionex |
| --- | --- | --- | --- | --- | --- | --- |
| a | Control | X | x | x | x | |
| b | GH10 + GH11 | X | | | x | |
| c | GH10 + GH11 + GH43 + GH51 | X | | | x | |
| d | GH10 + GH11 + GH43 + GH51 + GH31 | X | | | x | |
| e | GH10 + GH11 + GH43 + GH51 + GH95 | X | | | x | |

TABLE 4-continued

| | Treatment | Milled Maize | Industrially prepared de-starched maize (IPDM) | NaOH treated IPDM | NSP | Xylose/ Dionex |
|---|---|---|---|---|---|---|
| f | GH10 + GH11 + GH43 + GH51 + GH31 + GH95 | X | | | x | |
| g | GH10 + GH11 + GH43 + GH51 + GH31 + GH95 + Ultraflo | X | | | x | |
| h | GH31 | | x | x | | x |
| i | GH95 | | x | x | | x |
| j | GH11 + GH43 + GH51 | | x | x | | x |
| k | GH11 + GH43 + GH51 + GH31 | | x | x | | x |
| l | GH11 + GH43 + GH51 + GH95 | | x | x | | x |
| m | GH11 + GH43 + GH51 + GH31 + GH95 | | x | x | | x |

TABLE 5

Effect of GH31 on released monosaccharides from destarched corn bran. Sugar levels are expressed as area under curve times a dilution factor.

| | Gal | Xyl |
|---|---|---|
| | Area * dilution factor | |
| Blank | 1 | 0 |
| GH31 | 1 | 0 |
| GH11, 43, 51 | 9 | 23 |
| GH11, 43, 51, 31 | 9 | 23 |

BIOLOGICAL MATERIAL

Reference has been made herein to the publicly available deposit of the microbial strain *Bacteroides ovatus* (ATCC 8483). deposited with the ATCC in 1933 by Eggerth (Eggerth A H, Gagnon B H. The *bacteroides* of human feces. J. Bacteriol. 25: 389-413, 1933).

The invention described and claimed herein is not to be limited in scope by the specific aspects herein disclosed, since these aspects are intended as illustrations of several aspects of the invention. Any equivalent aspects are intended to be within the scope of this invention. Indeed, various modifications of the invention in addition to those shown and described herein will become apparent to those skilled in the art from the foregoing description. Such modifications are also intended to fall within the scope of the appended claims. In the case of conflict, the present disclosure including definitions will control.

The invention claimed is:

1. An animal feed additive comprising:
   (a) at least one polypeptide having alpha-xylosidase activity, wherein the polypeptide has at least 90% sequence identity to the sequence of amino acids 1-793 of SEQ ID NO: 2; and
   (b) at least one fat-soluble vitamin, at least one water-soluble vitamin, or at least one trace mineral.

2. The animal feed additive of claim 1, which comprises at least one fat-soluble vitamin, at least one water-soluble vitamin, and at least one trace mineral.

3. The animal feed additive of claim 1, wherein the polypeptide has at least 95% sequence identity to the sequence of amino acids 1-793 of SEQ ID NO: 2.

4. The animal feed additive of claim 1, wherein the polypeptide has at least 97% sequence identity to the sequence of amino acids 1-793 of SEQ ID NO: 2.

5. The animal feed additive of claim 1, wherein the polypeptide is a fragment of the sequence of amino acids 1-793 of SEQ ID NO: 2, and has α-xylosidase activity.

6. The animal feed additive of claim 1, wherein the polypeptide comprises the sequence of amino acids 1-793 of SEQ ID NO: 2.

7. The animal feed additive of claim 1, wherein the polypeptide is in the form of a granulate or microgranulate.

8. An animal feed comprising an animal or vegetable protein and the animal feed additive of claim 1.

9. The animal feed of claim 8, wherein the animal protein is selected from the group consisting of meat meal, bone meal, feather meal, fish meal, and mixtures thereof.

10. The animal feed of claim 8, wherein the vegetable protein is a legume or a cereal.

11. The animal feed of claim 8, wherein the vegetable protein is soy bean meal, lupin meal, rapeseed meal, soybean, lupine, pea, bean, beet, sugar beet, spinach, quinoa, rapeseed, sunflower seed, cotton seed, or cabbage.

12. The animal feed of claim 8, further comprising dried distillers grains with solubles.

13. The animal feed of claim 8, further comprising maize; sorghum; wheat; barley; oats; soybean meal; fish meal; meat and bone meal; and/or whey.

14. The animal feed of claim 8, which is in the form of mash feed or pelleted feed.

15. The animal feed of claim 8, further comprising a GH95 enzyme.

16. The animal feed of claim 8, further comprising GH10 and GH11 enzymes.

17. The animal feed of claim 8, further comprising GH43 and GH51 enzymes.

18. A method for feeding an animal, comprising feeding the animal the animal feed of claim 9.

19. The method of claim 18, wherein the animal is selected from the group consisting of pigs or swine; poultry; horses, fish; crustaceans; sheep; goats; and cattle.

\* \* \* \* \*